(12) United States Patent
Yin et al.

(10) Patent No.: US 10,815,132 B2
(45) Date of Patent: Oct. 27, 2020

(54) APPARATUS AND METHOD FOR TREATING WASTE WATER CONTAINING AMMONIUM SALTS

(71) Applicants: China Petroleum & Chemical Corporation, Beijing (CN); Sinopec Catalyst Co., Ltd., Beijing (CN)

(72) Inventors: Xiping Yin, Beijing (CN); Ye Li, Beijing (CN); Songyuan Gu, Beijing (CN); Zhijian Liu, Beijing (CN); Tao Wang, Beijing (CN); Jin'ai Gao, Shandong (CN); Yuhua Chen, Shandong (CN); Yan Zhou, Shandong (CN); Ling Yang, Shandong (CN); Zhiwei Yuan, Beijing (CN); Hongliang Yi, Beijing (CN); Tao An, Shandong (CN); Fuzu Liu, Shandong (CN); Zhimin Zhang, Shandong (CN); Shupeng Xu, Shandong (CN)

(73) Assignees: China Petroleum & Chemical Corporation, Beijing (CN); Sinopec Catalyst Co., Ltd., Beijing (CN)

( * ) Notice: Subject to any disclaimer, the term of this patent is extended or adjusted under 35 U.S.C. 154(b) by 0 days.

(21) Appl. No.: 15/958,986

(22) Filed: Apr. 20, 2018

(65) Prior Publication Data

US 2018/0305221 A1 Oct. 25, 2018

(30) Foreign Application Priority Data

Apr. 21, 2017 (CN) .......................... 2017 1 0263271
Apr. 21, 2017 (CN) .......................... 2017 1 0263286
(Continued)

(51) Int. Cl.
*B01D 1/00* (2006.01)
*B01D 1/26* (2006.01)
(Continued)

(52) U.S. Cl.
CPC ............ *C02F 1/041* (2013.01); *B01D 1/0088* (2013.01); *B01D 1/28* (2013.01); *B01D 1/289* (2013.01);
(Continued)

(58) Field of Classification Search
CPC ...... C02F 1/041; C02F 1/048; C02F 2301/08; C02F 2103/365; C02F 1/66; C02F 1/385;
(Continued)

(56) References Cited

U.S. PATENT DOCUMENTS 4,224,036 A * 9/1980 Geesen ................ B01D 1/0082
159/45
4,323,430 A * 4/1982 Glassman ................ B01D 3/38
203/11
(Continued)

FOREIGN PATENT DOCUMENTS

| CN | 100999345 A | 7/2007 |
| CN | 101161596 A | 4/2008 |

(Continued)

OTHER PUBLICATIONS

Junqiang Sang et al., "Study on the Application of FCBR in the Production of High Ammonia Nitrogen Wastewater, Industrial water treatment technology", Industrial water treatment technology, vol. 14, China Petrochemical Press, pp. 143-150.
(Continued)

*Primary Examiner* — Clair A Norris
*Assistant Examiner* — Ekandra S. Miller-Cruz
(74) *Attorney, Agent, or Firm* — Novick, Kim & Lee, PLLC; Allen Xue

(57) ABSTRACT

The present invention relates to the waste water treatment field, and discloses apparatus and method for treating waste water containing ammonium salts, which contains $NH_4^+$, $SO_4^{2-}$, $Cl^-$, and $Na^+$. In the method of the present invention,
(Continued)

the pH value of the waste water to be treated is adjusted to a specific range in advance; sodium sulfate crystal and relatively concentrated ammonia are obtained by first evaporation, and then sodium chloride crystal and relatively dilute ammonia is obtained by second evaporation; alternatively, sodium chloride crystal and relatively concentrated ammonia is obtained by third evaporation, and then sodium sulfate crystal and relatively dilute ammonia are obtained by fourth evaporation. The method of the present invention can recover ammonia, sodium sulfate, and sodium chloride from the waste water respectively, so that the resources in the waste water can be reused as far as possible.

26 Claims, 9 Drawing Sheets

(30) Foreign Application Priority Data

Apr. 21, 2017 (CN) .......................... 2017 1 0265654
Apr. 21, 2017 (CN) .......................... 2017 1 0266201

(51) Int. Cl.
| | | |
|---|---|---|
| *B01D 1/28* | (2006.01) | |
| *B01D 3/10* | (2006.01) | |
| *B01D 3/14* | (2006.01) | |
| *C02F 1/00* | (2006.01) | |
| *C02F 1/04* | (2006.01) | |
| *C02F 1/06* | (2006.01) | |
| *C02F 1/38* | (2006.01) | |
| *C02F 1/66* | (2006.01) | |
| *C02F 9/00* | (2006.01) | |
| *C02F 101/12* | (2006.01) | |
| *C02F 101/10* | (2006.01) | |
| *C02F 101/16* | (2006.01) | |
| *C02F 103/36* | (2006.01) | |

(52) U.S. Cl.
CPC ............... *C02F 1/048* (2013.01); *B01D 1/26* (2013.01); *B01D 3/10* (2013.01); *B01D 3/146* (2013.01); *C02F 1/06* (2013.01); *C02F 1/385* (2013.01); *C02F 1/66* (2013.01); *C02F 2101/101* (2013.01); *C02F 2101/12* (2013.01); *C02F 2101/16* (2013.01); *C02F 2103/365* (2013.01); *C02F 2209/06* (2013.01); *C02F 2301/08* (2013.01)

(58) Field of Classification Search
CPC .... C02F 1/06; C02F 2101/16; C02F 2101/12; C02F 2209/06; C02F 2101/101; B01D 1/0088; B01D 1/289; B01D 1/28; B01D 3/146; B01D 3/10; B01D 1/26
USPC ........................................................ 210/639
See application file for complete search history.

(56) References Cited

U.S. PATENT DOCUMENTS

| | | | | |
|---|---|---|---|---|
| 7,595,001 | B2 * | 9/2009 | Arakel | ................ B01D 61/025 210/710 |
| 2016/0280571 | A1 | 9/2016 | Mack et al. | |
| 2017/0101326 | A1 | 4/2017 | Zhou | |

FOREIGN PATENT DOCUMENTS

| | | | | | |
|---|---|---|---|---|---|
| CN | 100429157 | C | | 10/2008 | |
| CN | 101475194 | A | | 7/2009 | |
| CN | 101264948 | B | | 8/2010 | |
| CN | 101935128 | A | * | 1/2011 | ................ C02F 9/10 |
| CN | 101935128 | A | | 1/2011 | |
| CN | 201770570 | U | | 3/2011 | |
| CN | 102030386 | B | * | 2/2012 | ................ C02F 1/20 |
| CN | 102030386 | B | | 2/2012 | |
| CN | 102190341 | B | | 12/2012 | |
| CN | 101875523 | B | | 2/2013 | |
| CN | 103408086 | A | | 11/2013 | |
| CN | 104326612 | A | | 2/2015 | |
| CN | 104326612 | A | * | 2/2015 | ................ C02F 9/10 |
| CN | 104609633 | A | | 5/2015 | |
| CN | 104803535 | B | * | 7/2015 | ................ C02F 9/10 |
| CN | 104030514 | B | | 8/2015 | |
| CN | 104860362 | A | | 8/2015 | |
| CN | 105152443 | A | | 12/2015 | |
| CN | 104058538 | B | | 3/2016 | |
| CN | 103964528 | B | | 4/2016 | |
| CN | 105502769 | A | | 4/2016 | |
| CN | 104085936 | B | | 5/2016 | |
| CN | 104341019 | B | | 5/2016 | |
| CN | 105585194 | A | | 5/2016 | |
| CN | 104478026 | B | | 8/2016 | |
| CN | 105906111 | A | | 8/2016 | |
| CN | 104773781 | B | | 9/2016 | |
| CN | 104843816 | B | | 12/2016 | |
| CN | 106379952 | A | | 2/2017 | |
| CN | 106396163 | A | | 2/2017 | |
| CN | 106430773 | A | | 2/2017 | |
| CN | 104803535 | B | | 3/2017 | |
| CN | 107399876 | A | | 11/2017 | |
| DE | 148155 | A3 | | 5/1981 | |
| EP | 1947059 | A2 | | 7/2008 | |
| EP | 3147013 | A1 | | 3/2017 | |
| EP | 3177013 | A1 | | 6/2017 | |
| JP | S55127186 | A | | 10/1980 | |
| JP | S57162690 | | * | 10/1982 | ........... B01D 19/100 |
| JP | S57162690 | A | | 10/1982 | |
| JP | 2003181444 | A | | 7/2003 | |
| JP | 2004249226 | A | | 9/2004 | |
| JP | 2005262004 | A | | 9/2005 | |
| JP | 2006213535 | A | | 8/2006 | |
| JP | 2008093523 | A | | 4/2008 | |
| KR | 20030052920 | A | | 6/2003 | |
| RU | 2281258 | C2 | * | 2/2006 | ................ C02F 9/10 |
| RU | 2004126915 | A | | 2/2006 | |
| WO | 2009014945 | A1 | | 1/2009 | |
| WO | 2014114996 | A1 | | 7/2014 | |

OTHER PUBLICATIONS

Xianliang MA et al. "Study on Short-cut Nitrification SBBR Process Performance under Impact of Refining Catalyst Wastewater", Industrial water and waste water, Oct. 2016, vol. 47, No. 5, pp. 17-22.

* cited by examiner

APPARATUS AND METHOD FOR TREATING WASTE WATER CONTAINING AMMONIUM SALTS

CROSS REFERENCE TO RELATED APPLICATIONS

This application claims priority to Chinese Application No. 201710263271.X, 201710263286.6, 201710265654.0, and 201710266201.X, filed on Apr. 21, 2017, entitled "Method for Treating Waste Water Containing Ammonium Salts", which are specifically and entirely incorporated by reference.

FIELD OF THE INVENTION

The present invention relates to the waste water treatment field, particularly to apparatus and method for treating waste water containing ammonium salts, more particularly to apparatus and method for treating waste water containing ammonium salts, which contains $NH_4^+$, $SO_4^{2-}$, $Cl^-$ and $Na^+$.

BACKGROUND OF THE INVENTION

In an oil refining catalyst production process, large quantities of inorganic acids, alkalis and salts, such as sodium hydroxide, hydrochloric acid, sulfuric acid, ammonium salts, sulfates, and hydrochlorides, etc., are required, and a large quantity of mixed waste water that contains ammonium, sodium sulfate, sodium chloride and aluminosilicate is produced. For such waste water, a common practice in the prior art is to adjust the pH to a range of 6-9 and remove the majority of suspended substances first, then remove ammonium ions through a biochemical process, air stripping process or steam stripping process, adjust the pH of the obtained salt-containing waste water, remove the majority of suspended substances, decrease the hardness, remove silica and a part of organic substances from the salt-containing waste water, remove the majority of organic substances through ozone biological activated carbon adsorption and oxidization or other advanced oxidization processes, further decrease the hardness in an ion exchange apparatus, concentrate in a concentration apparatus (e.g., reverse osmosis and/or electrodialysis apparatus), and then crystallize by MVR evaporating crystallization or multi-effect evaporation, to obtain mixed salts of sodium sulfate and sodium chloride that contain some ammonium salt; or adjust the pH to a range of 6.5-7.5 and remove the majority of suspended substances first, then decrease the hardness, remove silica and a part of organic substances, remove the majority of organic substances through ozone biological activated carbon adsorption and oxidization or other advanced oxidization processes, further decrease the hardness in an ion exchange apparatus, concentrate in a concentration apparatus (e.g., reverse osmosis and/or electrodialysis apparatus), and then crystallize by MVR evaporating crystallization or multi-effect evaporation, to obtain mixed salts of sodium sulfate and sodium chloride that contain some ammonium salts. However, at present, it is difficult to treat the mixed salts that contain ammonium, or the treatment cost is very high; in addition, the waste water treatment cost is increased additionally owing to the ammonium ion removal process in the early stage.

Besides, the biochemical ammonia removal process can only deal with waste water with low ammonium content; moreover, the catalyst waste water can't be treated directly by biochemical treatment because the COD content in it is not enough; instead, additional organic substances, such as glucose or starch, etc. have to be added in the biochemical treatment process to treat ammoniacal nitrogen through the biochemical treatment process. The most critical problem is that the total nitrogen contant in the waste water treated through a biochemical ammonia removal process often doesn't meet the standard (the contents of nitrate ions and nitrite ions are out of specification), and additional advanced treatment is required; in addition, since the salt content in the waste water is not decreased (20 g/L-30 g/L), the waste water can't be directly discharged, and further desalting treatment is required.

To remove ammoniacal nitrogen in the waste water treated through an air stripping ammonia removal process, a large quantity of alkali has to be added to adjust the pH, and the alkali consumption is heavy; since the alkali in the waste water after ammonia removal can't be recovered, the pH of the treated waste water is very high, quantities of alkaline substance is wasted, and the treatment cost is very high; moreover, since the COD content in the catalyst waste water treated through the air stripping process has little change, the salt content in the waste water is not decreased (20 g/L-30 g/L), the pH is very high, the waste water can't be directly discharged, further desalting treatment is required.

SUMMARY OF THE INVENTION

To overcome the drawbacks in the prior art, i.e., the treatment cost of waste water that contains $NH_4^+$, $SO_4^{2-}$, $Cl^-$ and $Na^+$ is very high, and only mixed salt crystals can be obtained, the present invention provides a low-cost and environment-friendly treatment apparatus and method of water waste that contains $NH_4^+$, $SO_4^{2-}$, $Cl^-$ and $Na^+$ The apparatus and method can be used to recover ammonium, sodium sulfate, and sodium chloride from the waste water respectively, and thereby the resources in the waste water can be reused as far as possible.

To attain the object described above, in a first aspect, the present invention provides a waste water treatment apparatus for treating waste water containing ammonium salts, which comprises: a pH adjustment unit, a first evaporation unit, a first solid-liquid separation unit, a second evaporation unit, and a second solid-liquid separation unit, which are connected sequentially, Wherein the pH adjustment unit is configured to adjust the pH of the waste water before evaporation is performed;

The first evaporation unit is configured to treat the waste water by first evaporation, to obtain first ammonia-containing vapor and first crystal-containing concentrated solution;

The first solid-liquid separation unit is configured to treat the first crystal-containing concentrated solution by first solid-liquid separation; The second evaporation unit is configured to treat the liquid phase obtained in the first solid-liquid separation unit by second evaporation, to obtain second ammonia-containing vapor and second crystal-containing concentrated solution;

The second solid-liquid separation unit is configured to treat the second crystal-containing concentrated solution by second solid-liquid separation.

In a second aspect, the present invention provides a method for treating waste water containing ammonium salts that contains $NH_4^+$, $SO_4^{2-}$, $Cl^-$ and $Na^+$, which comprises the following steps:

1) treating waste water to be treated by first evaporation, to obtain first ammonia-containing vapor and first concentrated solution that contains sodium sulfate crystal, wherein the waste water to be treated contains the waste water containing ammonium salts;

2) treating the first concentrated solution that contains sodium sulfate crystal by first solid-liquid separation, and treating the liquid phase obtained in the first solid-liquid separation by second evaporation, to obtain second ammonia-containing vapor and second concentrated solution that contains sodium chloride crystal;

3) treating the second concentrated solution that contains sodium chloride crystal by second solid-liquid separation;

wherein the pH of the waste water to be treated is adjusted to a value greater than 9, before the waste water to be treated is treated by the first evaporation;

the first evaporation ensures that the sodium chloride doesn't crystallize and precipitate;

in relation to 1 mol $SO_4^{2-}$ contained in the waste water to be treated, the $Cl^-$ contained in the waste water to be treated is 14 mol or less.

In a third aspect, the present invention provides a method for treating waste water containing ammonium salts that contains $NH_4^+$, $SO_4^{2-}$, $Cl^-$ and $Na^+$, which comprises the following steps:

1) treating waste water to be treated by third evaporation, to obtain third ammonia-containing vapor and third concentrated solution that contains sodium chloride crystal, wherein the waste water to be treated contains the waste water containing ammonium salts;

2) treating the third concentrated solution that contains sodium chloride crystal by third solid-liquid separation, and treating the liquid phase obtained in the third solid-liquid separation by fourth evaporation, to obtain fourth ammonia-containing vapor and fourth concentrated solution that contains sodium sulfate crystal;

3) treating the fourth concentrated solution that contains sodium sulfate crystal by fourth solid-liquid separation;

wherein the pH of the waste water to be treated is adjusted to a value greater than 9, before the waste water to be treated is treated by the third evaporation;

the fourth evaporation ensures that the sodium chloride doesn't crystallize and precipitate;

in relation to 1 mol $SO_4^{2-}$ contained in the waste water to be treated, the $Cl^-$ contained in the waste water to be treated is 7.15 mol or more.

With the technical scheme described above, for waste water that contains $NH_4^+$, $SO_4^{2-}$, Cl– and Na+, the pH value of the waste water to be treated is adjusted to a specific range in advance; sodium sulfate crystal and relatively concentrated ammonia are obtained by first evaporation and separation, and then sodium chloride crystal and relatively dilute ammonia are obtained by second evaporation; alternatively, sodium chloride crystal and relatively concentrated ammonia are obtained by third evaporation, and then sodium sulfate crystal and relatively dilute ammonia are obtained by fourth evaporation and separation. With the method, high-purity sodium sulfate and sodium chloride can be obtained respectively, difficulties in mixed salt treatment and reuse can be avoided, the ammonia and salt separation process is accomplished at the same time, the temperature of the waste water is increased and the temperature of the ammonia-containing vapor is decreased at the same time through heat exchange, and thereby a condenser is not required, the heat in the evaporation process is utilized reasonably, energy is saved, the waste water treatment cost is reduced, the ammonium in the waste water is recovered in the form of ammonia, the sodium chloride and sodium sulfate are recovered in the form of crystal respectively, no waste residue or waste liquid is produced in the entire process, and a purpose of changing wastes into valuables is achieved.

Furthermore, in the method, by using the second evaporation or third evaporation with low temperature treatment in combination, the second evaporation or third evaporation can be performed at a higher temperature, the content of solids in the concentrated solution obtained in the second evaporation or the third evaporation and the vaporization efficiency are increased, and an energy-saving effect is attained at the same time.

Other features and advantages of the present invention will be further detailed in the embodiments hereunder.

BRIEF DESCRIPTION OF DRAWINGS

The accompanying drawings are provided here to facilitate further understanding on the present invention, and constitute a part of this document. They are used in conjunction with the following embodiments to explain the present invention, but shall not be comprehended as constituting any limitation to the present invention. In the figures.

| Brief Description of the Symbols |
| --- |
| 1 - second evaporation device |
| 2 - first evaporation device |
| 31 - first heat exchange device |
| 32 - second heat exchange device |
| 33 - third heat exchange device |
| 34 - fourth heat exchange device |
| 35 - fifth heat exchange device |
| 36 - sixth heat exchange device |
| 4 - vacuum degassing tank |
| 51 - first ammonia storage tank |
| 52 - second ammonia storage tank |
| 53 - first mother liquid tank |
| 54 - second mother liquid tank |
| 22, 55 - low temperature treatment tank |
| 56 - crystal-liquid collection tank |
| 61 - first pH measuring device |
| 62 - second pH measuring device |
| 71 - first circulation pump |
| 72 - second circulation pump |

-continued

| Brief Description of the Symbols |
| --- |
| 73 - third circulation pump |
| 74 - fourth circulation pump |
| 75 - fifth circulation pump |
| 76 - sixth circulation pump |
| 77 - seventh circulation pump |
| 78 - eighth circulation pump |
| 79 - ninth circulation pump |
| 80 - tenth circulation pump |
| 81 - vacuum pump |
| 82 - circulating water tank |
| 83 - tail gas absorption tower |
| 91 - first solid-liquid separation device |
| 92 - second solid-liquid separation device |
| 101 - first compressor |
| 102 - second compressor |

DETAILED DESCRIPTION OF THE EMBODIMENTS

Hereunder some embodiments of the present invention will be detailed. It should be understood that the embodiments described here are only provided to describe and explain the present invention, but shall not be deemed as constituting any limitation to the present invention.

The ends points and any value in the ranges disclosed in the present invention are not limited to the exact ranges or values; instead, those ranges or values shall be comprehended as encompassing values that are close to those ranges or values. For numeric ranges, the end points of the ranges, the end points of the ranges and the discrete point values, and the discrete point values may be combined to obtain one or more new numeric ranges, which shall be deemed as having been disclosed specifically in this document.

Hereunder the present invention will be detailed with reference to FIGS. 1-9, but the present invention is not limited to FIGS. 1-9.

Figure 1:
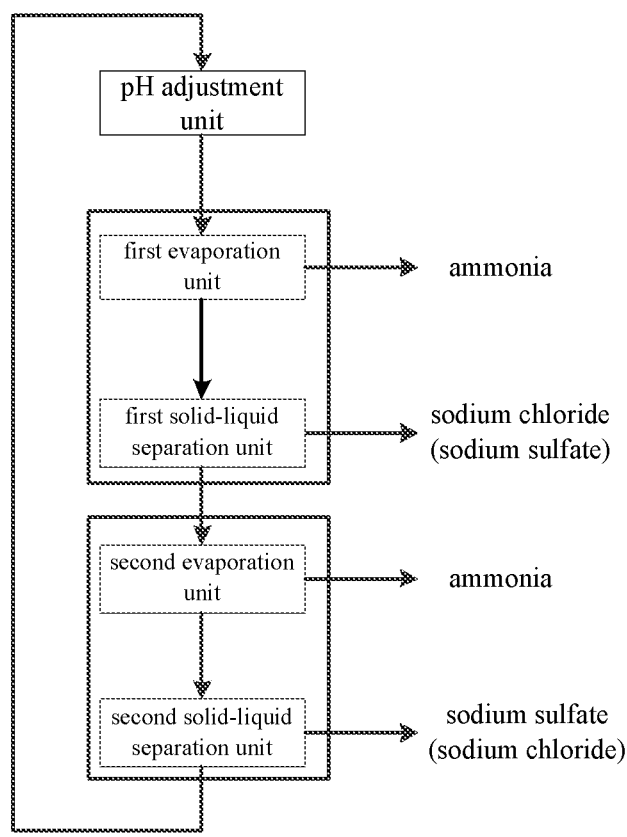
FIG. 1 is a structure diagram of the waste water treatment apparatus of the present invention.

The present invention provides a waste water treatment apparatus for treating waste water containing ammonium salts, as shown in FIG. 1, which comprises: a pH adjustment unit, a first evaporation unit, a first solid-liquid separation unit, a second evaporation unit, and a second solid-liquid separation unit, which are connected sequentially, Wherein the pH adjustment unit is configured to adjust the pH of the waste water before evaporation is performed; The first evaporation unit is configured to treat the waste water by first evaporation, to obtain first ammonia-containing vapor and first crystal-containing concentrated solution;

The first solid-liquid separation unit is configured to treat the first crystal-containing concentrated solution by first solid-liquid separation; The second evaporation unit is configured to treat the liquid phase obtained in the first solid-liquid separation unit by second evaporation, to obtain second ammonia-containing vapor and second crystal-containing concentrated solution;

The second solid-liquid separation unit is configured to treat the second crystal-containing concentrated solution by second solid-liquid separation.

According to the present invention, the treatment apparatus described above may be used in the water waste treatment method of the present invention, the pH adjustment unit may be used to adjust the pH of the waste water to be treated, the first evaporation unit may be used to perform the first evaporation or third evaporation in the water waste treatment method of the present invention, the first solid-liquid separation unit may be used to perform the first solid-liquid separation or third solid-liquid separation in the water waste treatment method of the present invention, the second evaporation unit may be used to perform the second evaporation or fourth evaporation in the water waste treatment method of the present invention, and the second solid-liquid separation unit may be used to perform the second solid-liquid separation or fourth solid-liquid separation in the water waste treatment method of the present invention. According to the waste water treatment apparatus for treating waste water containing ammonium salts, preferably, the apparatus does not comprise separate non-evaporation deamination device (device only for removing ammonia from waste water, such as biochemical treatment device, deamination membrane and the like), and high-purity ammonia, sodium sulfate crystals and sodium chloride crystals can be separated from the waste water only by the combination of the evaporation unit and the solid-liquid separation unit.

According to a preferred embodiment of the present invention, the waste water treatment apparatus further comprises a low-temperature treatment unit arranged between the first evaporation unit and the first solid-liquid separation unit or between the second evaporation unit and the second solid-liquid separation unit, and the low-temperature treatment unit is configured to perform low temperature treatment of the concentrated solution obtained in the first evaporation unit or second evaporation unit to obtain treated solution. By providing the low-temperature treatment unit, the evaporation process in the second evaporation unit or the third evaporation unit can work in combination with the low temperature treatment, so that the evaporation process in the second evaporation unit or the third evaporation unit can be performed at a higher temperature, the content of solids in the concentrated solution obtained in the second evaporation or the third evaporation and the vaporization efficiency can be increased, and an energy-saving effect can be achieved at the same time.

Any conventional cooling device in the art may be used as the low-temperature treatment unit. For example, the low-temperature treatment unit may be a low temperature treatment tank 55. Preferably, the low temperature treatment tank 55 may be equipped with a cooling component in it; specifically, the cooling component may be a component that introduces cooling water. With the cooling component, the second or third concentrated solution in the low temperature treatment tank can be cooled quickly. Preferably, the low temperature treatment tank 55 may be equipped with a stirring component in it. Under the stirring action of the stirring component, the solid phase and liquid phase distribution and the temperature distribution in the second or third concentrated solution are uniform, and a purpose that the sodium sulfate crystal is dissolved fully and the sodium chloride crystal precipitates as far as possible is attained.

The waste water treatment apparatus further comprises a pipeline configured to return the liquid phase obtained in the second solid-liquid separation unit to the first evaporation unit. By returning the liquid phase obtained in the second solid-liquid separation unit to the first evaporation unit, the waste water can be evaporated in a circulated manner in the waste water treatment apparatus in the present invention, and thereby an effect of separating the ammonia and salts in the waste water completely is attained.

According to the present invention, the waste water treatment apparatus further comprises a heat exchange unit, which is configured to perform heat exchange between the ammonia-containing vapor or its condensate and the waste water to be treated, and obtain ammonia. Any conventional heat exchanger in the art may be used as the heat exchange unit. Specifically, the heat exchange unit may be a jacket-type heat exchanger, plate-type heat exchanger, or shell and tube heat exchanger, etc., preferably is a plate-type heat exchanger. The material of the heat exchanger may be selected as required. For example, to resist erosion of chloride ions, a heat exchanger made of duplex stainless steel, titanium and titanium alloy, or hastelloy may be selected. At a low temperature, a heat exchanger made of plastic material may be selected. For example, the second heat exchange device 32 configured to perform heat exchange between the first ammonia-containing vapor and the waste water to be treated in FIG. 2 may be used.

According to the present invention, there is no particular restriction on the evaporation device used in the evaporation process, as long as the evaporation device can accomplish evaporation. For example, the first evaporation unit and the second evaporation unit may be selected from one or more of MVR evaporation device, single-effect evaporation device, multi-effect evaporation device and flash evaporation device respectively. For example, the first evaporation device 2 and the second evaporation device 1 shown in FIGS. 2-9 may be used. Preferably, the first evaporation unit and/or the second evaporation unit are/is MVR evaporation devices/a MVR evaporation device.

The MVR evaporation device may be selected from one or more of MVR falling film evaporator, MVR forced circulation evaporator, MVR-FC continuous crystallizing evaporator, and MVR-OSLO continuous crystallizing evaporator. Wherein the MVR evaporation device preferably is a MVR forced circulation evaporator or MVR-FC continuous crystallizing evaporator, more preferably is a two-stage MVR evaporating crystallizer that incorporates falling film and forced circulation.

The single-effect evaporation device or the evaporators in the multi-effect evaporation device may be selected from one or more of falling-film evaporator, rising-film evaporator, scraped evaporator, central circulation tube evaporator, basket evaporator, external heating evaporator, forced circulation evaporator, and Levin evaporator, for example. Wherein the evaporators preferably are forced circulation evaporators or external heating evaporators. Each of the above evaporators consists of a heating chamber and an evaporation chamber, and may include other auxiliary evaporation components as required, such as froth separator configured to further separate liquid and froth, condenser configured to condense the secondary steam fully, and vacuum device for depressurization, etc. In the case that the evaporation device is a multi-effect evaporation device, there is no particular restriction on the number of evaporators included in the multi-effect evaporation device; in other words, the number of evaporators included in the multi-effect evaporation device may be selected according to the evaporation conditions as required, and may be 2 or more, preferably is 2-5, more preferably is 2-4.

The flash evaporation device may be single-stage flash evaporation device or multistage flash evaporation device. The single-stage flash evaporation device or the evaporators in the multistage flash evaporation device may be selected from one or more of thin-film flash evaporator, high-efficiency vapor-liquid flash evaporator, rotary flash evaporator, for example. Wherein the evaporators preferably are thin-film flash evaporator, high-efficiency vapor-liquid flash evaporator. In the case that the evaporation device is a multistage flash evaporation device, the number of evaporators included in the multistage flash evaporation device may be 2 or more, preferably is 2-4.

According to a preferred embodiment of the present invention, the first evaporation unit is a MVR evaporation device, and the second evaporation unit is a MVR evaporation device; or the first evaporation unit is a multi-effect evaporation device, and the second evaporation unit is a MVR evaporation device; or the first evaporation unit is a MVR evaporation device, and the second evaporation unit is a multi-effect evaporation device.

According to the present invention, there is no particular restriction on the first solid-liquid separation unit and the second solid-liquid separation unit, as long as they can attain a solid-liquid separation effect. For example, they can be selected from one or more of centrifugation device, filtering device, and sedimentation device respectively. For the purpose of improving the solid-liquid separation efficiency, preferably, both the first solid-liquid separation unit and the second solid-liquid separation unit are centrifugation devices.

According to the present invention, there is no particular restriction on the pH adjustment unit, as long as it can adjust the pH of the waste water to be treated to the specified range. For example, the pH adjustment unit may be a pH adjustor (pH adjustment reagent) introduction device. NaOH may be used as the pH adjustor, for example. Specifically, NaOH solution may be added into the waste water to be treated to accomplish pH adjustment. To monitor the pH after the adjustment, the device may further comprise a pH measuring device, which may be any pH meter in the art.

In the present invention, the waste water treatment apparatus may further comprise heat exchange devices, such as heat exchangers, etc. There is no particular restriction on the number and positions of the heat exchange devices. For example, as shown in FIG. 2, the heat exchange devices may include the second heat exchange device 32, first heat exchange device 31, and third heat exchange device 33 that are configured to decrease the temperature of the first ammonia-containing vapor and increase the temperature of the waste water to be treated, the fourth heat exchange device 34 configured to decrease the temperature of the second ammonia-containing vapor and increase the temperature of the first concentrated solution, and the fifth heat exchange device 35 configured to decrease the temperature of the second treated solution and increase the temperature of the waste water to be treated.

Figure 4:
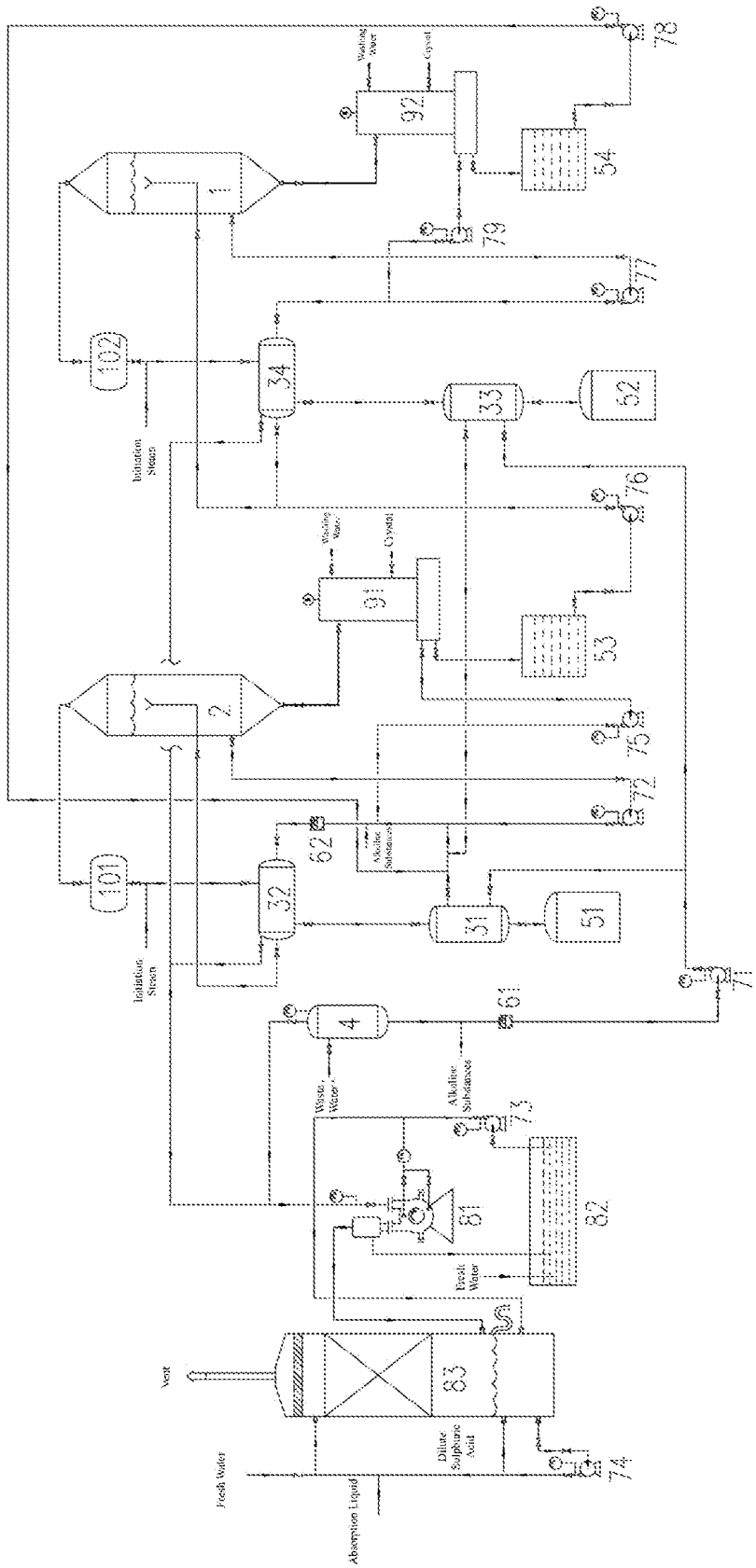
FIG. 4 is a flow diagram of the method for treating waste water containing ammonium salts in another embodiment of the present invention.

As a preferred waste water treatment apparatus in the present invention, as shown in FIG. 4, the waste water treatment apparatus comprises a pH adjustor introduction pipe, a first pH measuring device 61, a first evaporation device 2, a first solid-liquid separation device 91, a second evaporation device 1, a second solid-liquid separation device 92, and a conduit configured to return the liquid phase obtained in the second solid-liquid separation to a position in front of the pH adjustor introduction pipe, which communicate with each other sequentially.

Figure 2:
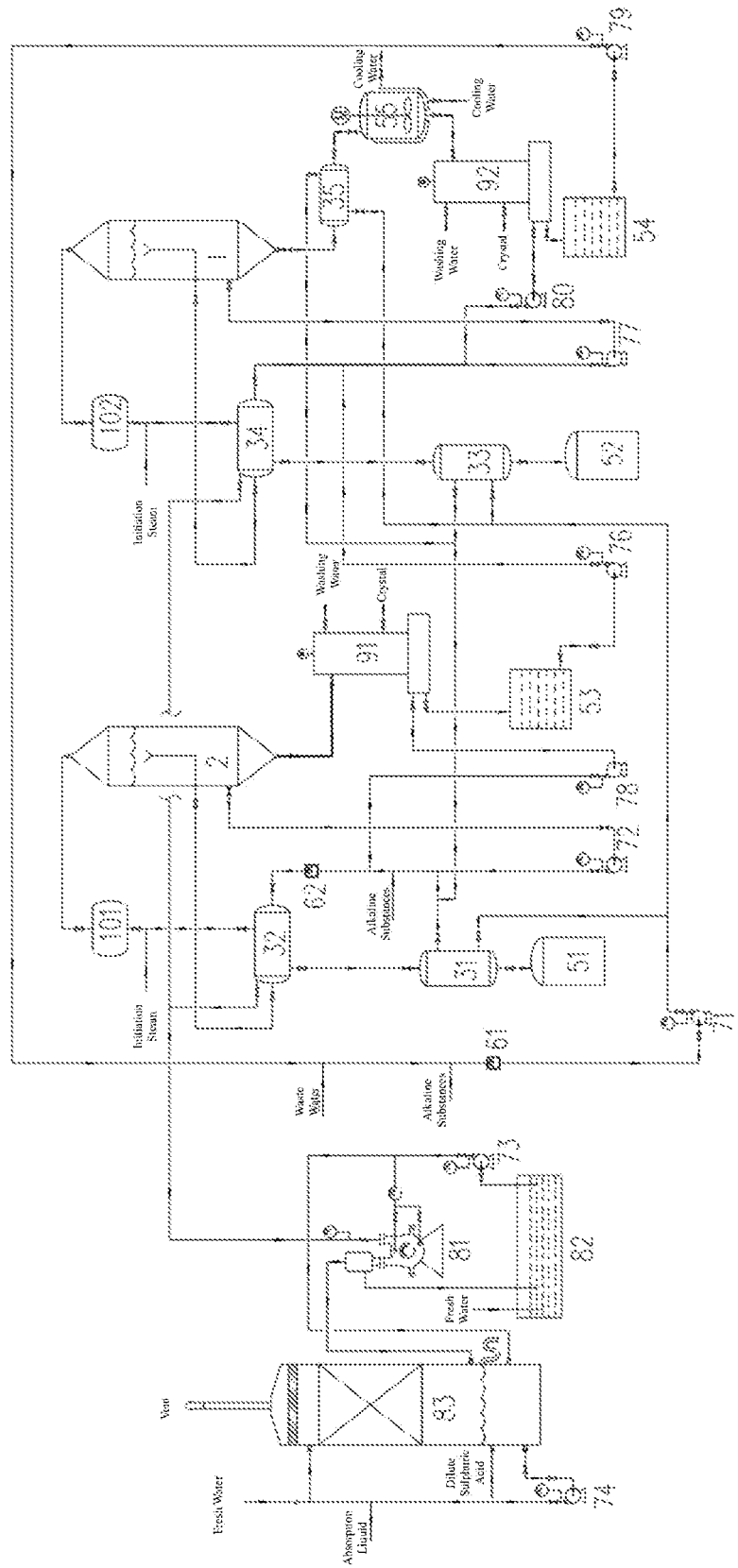
FIG. 2 is a flow diagram of the method for treating waste water containing ammonium salts in an embodiment of the present invention.

As a preferred waste water treatment apparatus in the present invention, as shown in FIG. 2, the waste water treatment apparatus comprises a pH adjustor introduction pipe, a first pH measuring device 61, a first evaporation device 2, a first solid-liquid separation device 91, a second evaporation device 1, a low temperature treatment tank 55, a second solid-liquid separation device 92, and a conduit configured to return the liquid phase obtained in the second solid-liquid separation to a position in front of the pH adjustor introduction pipe, which communicate with each other sequentially.

To take full advantage of the heat in the evaporation process, the apparatus in the above embodiment may further comprise a first heat exchange device 31 and a second heat exchange device 32 arranged in front of the first evaporation device 2 and configured to perform heat exchange between the vapor obtained in the evaporation in the first evaporation unit and the waste water to be treated; and a fourth heat exchange device 34 arranged between the first solid-liquid separation device 91 and the second evaporation device 1 and configured to perform heat exchange between the vapor obtained in the second evaporation unit and the liquid phase obtained in the first solid-liquid separation.

According to the present invention, the waste water treatment apparatus further comprises a tail gas absorption unit configured to absorb ammonia in the tail gas from the waste water treatment apparatus. A tail gas absorption tower 83 may be used as the tail gas absorption unit. There is no particular restriction on the tail gas absorption tower 83; in other words, the tail gas absorption tower 83 may be any conventional absorption tower in the art, such as plate-type absorption tower, packed absorption tower, falling film absorption tower, or void tower, etc. The tail gas absorption tower 83 may be used in combination with a fourth circulation pump 74 which is configured to drive the circulating water to circulate in the tail gas absorption tower 83. The tail gas absorption tower 83 may further be used in combination with a circulating water tank 82; for example, water may be replenished with a third circulation pump 73 from the circulating water tank 82 to the tail gas absorption tower 83; fresh water may be replenished to the circulating water tank 82, and thereby the temperature and ammonia content of the service water of the vacuum pump 81 may be decreased at the same time.

The present invention further provides a method for treating waste water containing ammonium salts that contains $NH_4^+$, $SO_4^{2-}$, $Cl^-$ and $Na^+$, which comprises the following steps:

1) treating waste water to be treated by first evaporation, to obtain first ammonia-containing vapor and first concentrated solution that contains sodium sulfate crystal, wherein the waste water to be treated contains the waste water containing ammonium salts;

2) treating the first concentrated solution that contains sodium sulfate crystal by first solid-liquid separation, and treating the liquid phase obtained in the first solid-liquid separation by second evaporation, to obtain second ammonia-containing vapor and second concentrated solution that contains sodium chloride crystal;

3) treating the second concentrated solution that contains sodium chloride crystal by second solid-liquid separation;

wherein the pH of the waste water to be treated is adjusted to a value greater than 9, before the waste water to be treated is treated by the first evaporation; the first evaporation ensures that the sodium chloride doesn't crystallize and precipitate; in relation to 1 mol $SO_4^{2-}$ contained in the waste water to be treated, the contained in the waste water to be treated is 14 mol or less.

Preferably, the waste water to be treated is the waste water containing ammonium salts; or the waste water to be treated contains the waste water containing ammonium salts and the liquid phase obtained in the second solid-liquid separation.

More preferably, the waste water to be treated is mixed solution of the waste water containing ammonium salts and at least a part of the liquid phase obtained in the second solid-liquid separation. Further preferably, the waste water to be treated is mixed solution of the waste water containing ammonium salts and the liquid phase obtained in the second solid-liquid separation.

Preferably, the pH of the waste water to be treated is adjusted to a value greater than 10.8 before the first evaporation is performed for the waste water to be treated. Besides, there is no particular restriction on the upper limit of the pH of the waste water to be treated. For example, the pH may be 14 or lower, preferably is 13.5 or lower, more preferably is 13 or lower.

The method provided in the present invention can treat waste water that contains $NH_4^+$, $SO_4^{2-}$, $Cl^-$ and $Na^+$, and there is particular restriction on the waste water containing ammonium salts, except that the waste water contains $NH_4^+$, $SO_4^{2-}$, $Cl^-$ and $Na^+$. In consideration of improving the waste water treatment efficiency, in relation to 1 mol $SO_4^{2-}$ contained in the waste water to be treated, the $Cl^-$ contained in the waste water to be treated preferably is 13.8 mol or less, more preferably is 13.75 mol or less, further preferably is 13.5 mol or less, still further preferably is 13 mol or less, still further preferably is 12 mol or less, still further preferably is 11 mol or less, still further preferably is 10.5 mol or less, preferably is 2 mol or more, more preferably is 2.5 mol or more, further preferably is 3 mol or more, such as 1-10 mol, preferably 2-8 mol. By controlling the molar ratio of $SO_4^{2-}$ to $Cl^-$ within the above-mentioned range, sodium sulfate precipitates fully but sodium chloride doesn't precipitate in the first evaporation, and thereby a purpose of separating sodium sulfate efficiently is attained. In addition, as described above and below, in the present invention, the second mother liquid obtained in the second evaporation process may be circulated to the first evaporation stage, and thereby the molar ratio of $SO_4^{2-}$ to $Cl^-$ in the waste water to be treated is adjusted and sodium hydroxide balance is maintained.

In the present invention, there is no particular restriction on the order of the first heat exchange, the adjustment of pH of the waste water to be treated, and the blending process of the waste water to be treated (in the case that the waste water to be treated contains the waste water containing ammonium salts and the liquid phase obtained in the second solid-liquid separation, a blending process of the waste water to be treated is required), and the order may be selected appropriately as required, as long as those procedures are accomplished before the first evaporation of the waste water to be treated.

In the present invention, the first evaporation ensures that the sodium chloride doesn't crystallize and precipitate, which means that the concentration of sodium chloride in the mixed system is controlled so that it doesn't exceed the solubility under the conditions of the first evaporation (including, but not limited to temperature and pH, etc.), without excluding sodium chloride entrained in the sodium sulfate crystal or absorbed to the surface of the sodium sulfate crystal. Owing to the fact that the moisture content in the crystal after solid-liquid separation is different, usually the content of sodium chloride in the obtained sodium sulfate crystal is 8 mass % or lower (preferably 4 mass %). In the present invention, it is deemed that the sodium chloride doesn't crystallize and precipitate if the content of sodium chloride in the obtained sodium sulfate crystal is 8 mass % or lower.

According to a preferred embodiment of the present invention, in the case that the low temperature treatment is not performed, the second evaporation ensures that the sodium sulfate doesn't crystallize and precipitate, which means that the concentration of sodium sulfate in the mixed system doesn't exceed the solubility under the conditions of the second evaporation (including, but not limited to temperature and pH, etc.), without excluding sodium sulfate entrained in the sodium chloride crystal or absorbed to the surface of the sodium chloride crystal. Owing to the fact that the moisture content in the crystal after solid-liquid separation is different, usually the content of sodium sulfate in the obtained sodium chloride crystal is 8 mass % or lower (preferably 4 mass % or lower). In the present invention, it is deemed that the sodium sulfate doesn't crystallize and precipitate if the content of sodium sulfate in the obtained sodium chloride crystal is 8 mass % or lower.

According to another preferred embodiment of the present invention, the method further comprises: treating the second concentrated solution that contains sodium chloride crystal by low temperature treatment, to obtain treated solution that contains sodium chloride crystal; then treating the treated solution that contains sodium chloride crystal by second solid-liquid separation. Namely, the method comprises the following steps:

1) treating waste water to be treated by first evaporation, to obtain first ammonia-containing vapor and first concentrated solution that contains sodium sulfate crystal, wherein the waste water to be treated contains the waste water containing ammonium salts;

2) treating the first concentrated solution that contains sodium sulfate crystal by first solid-liquid separation, and treating the liquid phase obtained in the first solid-liquid separation by second evaporation, to obtain second ammonia-containing vapor and second concentrated solution that contains sodium chloride crystal;

3) treating the second concentrated solution that contains sodium chloride crystal by low temperature treatment, to obtain treated solution that contains sodium chloride crystal;

4) treating the treated solution that contains sodium chloride crystal by second solid-liquid separation;

In the above case that the low temperature treatment is performed, sodium chloride crystal precipitates in the second evaporation. In consideration of improving the treatment efficiency, preferably both sodium chloride crystal and sodium sulfate crystal precipitate in the second evaporation, and thereby second concentrated solution that contains sodium sulfate crystal and sodium chloride crystal is obtained. In the case that second concentrated solution that contains sodium sulfate crystal and sodium chloride crystal is obtained, the second evaporation must ensure that the sodium sulfate crystal will be dissolved in the low temperature treatment. Specifically, second concentrated solution that contains sodium sulfate crystal and sodium chloride crystal is obtained in the second evaporation, and the sodium sulfate crystal can be dissolved fully in the low temperature treatment. By controlling the amount of evaporation in the second evaporation, sodium sulfate and sodium chloride crystallize and precipitate at the same time (i.e., second concentrated solution that contains sodium sulfate crystal and sodium chloride crystal is obtained in the second evaporation), and then the sodium sulfate crystal in the second concentrated solution that contains sodium sulfate crystal and sodium chloride crystal is dissolved and the sodium chloride further crystallize and precipitate in the low temperature treatment, so that treated solution that only contains sodium chloride crystal is obtained.

The treated solution that contains sodium chloride crystal doesn't exclude the sodium sulfate entrained in the sodium chloride crystal or absorbed to the surface of the sodium chloride crystal. Owing to the fact that the moisture content in the crystal after solid-liquid separation is different, usually the content of sodium sulfate in the obtained sodium chloride crystal is 8 mass % or lower (preferably 4 mass % or lower). In the present invention, it is deemed that the sodium sulfate has been dissolved if the content of sodium sulfate in the obtained sodium chloride crystal is 8 mass % or lower.

In the present invention, it is understood that both the first ammonia-containing vapor and the second ammonia-containing vapor are secondary steam referred in the art. All the pressure values are gauge pressure values.

According to the present invention, there is no particular restriction on the specific execution of the first evaporation and the second evaporation, as long as the first evaporation and the second evaporation can attain the purpose of evaporation under corresponding evaporation conditions. For example, the first evaporation and the second evaporation may be executed respectively in a conventional evaporation device in the art. Specifically, the evaporation device may be one or more of MVR evaporation device, multi-effect evaporation device, single-effect evaporation device and flash evaporation device. Wherein the first evaporation preferably is executed in a MVR evaporation device; the second evaporation preferably is executed in a MVR evaporation device. The first evaporation may be executed in the first evaporation unit of the waste water treatment apparatus in FIG. 1, the second evaporation may be executed in the second evaporation unit of the waste water treatment apparatus in FIG. 1.

The MVR evaporation device may be selected from one or more of MVR falling film evaporator, MVR forced circulation evaporator, MVR-FC continuous crystallizing evaporator, and MVR-OSLO continuous crystallizing evaporator. Wherein the MVR evaporation device preferably is a MVR forced circulation evaporator or MVR-FC continuous crystallizing evaporator, more preferably is a two-stage MVR evaporating crystallizer that incorporates falling film and forced circulation.

The single-effect evaporation device or the evaporators in the multi-effect evaporation device may be selected from one or more of falling-film evaporator, rising-film evaporator, scraped evaporator, central circulation tube evaporator, basket evaporator, external heating evaporator, forced circulation evaporator, and Levin evaporator, for example. Wherein the evaporators preferably are forced circulation evaporators or external heating evaporators. Each of the above evaporators consists of a heating chamber and an evaporation chamber, and may include other auxiliary evaporation components as required, such as froth separator configured to further separate liquid and froth, condenser configured to condense the secondary steam fully, and vacuum device for depressurization, etc. In the case that the evaporation device is a multi-effect evaporation device, there is no particular restriction on the number of evaporators included in the multi-effect evaporation device; in other words, the number of evaporators included in the multi-effect evaporation device may be selected according to the evaporation conditions as required, and may be 2 or more, preferably is 2-5, more preferably is 2-4.

The flash evaporation device may be single-stage flash evaporation device or multistage flash evaporation device. The single-stage flash evaporation device or the evaporators in the multistage flash evaporation device may be selected from one or more of thin-film flash evaporator, high-efficiency vapor-liquid flash evaporator, rotary flash evaporator, for example. Wherein the evaporators preferably are thin-film flash evaporator, high-efficiency vapor-liquid flash evaporator. In the case that the evaporation device is a multistage flash evaporation device, the number of evaporators included in the multistage flash evaporation device may be 2 or more, preferably is 2-4. In the present invention, in the case that the first evaporation and/or the second evaporation are/is executed in a multi-effect evaporation device, the feeding methods for the liquids to be evaporated may be the same or different from each other, and may employ co-current feeding, counter-current feeding, or parallel-current feeding. Specifically, the co-current feeding is: the liquid to be evaporated flows through the evaporators in the multi-effect evaporation device sequentially, and the ammonia-containing vapor obtained in the evaporation in each evaporator in the multi-effect evaporation device is charged into the next evaporator. Specifically, the counter-current feeding is: the liquid to be evaporated flows through the evaporators in the multi-effect evaporation device sequentially, and the ammonia-containing vapor obtained in the evaporation in each evaporator in the multi-effect evaporation device is charged into the previous evaporator. Specifically, the parallel-current feeding is: the liquid to be evaporated is charged to each of the evaporators in the multi-effect evaporation device separately, and the ammonia-containing vapor obtained in the evaporation in each evaporator in the multi-effect evaporation device is charged into the next evaporator. Wherein preferably co-current feeding is used. In the case of co-current feeding or counter-current feeding, the evaporation conditions refer to the evaporation conditions in the last evaporation in the multi-effect evaporation device. In the case of parallel-current feeding, the evaporation conditions refer to the evaporation conditions in each evaporator in the multi-effect evaporation device.

In the present invention, to charge the waste water to be treated into the evaporators in the multi-effect evaporation device sequentially, circulation pumps may be arranged between every two evaporators, and the waste water produced in the evaporation in each evaporator is charged by means of the circulation pump into the next evaporator.

In the present invention, the circulation pumps used between the evaporators may be any conventional type of pumps in the art. However, to ensure that the material can be evaporated uniformly, avoid generation of a large quantity of fine crystal nuclei, and prevent the crystal grains in the circulating crystal slurry from colliding with the impeller at a high speed and thereby producing a large quantity of secondary crystal nuclei, the circulation pumps preferably are low-speed centrifugal pumps, more preferably are high-flow low-speed diffuser pump impellers or high-flow, low-lift and low-speed axial pumps.

According to a preferred embodiment of the present invention, as shown in FIG. 2, the first evaporation is performed in the first evaporation device 2, which is a MVR evaporation device, preferably is a two-stage MVR evaporating crystallizer that incorporates falling film and forced circulation.

Figure 3:
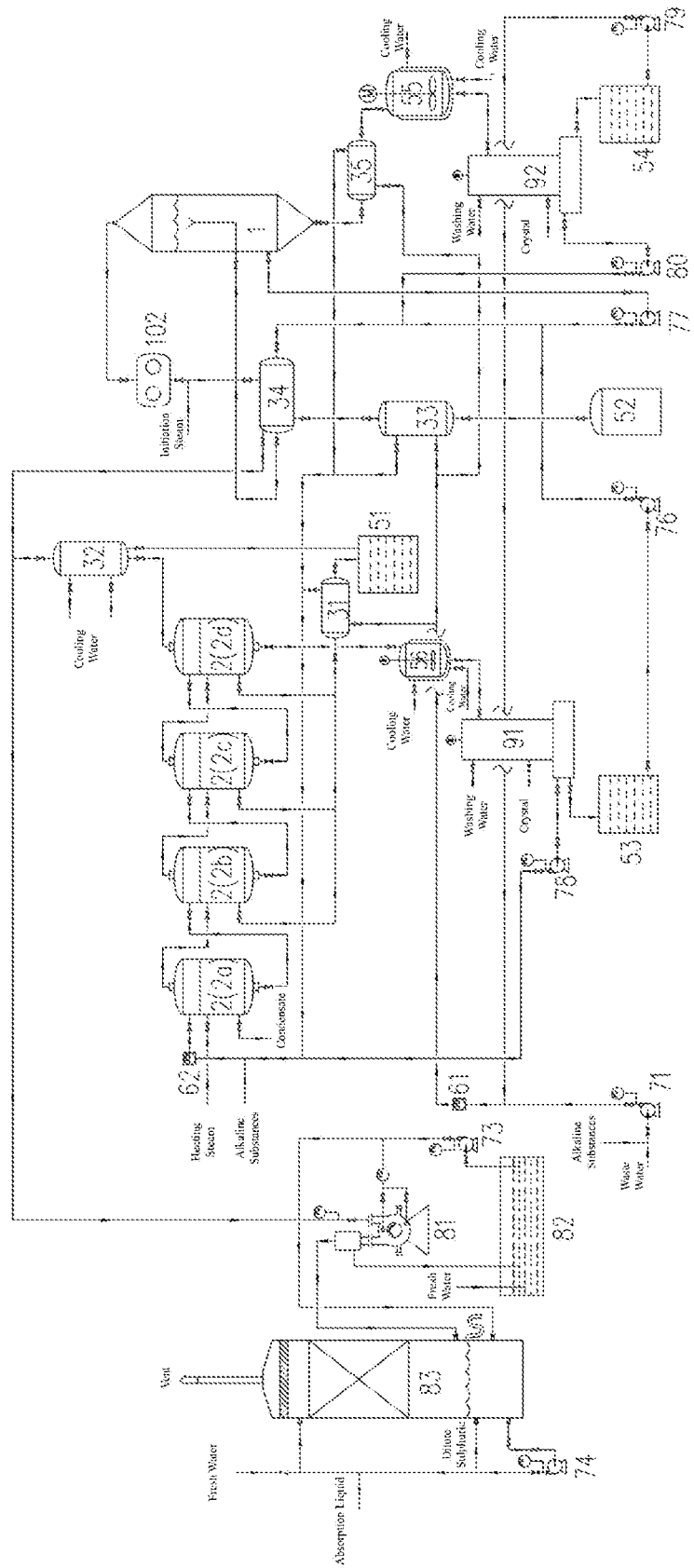
FIG. 3 is a flow diagram of the method for treating waste water containing ammonium salts in another embodiment of the present invention.

According to a preferred embodiment of the present invention, as shown in FIG. 3, the first evaporation is performed in the first evaporation device 2, which is a multi-effect evaporation device composed of a first evaporator 2a, a second evaporator 2b, a third evaporator 2c, and a fourth evaporator 2d. The waste water to be treated is charged into the first evaporator 2a, second evaporator 2b, third evaporator 2c, and fourth evaporator 2d of the first evaporation device 2 sequentially for evaporation, and thereby first concentrated solution that contains sodium sulfate crystal is obtained. The first ammonia-containing vapor obtained in each evaporator in the first evaporation device 2 is charged into the next evaporator to perform heat exchange and obtain first ammonia. More preferably, the first ammonia performs first heat exchange with the waste water to be treated in the first heat exchange device 31 to take full advantage of energy. Heating steam (i.e., live steam conventionally used in the art) is charged into the first evaporator 2a, the heating steam is condensed into condensate in the first evaporator 2a, and the condensate is used to preheat the waste water to be treated in the first evaporation device 2, and then is used to prepare sodium sulfate washing solution.

In the present invention, the conditions of the first evaporation may be selected appropriately as required, as long as a purpose of causing the sodium sulfate to crystallize while preventing the sodium chloride from precipitate can be attained. The conditions of the first evaporation include: temperature: 35° C. or above; pressure: −95 kPa or above; in consideration of improving evaporation efficiency and reducing equipment cost and energy consumption, preferably, the conditions of the first evaporation include: temperature: 45° C. or above; pressure: −95 kPa or above; preferably, the conditions of the first evaporation include: temperature: 45° C.-365° C.; pressure: −95 kPa-18110 kPa; preferably, the conditions of the first evaporation include: temperature: 60° C.-365° C.; pressure: −87 kPa-18110 kPa; preferably, the conditions of the first evaporation include: temperature: 75° C.-175° C.; pressure: −73 kPa-653 kPa; preferably, the conditions of the first evaporation include: temperature: 80° C.-130° C.; pressure: −66 kPa-117 kPa; preferably, the conditions of the first evaporation include: temperature: 95° C.-110° C.; pressure: −37 kPa-12 kPa; preferably, the conditions of the first evaporation include: temperature: 95° C.-105° C.; pressure: −37 kPa-−7 kPa. In the present invention, the operating pressure of the first evaporation preferably is the saturated vapor pressure of the evaporated feed liquid.

In the present invention, the flow rate of the first evaporation may be selected appropriately according to the processing capacity of the apparatus. For example, the flow rate may be 0.1 m$^3$/h or higher (e.g., 0.1 m$^3$/h-500 m$^3$/h).

By performing the first evaporation under the above conditions, sodium chloride doesn't crystallize while sodium sulfate crystallizes, and thereby the purity of the obtained sodium sulfate crystal is ensured.

According to the present invention, by controlling the conditions of the first evaporation, 90 mass % or more (preferably 95 mass % or more) ammonia in the waste water to be treated can be evaporated, and thereby first ammonia at high concentration can be obtained. The first ammonia may be directly reused in the catalyst production process, or it may be neutralized with acid to obtain ammonium salt and then is reused in the form of the ammonium salt, or it can be blended with water and corresponding ammonium salt or ammonia and then reused. In a case that the first evaporation is performed in a multi-effect evaporation device, to obtain strong ammonia, the condensate of the first ammonia-containing vapor obtained in the first evaporator and/or second evaporator may be collected separately, i.e., the condensate of the ammonia-containing vapor obtained in the second evaporator and/or the third evaporator may be collected separately. The above-mentioned first ammonia may be collected separately or in combination as required. To control the concentration of the ammonia, the evaporation conditions in the evaporators may be adjusted appropriately.

According to the present invention, the first evaporation ensures that the sodium chloride in the waste water to be treated doesn't crystallize and precipitate (i.e., the sodium chloride is not over-saturated); preferably, through the first evaporation, the concentration of sodium chloride in the first concentrated solution is X or lower (preferably 0.999X or lower, more preferably 0.95X-0.999X, further preferably 0.99X-0.9967X), where, X is the concentration of sodium chloride in the first concentrated solution when both sodium sulfate and sodium chloride are saturated under the conditions of the first evaporation. By controlling the degree of the first evaporation within the above-mentioned range, sodium sulfate crystallizes and precipitates as far as possible while sodium chloride doesn't precipitate. By causing the sodium sulfate to crystallize in the first evaporation as far as possible, the waste water treatment efficiency can be improved, and energy waste can be reduced.

In the present invention, the degree of the first evaporation is ascertained by monitoring the concentration of the liquid obtained in the first evaporation. Specifically, by controlling the concentration of the liquid obtained in the first evaporation within the above-mentioned range, the sodium chloride in the waste water to be treated doesn't crystallize and precipitate in the first evaporation. Here, the concentration of the liquid obtained in the first evaporation is monitored by measuring the density of the liquid; specifically, the density may be measured with a densitometer.

According to a preferred embodiment of the present invention, before the waste water to be treated is treated by the first evaporation, the waste water to be treated performs first heat exchange with the first ammonia-containing vapor or first ammonia (condensate of the first ammonia-containing vapor) obtained from the first evaporation device. There is no particular restriction on the specific method of the first heat exchange; in other words, the first heat exchange may be executed in a conventional heat exchange method in the art. The heat exchange may be executed for one or more times, preferably 2-4 times, more preferably 2-3 times. Through the heat exchange, the outputted ammonia is further cooled, and the heat is circulated inside the treatment apparatus as far as possible; thus, the energy is utilized reasonably, and waste is reduced.

According to a preferred embodiment of the present invention, as shown in FIG. 2, the first heat exchange is executed by means of a first heat exchange device 31, a third heat exchange device 33, a fifth heat exchange device 35, and a second heat exchange device 32. Specifically, the first ammonia-containing vapor flows through the second heat exchange device 32 and the first heat exchange device 31 sequentially, the condensate of the second ammonia-containing vapor flows through the third heat exchange device 33, the second concentrated solution that contains sodium chloride crystal flows through the fifth heat exchange device 35; at the same time, the waste water to be treated flows through one or more of the first heat exchange device 31, the third heat exchange device 33 and the fifth heat exchange device 35, and flows through the second heat exchange device 32 to execute the first heat exchange with the first ammonia-containing vapor for a second time.

According to a preferred embodiment of the present invention, as shown in FIG. 3, the first heat exchange is executed by means of the first heat exchange device 31, the third heat exchange device 33, and the fifth heat exchange device 35. Specifically, the condensate of the first ammonia-containing vapor flows through the first heat exchange device 31, the condensate of the second ammonia-containing vapor (second ammonia at high temperature) obtained in the second evaporation device 1 flows through the third heat exchange device 33, and a part of the concentrated solution obtained in the second evaporation device 1 flows through the fifth heat exchange device 35; one part of the waste water to be treated flows through the first heat exchange device 31, another part of the waste water to be treated flows through the third heat exchange device 33, and the remaining part of the waste water to be treated flows through the fifth heat exchange device 35; then, the three parts of waste water to be treated are merged.

Through the first heat exchange, the waste water to be treated is heated up so that it can be evaporated more easily; at the same time, the first ammonia-containing vapor is cooled to obtain first ammonia, which may be stored in a first ammonia storage tank 51; besides, the condensate of the second ammonia-containing vapor is cooled to obtain second ammonia, which may be stored in a second ammonia storage tank 52; in addition, the second concentrated solution is cooled to facilitate the low temperature treatment.

According to a preferred embodiment of the present invention, as shown in FIG. 3, the first ammonia-containing vapor obtained in the evaporation in the last evaporator (the fourth evaporator 2d) in the first evaporation device 2 exchanges heat with a cooling medium in the second heat exchange device 32, and thereby ammonia is obtained and stored in a first ammonia storage tank 51. Wherein the cooling medium may be cooling water or glycol water solution, etc. In the case that ordinary cooling water is used, the cooling water is circulated and reused; in the case that the waste water containing ammonium salts is used as cooling water, preferably the waste water containing ammonium salts is directly returned to the treatment process after heat exchange (e.g., returned to the first pH adjustment procedure).

In the present invention, there is no particular restriction on the first heat exchange device 31, the second heat exchange device 32, the third heat exchange device 33, and the fifth heat exchange device 35. In other words, those heat exchangers may be conventional heat exchangers in the art, as long as they can attain the purpose of performing the first heat exchange with the waste water to be treated. Specifically, the heat exchange unit may be a jacket-type heat exchanger, plate-type heat exchanger, or shell and tube heat exchanger, etc., preferably is a plate-type heat exchanger. The material of the heat exchanger may be selected as required. For example, to resist erosion of chloride ions, a heat exchanger made of duplex stainless steel, titanium and titanium alloy, or hastelloy may be selected. At a low temperature, a heat exchanger made of plastic material may be selected.

According to the present invention, to take full advantage of the heat energy in the first ammonia-containing vapor, preferably, through the first heat exchange, the temperature of the waste water to be treated is 50° C.-370° C., more preferably is 72° C.-182° C., further preferably is 85° C.-137° C., still further preferably is 102° C.-112° C.

In the present invention, there is no particular restriction on the pH adjustment method. For example, the pH of the waste water to be treated may be adjusted by adding an alkaline substance. There is no particular restriction on the alkaline substance, as long as the alkaline substance can attain the purpose of adjusting the pH. To avoid introducing any new impurity into the waste water to be treated and improve the purity of the obtained crystal, the alkaline substance preferably is NaOH.

The alkaline substance may be added with a conventional method in the art. However, preferably the alkaline substance is mixed in the form of water solution with the waste water to be treated. For example, water solution that contains the alkaline substance may be charged into a pipeline through which the waste water to be treated is inputted.

There is no particular restriction on the content of the alkaline substance in the water solution, as long as the water solution can attain the purpose of adjusting the pH. However, to reduce the amount of water and further reduce the cost, preferably saturated water solution of the alkaline substance is used. To monitor the pH of the waste water to be treated, the pH of the waste water to be treated may be measured after the pH adjustment.

According to a preferred embodiment of the present invention, as shown in FIG. 2, the first evaporation process is performed in the first evaporation device 2. Specifically, before the waste water to be treated is loaded into the first heat exchange device 31, the third heat exchange device 33, or the fifth heat exchange device 35 for the first heat exchange, pH adjustment is made for the first time by introducing water solution that contains the alkaline substance into the pipeline through which the waste water to be treated is loaded into the heat exchange device and mixing the materials therein; then, the waste water to be treated is loaded into the second heat exchange device 32 for the first heat exchange, and pH adjustment is made for the second time by introducing the water solution that contains the alkaline substance into the pipeline through which the waste water to be treated is loaded into the second heat exchange device 32 and mixing the materials therein.

According to a preferred embodiment of the present invention, as shown in FIG. 3, the first evaporation process is performed in the first evaporation device 2. Before the waste water to be treated is loaded into the first heat exchange device 31, the third heat exchange device 33, or the fifth heat exchange device 35 for the first heat exchange, pH adjustment is made for the first time by introducing water solution that contains the alkaline substance into the main pipeline through which the waste water to be treated is loaded into the first heat exchange device 31, the third heat exchange device 33 and the fifth heat exchange device 35 and mixing the materials therein; then, pH adjustment is made for the second time by introducing the water solution that contains the alkaline substance into the pipeline through which the waste water to be treated is loaded into the first evaporation device 2.

Through twice pH adjustments, the pH of the waste water to be treated is adjusted to be greater than 9, preferably greater than 10.8, before the waste water to be treated is loaded into the first evaporation device 2. Preferably, through the first pH adjustment, the pH of the waste water to be treated is adjusted to be greater than 7 (preferably is 7-9); through the second pH adjustment, the pH of the waste water to be treated is adjusted to be greater than 9 (preferably is greater than 10.8). According to the present invention, preferably, the pH of the waste water to be treated is adjusted to be greater than 7 before the first heat exchange.

To detect the pH after the first pH adjustment and the second pH adjustment, preferably a first pH measuring device 61 is provided in the main pipeline through which the waste water to be treated is loaded into the first heat exchange device 31 to measure the pH after the first pH adjustment, and a second pH measuring device 62 is provided in the pipeline through which the waste water to be treated is loaded into the first evaporation device 2 to measure the pH after the second pH adjustment.

According to the present invention, the method may further comprise crystallizing the first concentrated solution that contains sodium sulfate crystal in a crystallization device to obtain crystal slurry that contains sodium sulfate crystal. In that case, the evaporation conditions of the first evaporation shall ensure that the sodium sulfate crystallizes and precipitates in the crystallization device while the sodium chloride doesn't precipitate. There is no particular restriction on the crystallization device. For example, the crystallization device may be a crystal-liquid tank, crystal-liquid collection tank, thickener with a stirrer, or thickener without stirrer, etc. According to a preferred embodiment of the present invention, the crystallization is performed in a crystal-liquid collection tank 56. There is no particular restriction on the conditions of the crystallization. For example, the conditions of the crystallization may include: temperature: 45° C. or above, preferably 95° C.-107° C., more preferably 85° C.-105° C.; crystallization time: 5 min.-24 h, preferably 5 min.-30 min. According to the present invention, alternatively, the crystallization process of the first concentrated solution that contains sodium sulfate crystal may be performed in a first evaporation device with a crystallizer (e.g., a forced circulation evaporating crystallizer). In that case, the crystallization temperature is the temperature of the first evaporation. In the present invention, the crystallization temperature preferably is the same as the temperature of the first evaporation.

According to the present invention, if crystallization is performed in a separate crystallization device, the first evaporation must further ensure that the sodium chloride doesn't crystallize and precipitate (i.e., the sodium chloride is not over-saturated); preferably, through the first evaporation, the concentration of sodium chloride in the first concentrated solution is X or lower (preferably 0.999X or lower, more preferably 0.95X-0.999X, further preferably 0.99X-0.9967X), where, X is the concentration of sodium chloride in the first concentrated solution when both sodium chloride and sodium sulfate are saturated under the conditions of the crystallization.

In the present invention, through first solid-liquid separation of the first concentrated solution that contains sodium sulfate crystal, sodium sulfate crystal and first mother liquid (i.e., a liquid phase obtained in the first solid-liquid separation) are obtained. There is no particular restriction on the method of the first solid-liquid separation. For example, the method may be selected from one or more of centrifugation, filtering, and sedimentation.

According to the present invention, the first solid-liquid separation may be performed in a first solid-liquid separation device (e.g., centrifugal machine, band filter, or plate and frame filter, etc.). After the first solid-liquid separation, the first mother liquid obtained in the first solid-liquid separation device 91 is stored temporarily in a first mother liquid tank 53, and may be pumped by a sixth circulation pump 76 into the second evaporation device 1 for the second evaporation. Besides, it is inevitable that the obtained sodium sulfate crystal has some impurities absorbed thereon, such as chloride ions, free ammonia, and hydroxyl ions, etc. Preferably, the sodium sulfate crystal is washed in first washing with water, the waste water containing ammonium salts, or sodium sulfate solution and dried, to remove the absorbed impurities, reduce off-odor of the solid salt, decrease causticity, and improve the purity of the crystal. To prevent the sodium sulfate crystal from dissolved in the washing process, preferably, the sodium sulfate crystal is washed with sodium sulfate solution. More preferably, the concentration of the sodium sulfate solution preferably is the concentration of sodium sulfate in water solution where sodium chloride and sodium sulfate are saturated at the same time at the temperature corresponding to the sodium sulfate crystal to be washed.

There is no particular restriction on the specific method for the first solid-liquid separation and the first washing. For example, the first solid-liquid separation and the first washing may be executed with conventional elutriation apparatus and solid-liquid separation apparatus in combination, or may be executed in a staged solid-liquid separation apparatus, such as a band filter. Preferably, the first washing comprises elutriation and/or elution. There is no particular restriction on the elutriation and elution. In other words, they can be executed with a conventional method in the art. There is no particular restriction on the number of cycles of the elutriation and elution. For example, one cycle or more may be selected. To obtain sodium sulfate crystal at higher purity, preferably the elutriation and elution are executed for 2-4 cycles. In the elutriation process, the elutriation liquid usually is not reused by circulation if the waste water containing ammonium salts is used as the elutriating liquid; or the elutriation liquid may be reused by counter-current circulation if the washing liquid recycled in the first washing is used as the elutriating liquid. Before the elutriation is executed, preferably preliminary solid-liquid separation is executed by sedimentation to obtain slurry that contains sodium sulfate crystal (as long as the liquid content is 35 mass % or lower; this step preferably is executed in an apparatus known in the art, such as a sedimentation basin or sedimentation tank, etc.). In the elutriation process, in relation to 1 pbw (parts by weight) slurry that contains sodium sulfate crystal, the liquid used for the elutriation is 1-20 pbw. The elution preferably is executed with sodium sulfate solution. To further improve the effect of the elutriation and obtain sodium sulfate crystal at higher purity, the washing is executed preferably with the liquid obtained in the elution, more preferably with water or sodium sulfate solution. The liquid produced in the washing preferably is returned to a position before the pH adjustment is finished before the first evaporation. For example, the liquid may be returned to the second pH adjustment process through an eighth circulation pump 78, and then fed into the first evaporation device 2.

According to a preferred embodiment of the present invention, the first concentrated solution that contains sodium sulfate, which is obtained in the evaporation in the first evaporation device 2, is treated through preliminary solid-liquid separation by sedimentation, the treated first concentrated solution is elutriated for the first time with the waste water containing ammonium salts in an elutriation tank, then is elutriated for the second time with the liquid obtained in the follow-up sodium sulfate crystal washing in another elutriation tank, and finally the slurry obtained through twice elutriations is loaded into a solid-liquid separation device for solid-liquid separation; then, the crystal obtained in the solid-liquid separation is eluted with sodium sulfate solution, and the liquid obtained in the elution is returned to the second elutriation. Through the above washing process, the purity of the obtained sodium sulfate crystal is improved, no excessive washing liquid is introduced into the system, and the efficiency of the waste water treatment is improved.

In the present invention, the evaporation conditions of the second evaporation may be selected appropriately as required.

According to a preferred embodiment of the present invention, in the case that the low temperature treatment is not performed, the second evaporation attains a purpose of causing the sodium chloride to crystallize and precipitate while preventing the sodium sulfate from precipitating. The conditions of the second evaporation may include: temperature: 30° C.-85° C.; pressure: −98 kPa--58 kPa. in consideration of improving evaporation efficiency and reducing equipment cost and energy consumption, preferably, the conditions of the second evaporation include: temperature: 35° C.-60° C.; pressure: −97.5 kPa--87 kPa; preferably, the conditions of the second evaporation include: temperature: 40° C.-60° C.; pressure: −97 kPa--87 kPa; preferably, the conditions of the second evaporation include: temperature: 45° C.-60° C.; pressure: −95 kPa--87 kPa; preferably, the conditions of the second evaporation include: temperature: 45° C.-55° C.; pressure: −95 kPa--90 kPa.

By performing the second evaporation under the above conditions, sodium sulfate doesn't crystallize while sodium chloride crystallizes, and thereby the purity of the obtained sodium chloride crystal is ensured.

In the above case that the low temperature treatment is not performed, the second evaporation ensures that the sodium sulfate in the second concentrated solution doesn't crystallize and precipitate (i.e., the sodium sulfate is not oversaturated); preferably, through the second evaporation, the concentration of sodium sulfate in the second concentrated solution is Y or lower (preferably 0.9Y-0.99Y, more preferably 0.95Y-0.98Y), where, Y is the concentration of sodium sulfate in the second concentrated solution when both sodium sulfate and sodium chloride are saturated under the conditions of the second evaporation. By controlling the degree of the second evaporation within the above-mentioned range, sodium chloride crystallizes and precipitates as far as possible while sodium sulfate doesn't precipitate. By causing the sodium chloride to crystallize in the second evaporation as far as possible, the waste water treatment efficiency can be improved, and energy waste can be reduced.

In the present invention, to attain the purpose that the sodium chloride doesn't crystallize and precipitate in the first evaporation and the sodium sulfate crystal doesn't crystallize and precipitate in the second evaporation, preferably the conditions of the first evaporation and the second evaporation meet: the temperature of the first evaporation is higher than the temperature of the second evaporation by 5° C. or above, preferably higher by 20° C. or above, more preferably higher by 35° C.-70° C., particularly preferably higher by 40° C.-60° C. By controlling the temperature of the first evaporation and the temperature of the second evaporation, the sodium sulfate and the sodium chloride crystallize and precipitate respectively, and thereby the purity of the obtained sodium sulfate and sodium chloride crystal is improved.

According to a preferred embodiment of the present invention, in the case that the low temperature treatment is performed, the second evaporation attains a purpose of ensuring there is no sodium sulfate crystal in the treated liquid. The conditions of the second evaporation may include: temperature: 35° C. or above; pressure: −95 kPa or above; in consideration of improving evaporation efficiency and reducing equipment cost and energy consumption, preferably, the conditions of the second evaporation include: temperature: 45° C.-175° C.; pressure: −95 kPa-18110 kPa; preferably, the conditions of the second evaporation include: temperature: 45° C.-175° C.; pressure: −95 kPa-653 kPa; preferably, the conditions of the second evaporation include: temperature: 60° C.-175° C.; pressure: −87 kPa-18110 kPa; preferably, the conditions of the second evaporation include: temperature: 60° C.-175° C.; pressure: −87 kPa-653 kPa; preferably, the conditions of the second evaporation include: temperature: 75° C.-175° C.; pressure: −73 kPa-653 kPa; preferably, the conditions of the second evaporation include: temperature: 80° C.-130° C.; pressure: −66 kPa-117 kPa; preferably, the conditions of the second evaporation include: temperature: 95° C.-110° C.; pressure: −37 kPa-12 kPa;

preferably, the conditions of the second evaporation include: temperature: 100° C.-110° C.; pressure: −23 kPa-12 kPa.

By performing the second evaporation under the above-mentioned conditions, the evaporation efficiency can be improved, and the energy consumption can be reduced. The sodium sulfate crystal in the concentrated solution is fully dissolved through the low temperature treatment while a maximum amount of evaporation (concentration multiple) is ensured, so as to ensure the purity of the obtained sodium chloride crystal.

In the present invention, the operating pressure of the second evaporation preferably is the saturated vapor pressure of the evaporated feed liquid.

In addition, the amount of evaporation in the second evaporation may be selected appropriately according to the processing capacity of the apparatus and the amount of the waste water to be treated. For example, the amount of evaporation may be 0.1 m$^3$/h or more (e.g., 0.1 m$^3$/h-500 m$^3$/h).

In the above case that the low temperature treatment is performed, the second evaporation ensures that the sodium chloride in the liquid phase obtained in the first solid-liquid separation crystallizes and precipitate; preferably the sodium chloride and sodium sulfate in the liquid phase obtained in the first solid-liquid separation crystallize and precipitate at the same time, then treated solution that contains sodium chloride crystal at higher purity is obtained through the low temperature treatment. Preferably, through the second evaporation, the concentration of sodium sulfate in the treated solution is Y' or lower (preferably 0.9Y'-0.99Y', more preferably 0.95Y'-0.98Y'), wherein Y' is the concentration of sodium sulfate in the treated solution when both sodium sulfate and sodium chloride are saturated under the conditions of the low temperature treatment. By controlling the degree of the second evaporation within the above-mentioned range, sodium chloride crystallizes and precipitates as far as possible while the precipitating sodium sulfate is fully dissolved under the conditions of the low temperature treatment. By causing the sodium chloride to crystallize in the second evaporation as far as possible, the waste water treatment efficiency can be improved, and energy waste can be reduced.

In the present invention, the degree of the second evaporation is ascertained by monitoring the amount of evaporation (or amount of the condensate) in the second evaporation or the concentration of the concentrated solution. Specifically, if the degree of the second evaporation is ascertained by measuring the amount of evaporation, a concentration multiple is controlled by controlling the amount of evaporation (i.e., the amount of secondary steam or amount of ammonia), and the degree of concentration by evaporation is monitored by measuring the amount of evaporation, so that the sodium sulfate precipitating in the concentrated solution obtained in the evaporation can be dissolved through the low temperature treatment. Specifically, a mass flowmeter may be used to measure the flow and thereby measure the amount of the secondary steam; or the amount of the condensate may be measured; if the degree of the second evaporation is ascertained by measuring the concentration, the sodium sulfate in the concentrated solution doesn't crystallize and precipitate in the evaporation by controlling the concentration of the concentrated solution obtained in the evaporation with the above-mentioned range, and the concentration of the liquid obtained through the evaporation is monitored by measuring the density; specifically, a densitometer may be used to measure the density.

According to a preferred embodiment of the present invention, the second evaporation process is executed in the second evaporation device 1, the first mother liquid is charged into the second evaporation device 1 with a sixth circulation pump 76 for the second evaporation, to obtain second ammonia-containing vapor and second concentrated solution that contains sodium chloride crystal.

According to the present invention, there is no particular restriction on the low temperature treatment method, as long as the temperature is controlled appropriately in the low temperature treatment so that the sodium sulfate crystal in the second concentrated solution that contains sodium chloride crystal obtained in the second evaporation is dissolved. Preferably, the temperature of the low temperature treatment is lower than the temperature of the second evaporation. Specifically, the conditions of the low temperature treatment may include: temperature: 13° C.-100° C., preferably 15° C.-45° C., more preferably 15° C.-35° C., further preferably 17.9° C.-35° C., still further preferably 20° C.-30° C.; for example, the temperature may be 18° C., 19° C., 20° C., 21° C., 22° C., 23° C., 24° C., 25° C., 26° C., 27° C., 28° C., 29° C., 30° C., 31° C., 32° C., 33° C., 34° C., 35° C., 36° C., 37° C., 38° C., 39° C., 40° C., 41° C., 42° C., 43° C., 44° C., 45° C., 46° C., 47° C., 48° C., 49° C., 50° C., 55° C. or 60° C. To ensure the effect of the low temperature treatment, the retention time of the low temperature treatment may be 10 min.-600 min., preferably is 20 min.-300 min., more preferably is 50 min.-70 min., even more preferably is 55 min.-65 min.

In the present invention, by controlling the conditions of the second evaporation and the low temperature treatment, the second evaporation may be executed at a higher vaporization temperature and an evaporation pressure closer to normal pressure, so as to avoid the problem of low efficiency of evaporation at a lower temperature; thus, the vaporization efficiency can be improved, the energy consumption in the evaporation process can be reduced, and the waste water treatment speed can be improved. On that basis, the temperature control for the low temperature treatment is easier and simpler, and the low temperature treatment may be executed at a temperature lower than the evaporation temperature (e.g., 45° C. or lower), to further facilitate dissolution of sodium sulfate and precipitation of sodium chloride.

In the present invention, the low temperature treatment may be performed in any conventional cooling device in the art. For example, a low temperature treatment tank 55 may be used. Preferably, the low temperature treatment tank 55 may be equipped with a cooling component in it; specifically, the cooling component may be a component that introduces cooling water. With the cooling component, the second concentrated solution in the low temperature treatment tank can be cooled quickly. Preferably, the low temperature treatment tank 55 may be equipped with a stirring component in it. Under the stirring action of the stirring component, the solid phase and liquid phase distribution and the temperature distribution in the second concentrated solution are uniform, and a purpose that the sodium sulfate crystal is dissolved fully and the sodium chloride crystal precipitates as far as possible is attained.

In the present invention, to attain the purpose that the sodium chloride doesn't crystallize and precipitate in the first evaporation and the sodium sulfate crystal that has precipitated in the second evaporation can be dissolved in the low temperature treatment process, preferably the conditions of the first evaporation and the low temperature treatment meet: the temperature of the first evaporation is higher than the temperature of the low temperature treatment by 5° C. or more, preferably higher by 20° C. or more, more preferably higher by 35° C.-90° C., further preferably higher by 35° C.-70° C., particularly preferably higher by 50° C.-60° C. By controlling the temperature of the first evaporation and the temperature of the low temperature treatment, the sodium sulfate crystallizes and precipitates separately in the first evaporation, and the sodium sulfate can be dissolved in the low temperature treatment if sodium sulfate crystal and sodium chloride crystal have precipitated in the second evaporation, and thereby the purity of the obtained sodium sulfate and sodium chloride crystal is improved.

According to a preferred embodiment of the present invention, as shown in FIG. 3, the second ammonia-containing vapor obtained in the evaporation in the second evaporation device 1 performs the second heat exchange with the first mother liquid (or mixed solution of the first mother liquid, the circulating liquid and the second eluent) in the fourth heat exchange device 34, and second ammonia is obtained. According to the present invention, after the second heat exchange, the temperature of the first mother liquid (or mixed solution of the first mother liquid, the circulating liquid and the second eluent) is 35° C. or above, preferably is 50° C.-200° C., further preferably is 75° C.-184° C., still further preferably is 102° C.-117° C.

There is no particular restriction on the fourth heat exchange device 34. In other words, the fourth heat exchange device 34 may be any conventional heat exchanger in the art, as long as it can attain the purpose of condensing the second ammonia-containing vapor. Specifically, the heat exchanger may be a jacket-type heat exchanger, a plate-type heat exchanger, shell and tube heat exchanger, or spiral screwed tube heat exchanger, etc. The material of the heat exchanger may be selected as required. For example, since the secondary steam is not corrosive to stainless steel, preferably a stainless steel spiral screwed tube heat exchanger is used.

In the present invention, the second concentrated solution that contains sodium chloride crystal or the treated solution obtained in the low temperature treatment are treated by second solid-liquid separation to obtain sodium chloride crystal and second mother liquid (i.e., a liquid phase obtained in the second solid-liquid separation). There is no particular restriction on the method of the second solid-liquid separation. For example, the method may be selected from one or more of centrifugation, filtering, and sedimentation.

According to the present invention, the second solid-liquid separation may be performed in a second solid-liquid separation device (e.g., centrifugal machine, band filter, or plate and frame filter, etc.).

After the second solid-liquid separation, the second mother liquid obtained in the second solid-liquid separation device 92 is temporarily stored in a second mother liquid tank 54, and may be returned to the first evaporation device 2 for the first evaporation again. Specifically, the second mother liquid may be returned by means of a ninth circulation pump 79 to a position before the first pH adjustment or the second pH adjustment and is mixed with the waste water containing ammonium salts to obtain the waste water to be treated. Besides, it is inevitable that the obtained sodium chloride crystal has some impurities absorbed thereon, such as sulfate ions, free ammonia, and hydroxyl ions, etc. Preferably, the sodium chloride crystal is washed in a second washing with water, the waste water containing ammonium salts, or sodium chloride solution and dried, to remove the absorbed impurities, reduce off-odor of the solid salt, decrease causticity, and improve the purity of the crystal.

To prevent the sodium chloride crystal from dissolved in the washing process, preferably, the sodium chloride crystal is washed with sodium chloride solution. More preferably, the concentration of the sodium chloride solution preferably is the concentration of sodium chloride in water solution where sodium chloride and sodium sulfate are saturated at the same time at the temperature corresponding to the sodium chloride crystal to be washed.

There is no particular restriction on the specific method for the second solid-liquid separation and the second washing. For example, the second solid-liquid separation and the second washing may be executed with conventional elutriation apparatus and solid-liquid separation apparatus in combination, or may be executed in a staged solid-liquid separation apparatus, such as a band filter. Preferably, the second washing comprises elutriation and/or elution. There is no particular restriction on the elutriation and elution. In other words, they can be executed with a conventional method in the art. There is no particular restriction on the number of cycles of the elutriation and elution. For example, one cycle or more may be selected. To obtain sodium chloride crystal at higher purity, preferably the elutriation and elution are executed for 2-4 cycles. In the elutriation process, the elutriation liquid usually is not reused by circulation if the waste water containing ammonium salts is used as the elutriating liquid; or the elutriation liquid may be reused by counter-current circulation if the washing liquid recycled in the second washing is used as the elutriating liquid. Before the elutriation is executed, preferably preliminary solid-liquid separation is executed by sedimentation to obtain slurry that contains sodium chloride crystal (as long as the liquid content is 35 mass % or lower; this step preferably is executed in an apparatus known in the art, such as a sedimentation basin or sedimentation tank, etc.). In the elutriation process, in relation to 1 pbw slurry that contains sodium chloride crystal, the liquid used for the elutriation is 1-20 pbw. The elution preferably is executed with sodium chloride solution (the concentration of the sodium chloride solution preferably is the concentration of sodium chloride in water solution where both sodium chloride and sodium sulfate are saturated at the temperature corresponding to the sodium chloride crystal to be washed). To further improve the effect of the elutriation and obtain sodium chloride crystal at higher purity, the washing is executed preferably with the liquid obtained in the elution. For the liquid produced in the washing, preferably the elutriant of the waste water containing ammonium salts is returned to a position before the second pH adjustment before the evaporation in the first evaporation device, and other washing liquids are returned to the second evaporation device. For example, as shown in FIG. 3, the liquid is returned by means of a tenth circulation pump 80 to the second evaporation device 1 for the second evaporation again.

According to a preferred embodiment of the present invention, the second concentrated solution that contains sodium chloride crystal or the treated solution is treated through preliminary solid-liquid separation by sedimentation, the obtained solution is elutriated for the first time with the waste water containing ammonium salts in an elutriation tank, then is elutriated for the second time with the liquid obtained in the follow-up sodium chloride crystal washing in another elutriation tank, and finally the slurry obtained through twice elutriations is loaded into the second solid-liquid separation device for solid-liquid separation; then, the crystal obtained in the solid-liquid separation is eluted with sodium chloride solution (the concentration of the sodium chloride solution is the concentration of sodium chloride in water solution where both sodium chloride and sodium sulfate are saturated at the temperature corresponding to the sodium chloride crystal to be washed), and the liquid obtained in the elution is returned as elutriant to the second elutriation. Through the above washing process that incorporates elutriation and elution, the purity of the obtained sodium chloride crystal is improved, no excessive washing liquid is introduced into the system, and the efficiency of the waste water treatment is improved.

In the present invention, when MVR evaporation devices are used to perform the first evaporation and/or second evaporation, to improve the content of solids in the MVR evaporation device and decrease the ammonia content in the liquid, preferably a part of the liquid (i.e., the liquid in the MVR evaporation device, hereinafter also referred to as circulating liquid) after evaporation in the MVR evaporation device is heated and then circulated to the MVR evaporation device for evaporation. There is no particular restriction on the proportion of the part of liquid circulated to the MVR evaporation device after the evaporation in the MVR evaporation device. For example, the first recirculation ratio for the first evaporation may be 10-200, preferably is 40-100; the second recirculation ratio for the second evaporation may be 0.1-100, preferably is 5-50. Here, the recirculation ratio refers to the ratio of the recirculated amount to the difference of total amount of liquid in the MVR evaporation device and the recirculated amount. Preferably, the first circulating liquid in the first evaporation is returned to a position before the pH adjustment is finished before the first evaporation. As shown in FIG. 2, the first circulating liquid may be returned by means of a second circulation pump 72 to the waste water transport pipeline between the first heat exchange device 31 and the second heat exchange device 32 and mixed with the waste water to be treated therein, and then the obtained mixture is treated by the second pH adjustment, performs heat exchange in the second heat exchange device 32, and finally is fed into the first evaporation device 2. Preferably, the second circulating liquid in the second evaporation is returned to a position before the second heat exchange is finished. As shown in FIG. 2, the second circulating liquid may be returned by means of a seventh circulation pump 77 to the fourth heat exchange device 34 for heat exchange, and finally is fed into the second evaporation device 1.

In the present invention, if MVR evaporation devices are used to perform the first evaporation and/or the second evaporation, the method further comprises compressing the first ammonia-containing vapor and/or the second ammonia-containing vapor. The compression may be executed with a compressor, such as a first compressor 101 and a second compressor 102. By compressing the ammonia-containing vapor, energy is fed into the MVR evaporation system to ensure that the waste water temperature rise-evaporation-temperature drop process is executed continuously. Initiation steam has to be inputted for initiating the MVR evaporation process, but the energy is solely supplied by means of the compressors in the continuous operation state, without any other energy input. The compressors may be conventional compressors in the art, such as centrifugal compressors, turbine compressors, or roots compressors, etc. Through compression with the compressors, the temperature of the ammonia-containing vapor is increased by 5° C.-20° C.

According to a preferred embodiment of the present invention, after the first ammonia-containing vapor is treated by the first heat exchange and condensation, the remaining tail gas is treated by ammonia removal and then is vented; after the second ammonia-containing vapor is treated by the second heat exchange and condensation, the remaining tail gas is treated by ammonia removal and then is vented. The remaining tail gas after the first ammonia-containing vapor is treated by the first heat exchange and condensation is the tail gas discharged from the second heat exchange device 32, and the remaining tail gas after the second ammonia-containing vapor is treated by the second heat exchange and condensation is the tail gas discharged from the fourth heat exchange device 34. By removing ammonia from the above-mentioned tail gas, the content of pollutants in the tail gas can be further decreased, so that the tail gas can be vented directly.

The present invention further provides a method for treating waste water containing ammonium salts that contains $NH_4^+$, $SO_4^{2-}$, $Cl^-$ and $Na^+$, which comprises the following steps:

1) treating waste water to be treated by third evaporation, to obtain third ammonia-containing vapor and third concentrated solution that contains sodium chloride crystal, wherein the waste water to be treated contains the waste water containing ammonium salts;

2) treating the third concentrated solution that contains sodium chloride crystal by third solid-liquid separation, and treating the liquid phase obtained in the third solid-liquid separation by fourth evaporation, to obtain fourth ammonia-containing vapor and fourth concentrated solution that contains sodium sulfate crystal;

3) treating the fourth concentrated solution that contains sodium sulfate crystal by fourth solid-liquid separation;

wherein the pH of the waste water to be treated is adjusted to a value greater than 9, before the waste water to be treated is treated by the third evaporation; in the fourth evaporation, sodium chloride doesn't crystallize and precipitate; in relation to 1 mol $SO_4^{2-}$ contained in the waste water to be treated, the $Cl^-$ contained in the waste water to be treated is 7.15 mol or more.

Preferably, the waste water to be treated is the waste water containing ammonium salts; or the waste water to be treated contains the waste water containing ammonium salts and the liquid phase obtained in the fourth solid-liquid separation.

More preferably, the waste water to be treated is mixed solution of the waste water containing ammonium salts and at least a part of the liquid phase obtained in the fourth solid-liquid separation.

Further preferably, the waste water to be treated is mixed solution of the waste water containing ammonium salts and the liquid phase obtained in the fourth solid-liquid separation.

Preferably, the pH of the waste water to be treated is adjusted to a value greater than 10.8, before the waste water to be treated is treated by the third evaporation. Besides, there is no particular restriction on the upper limit of the pH of the waste water to be treated. For example, the pH may be 14 or lower, preferably is 13.5 or lower, more preferably is 13 or lower.

The method provided in the present invention can treat waste water that contains $NH_4^+$, $SO_4^{2-}$, $Cl^-$ and $Na^+$, and there is particular restriction on the waste water containing ammonium salts, except that the waste water contains $NH_4^+$, $SO_4^{2-}$, $Cl^-$ and $Na^+$. In consideration of improving the waste water treatment efficiency, in relation to 1 mol $SO_4^{2-}$ contained in the waste water to be treated, the $Cl^-$ contained in the waste water to be treated is 7.15 mol or more, preferably is 9.5 mol or more, more preferably is 10 mol or more, preferably is 50 mol or less, more preferably is 40 mol or less, further preferably is 30 mol or less, such as 8-20 mol, preferably 8-12 mol, preferably 11-20 mol, more preferably 10-12 mol or 11-15 mol. By controlling the molar ratio of $SO_4^{2-}$ to $Cl^-$ within the above-mentioned range, sodium chloride precipitates fully in third evaporation, and thereby a purpose of separating sodium chloride efficiently is attained. In addition, as described above and below, in the present invention, the liquid phase obtained in the fourth solid-liquid separation may be circulated to the third evaporation stage, and thereby the molar ratio of $SO_4^{2-}$ to $Cl^-$ in the waste water to be treated is adjusted and sodium hydroxide balance is maintained.

According to a preferred embodiment of the present invention, in the case that the low temperature treatment is not performed, the third evaporation ensures that the sodium sulfate doesn't crystallize and precipitate, which means that the concentration of sodium sulfate in the mixed system doesn't exceed the solubility under the conditions of the third evaporation (including, but not limited to temperature and pH, etc.), without excluding sodium sulfate entrained in the sodium chloride crystal or absorbed to the surface of the sodium chloride crystal. Owing to the fact that the moisture content in the crystal after solid-liquid separation is different, usually the content of sodium sulfate in the obtained sodium chloride crystal is 8 mass % or lower (preferably 4 mass % or lower). In the present invention, it is deemed that the sodium sulfate doesn't crystallize and precipitate if the content of sodium sulfate in the obtained sodium chloride crystal is 8 mass % or lower.

According to another preferred embodiment of the present invention, the method further comprises: treating the third concentrated solution that contains sodium chloride crystal by low temperature treatment, to obtain treated solution that contains sodium chloride crystal; then treating the treated solution that contains sodium chloride crystal by third solid-liquid separation. Namely, the method comprises the following steps:

1) treating waste water to be treated by third evaporation, to obtain third ammonia-containing vapor and third concentrated solution that contains sodium chloride crystal, wherein the waste water to be treated contains the waste water containing ammonium salts;

2) treating the third concentrated solution that contains sodium chloride crystal by low temperature treatment, to obtain treated solution that contains sodium chloride crystal;

3) treating the treated solution that contains sodium chloride crystal by third solid-liquid separation, and treating the liquid phase obtained in the third solid-liquid separation by fourth evaporation, to obtain fourth ammonia-containing vapor and fourth concentrated solution that contains sodium sulfate crystal;

4) treating the fourth concentrated solution that contains sodium sulfate crystal by fourth solid-liquid separation.

In the above case that the low temperature treatment is performed, sodium chloride crystal precipitates in the third evaporation. In consideration of improving the treatment efficiency, preferably both sodium chloride crystal and sodium sulfate crystal precipitate in the third evaporation, and thereby third concentrated solution that contains sodium sulfate crystal and sodium chloride crystal is obtained. In the case that third concentrated solution that contains sodium sulfate crystal and sodium chloride crystal is obtained, the third evaporation must ensure that the sodium sulfate crystal will be dissolved in the low temperature treatment. Specifically, third concentrated solution that contains sodium sulfate crystal and sodium chloride crystal is obtained in the third evaporation, and the sodium sulfate crystal can be dissolved fully in the low temperature treatment. By controlling the amount of evaporation in the third evaporation, sodium sulfate and sodium chloride crystallize and precipitate at the same time (i.e., third concentrated solution that contains sodium sulfate crystal and sodium chloride crystal is obtained in the third evaporation), and then the sodium sulfate crystal in the third concentrated solution that contains sodium sulfate crystal and sodium chloride crystal is dissolved and the sodium chloride further crystallize and precipitate in the low temperature treatment, so that treated solution that only contains sodium chloride crystal is obtained.

The treated solution that contains sodium chloride crystal doesn't exclude the sodium sulfate entrained in the sodium chloride crystal or absorbed to the surface of the sodium chloride crystal. Owing to the fact that the moisture content in the crystal after solid-liquid separation is different, usually the content of sodium sulfate in the obtained sodium chloride crystal is 8 mass % or lower (preferably 4 mass % or lower). In the present invention, it is deemed that the sodium sulfate has been dissolved if the content of sodium sulfate in the obtained sodium chloride crystal is 8 mass % or lower.

In the present invention, the fourth evaporation ensures that the sodium chloride doesn't crystallize and precipitate, which means that the concentration of sodium chloride in the mixed system is controlled so that it doesn't exceed the solubility under the conditions of the fourth evaporation (including, but not limited to temperature and pH, etc.), without excluding sodium chloride entrained in the sodium sulfate crystal or absorbed to the surface of the sodium sulfate crystal. Owing to the fact that the moisture content in the crystal after solid-liquid separation is different, usually the content of sodium chloride in the obtained sodium sulfate crystal is 8 mass % or lower (preferably 4 mass %). In the present invention, it is deemed that the sodium chloride doesn't crystallize and precipitate if the content of sodium chloride in the obtained sodium sulfate crystal is 8 mass % or lower.

In the present invention, it is understood that both the third ammonia-containing vapor and the fourth ammonia-containing vapor are secondary steam referred in the art. All the pressure values are gauge pressure values.

According to the present invention, there is no particular restriction on the specific execution of the third evaporation and the fourth evaporation, as long as the third evaporation and the fourth evaporation can attain the purpose of evaporation under corresponding evaporation conditions. For example, the third evaporation and the fourth evaporation may be executed respectively in a conventional evaporation device in the art. Specifically, the evaporation device may be one or more of MVR evaporation device, multi-effect evaporation device, single-effect evaporation device and flash evaporation device. Wherein the third evaporation preferably is executed in a MVR evaporation device; the fourth evaporation preferably is executed in a MVR evaporation device. The third evaporation may be executed in the first evaporation unit of the waste water treatment apparatus in FIG. 1, the fourth evaporation may be executed in the second evaporation unit of the waste water treatment apparatus in FIG. 1.

The types and uses of the MVR evaporation device, multi-effect evaporation device, single-effect evaporation device and flash evaporation device may be the same as those in the above-mentioned embodiment, and will not be further detailed here.

In the present invention, the conditions of the third evaporation may be selected appropriately as required.

According to a preferred embodiment of the present invention, in the case that the low temperature treatment is not performed, the third evaporation attains a purpose of causing the sodium chloride to crystallize and precipitate while preventing the sodium sulfate from precipitating. The conditions of the third evaporation may include: temperature: 30° C.-85° C.; pressure: −98 kPa-−58 kPa. To improve vaporization efficiency, preferably, the conditions of the third evaporation include: temperature: 35° C.-60° C.; pressure: −97.5 kPa-−87 kPa; preferably, the conditions of the third evaporation include: temperature: 40° C.-60° C.; pressure: −97 kPa-−87 kPa; preferably, the conditions of the third evaporation include: temperature: 45° C.-60° C.; pressure: −95 kPa-−87 kPa; preferably, the conditions of the third evaporation include: temperature: 45° C.-55° C.; pressure: −95 kPa-−90 kPa.

By performing the third evaporation under the above conditions, sodium sulfate doesn't crystallize while sodium chloride crystallizes, and thereby the purity of the obtained sodium chloride crystal is ensured.

In the above case that the low temperature treatment is not performed, the sodium sulfate in the waste water to be treated doesn't crystallize and precipitate in the third evaporation (i.e., the sodium sulfate is not over-saturated); preferably, through the third evaporation, the concentration of sodium sulfate in the third concentrated solution is Y or lower (preferably 0.9Y-0.99Y, more preferably 0.95Y-0.98Y), where, Y is the concentration of sodium sulfate in the third concentrated solution when both sodium chloride and sodium sulfate are saturated under the conditions of the third evaporation. By controlling the degree of the third evaporation within the above-mentioned range, sodium chloride crystallizes and precipitates as far as possible while sodium sulfate doesn't precipitate. By causing the sodium chloride to crystallize in the third evaporation as far as possible, the waste water treatment efficiency can be improved, and energy waste can be reduced.

According to a preferred embodiment of the present invention, in the case that the low temperature treatment is performed, the third evaporation attains a purpose of ensuring there is no sodium sulfate crystal in the treated liquid. The conditions of the third evaporation may include: temperature: 35° C. or above; pressure: −95 kPa or above. To improve vaporization efficiency, preferably, the conditions of the third evaporation include: temperature: 45° C.-175° C.; pressure: −95 kPa-18110 kPa; preferably, temperature: 45° C.-175° C.; pressure: −95 kPa-653 kPa; preferably, temperature: 60° C.-175° C.; pressure: −87 kPa-18110 kPa; preferably, temperature: 60° C.-175° C.; pressure: −87 kPa-653 kPa; preferably, temperature: 75° C.-175° C.; pressure: −73 kPa-653 kPa; preferably, temperature: 80° C.-130° C.; pressure: −66 kPa-117 kPa; preferably, temperature: 95° C.-110° C.; pressure: −37 kPa-12 kPa; preferably, temperature: 100° C.-110° C.; pressure: −23 kPa-12 kPa.

By performing the third evaporation under the above-mentioned conditions, the evaporation efficiency can be improved, and the energy consumption can be reduced. The sodium sulfate crystal in the third concentrated solution is fully dissolved through the low temperature treatment while a maximum amount of evaporation (concentration multiple) is ensured, so as to ensure the purity of the obtained sodium chloride crystal.

In the present invention, the operating pressure of the third evaporation preferably is the saturated vapor pressure of the evaporated feed liquid.

In the present invention, the flow rate of the third evaporation may be selected appropriately according to the processing capacity of the apparatus. For example, the flow rate may be 0.1 m³/h or higher (e.g., 0.1 m³/h-500 m³/h).

According to the present invention, by controlling the conditions of the third evaporation, 90 mass % or more (preferably 95 mass % or more) ammonia in the waste water to be treated can be evaporated, and thereby third ammonia at high concentration can be obtained. The third ammonia may be directly reused in the catalyst production process, or it may be neutralized with acid to obtain ammonium salt and then is reused in the form of the ammonium salt, or it can be blended with water and corresponding ammonium salt or ammonia and then reused.

In the above case that the low temperature treatment is performed, the sodium chloride in the waste water to be treated crystallizes and precipitates in the third evaporation; preferably, both the sodium chloride and the sodium sulfate in the waste water to be treated crystallize and precipitate at the same time in the third evaporation, so that treated solution that contains sodium chloride crystal at higher purity is obtained through the low temperature treatment. Preferably, through the third evaporation, the concentration of sodium sulfate in the treated solution is Y' or lower (preferably 0.9Y'-0.99Y', more preferably 0.95Y'-0.98Y'), wherein Y' is the concentration of sodium sulfate in the treated solution when both sodium chloride and sodium sulfate are saturated under the conditions of the low temperature treatment. By controlling the degree of the third evaporation within the above-mentioned range, sodium chloride crystallizes and precipitates as far as possible while sodium sulfate is dissolved through the low temperature treatment. By causing the sodium chloride to crystallize in the third evaporation as far as possible, the waste water treatment efficiency can be improved, and energy waste can be reduced.

In the present invention, the degree of the third evaporation is ascertained by monitoring the amount of evaporation (or amount of the condensate) in the third evaporation or the concentration of the concentrated solution. Specifically, if the degree of the second evaporation is ascertained by measuring the amount of evaporation, a concentration multiple is controlled by controlling the amount of evaporation (i.e., the amount of secondary steam or amount of ammonia), and the degree of concentration by evaporation is monitored by measuring the amount of evaporation, so that the sodium sulfate precipitating in the concentrated solution obtained in the evaporation can be dissolved through the low temperature treatment. Specifically, a mass flowmeter may be used to measure the flow and thereby measure the amount of the secondary steam; or the amount of the condensate may be measured; if the degree of the second evaporation is ascertained by measuring the concentration, the sodium sulfate in the concentrated solution doesn't crystallize and precipitate in the evaporation by controlling the concentration of the concentrated solution obtained in the evaporation with the above-mentioned range, and the concentration of the liquid obtained through the evaporation is monitored by measuring the density; specifically, a densitometer may be used to measure the density.

According to a preferred embodiment of the present invention, before the waste water to be treated is treated by the third evaporation, the waste water to be treated performs first heat exchange with the third ammonia-containing vapor or the third ammonia (condensate of the third ammonia-containing vapor). There is no particular restriction on the specific method of the first heat exchange; in other words, the first heat exchange may be executed in a conventional heat exchange method in the art. The first heat exchange may be executed for one or more times, preferably 2-4 times, more preferably 2-3 times. Through the first heat exchange, the outputted ammonia is cooled, and the heat is circulated inside the treatment apparatus as far as possible; thus, the energy is utilized reasonably, and waste is reduced.

Figure 6:
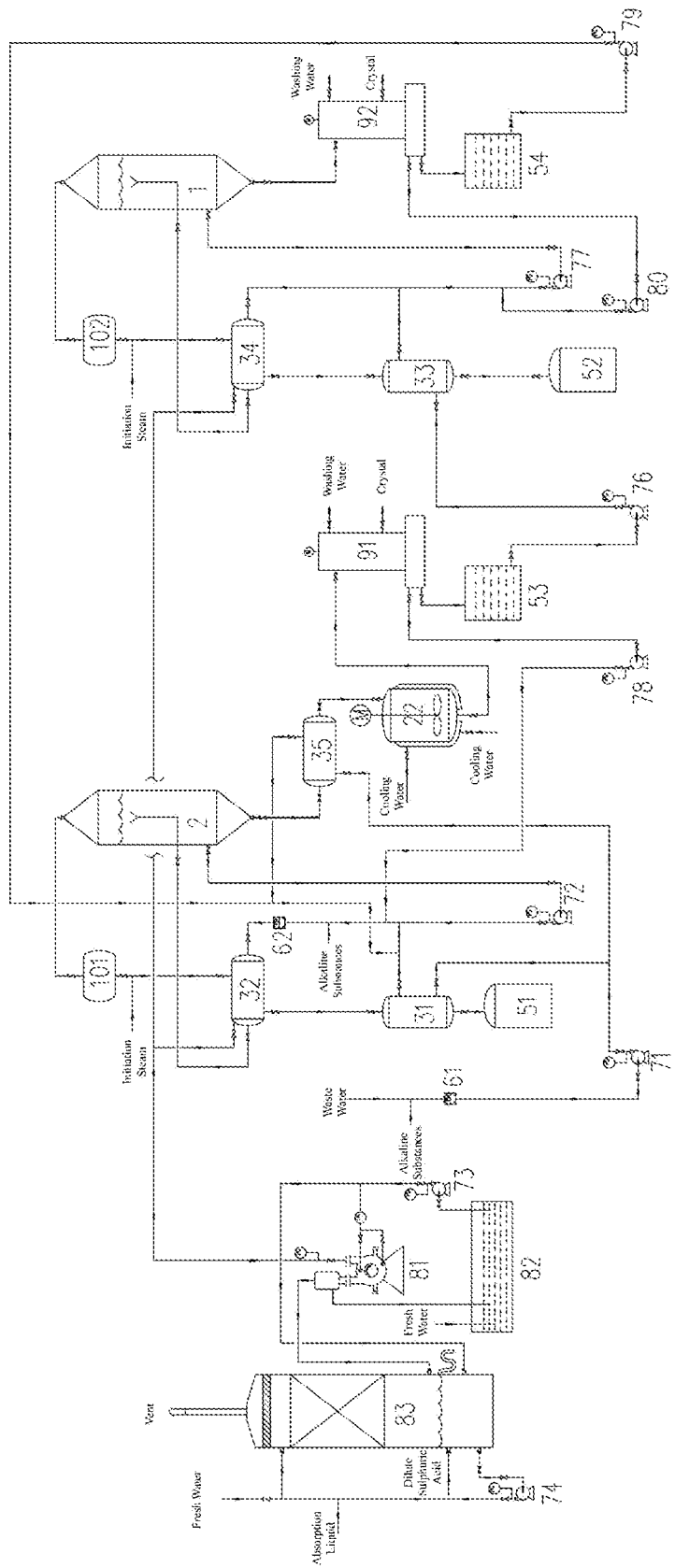
FIG. 6 is a flow diagram of the method for treating waste water containing ammonium salts in another embodiment of the present invention.

According to a preferred embodiment of the present invention, as shown in FIG. 6, the first heat exchange is executed in the first heat exchange device 31, the fifth heat exchange device 35, and the second heat exchange device 32. Specifically, the third ammonia-containing vapor obtained in the evaporation in the first evaporation device 2 flows through the second heat exchange device 32 and the first heat exchange device 31 sequentially, and the third concentrated solution that contains sodium chloride crystal flows through the fifth heat exchange device 35; at the same time, the waste water to be treated flows through the first heat exchange device 31 or the fifth heat exchange device 35 for the first heat exchange, and then flows through the second heat exchange device 32 for the first heat exchange. Through the first heat exchange, the waste water to be treated is heated up so that it can be evaporated more easily; at the same time, the third ammonia-containing vapor is condensed to obtain third ammonia, which may be stored in a first ammonia storage tank 51.

In the present invention, there is no particular restriction on the first heat exchange device 31, the fifth heat exchange device 35, and the second heat exchange device 32. In other words, those heat exchangers may be conventional heat exchangers in the art, as long as they can attain the purpose of performing the first heat exchange between the third ammonia-containing vapor and the waste water to be treated. Specifically, the heat exchange unit may be a jacket-type heat exchanger, plate-type heat exchanger, or shell and tube heat exchanger, etc., preferably is a plate-type heat exchanger. The material of the heat exchanger may be selected as required. For example, to resist erosion of chloride ions, a heat exchanger made of duplex stainless steel, titanium and titanium alloy, or hastelloy may be selected. At a low temperature, a heat exchanger made of plastic material may be selected.

According to the present invention, to take full advantage of the heat energy in the third ammonia-containing vapor, preferably, through the first heat exchange, the temperature of the waste water to be treated is 52° C.-182° C., more preferably is 67° C.-182° C., further preferably is 87° C.-137° C., still further preferably is 102° C.-117° C.

In the present invention, there is no particular restriction on the pH adjustment method. For example, the pH of the waste water to be treated may be adjusted by adding an alkaline substance. There is no particular restriction on the alkaline substance, as long as the alkaline substance can attain the purpose of adjusting the pH. To avoid introducing any new impurity into the waste water to be treated and improve the purity of the obtained crystal, the alkaline substance preferably is NaOH. The alkaline substance may be added with a conventional method in the art. However, preferably the alkaline substance is mixed in the form of water solution with the waste water to be treated. For example, water solution that contains the alkaline substance may be charged into a pipeline through which the waste water to be treated is inputted. There is no particular restriction on the content of the alkaline substance in the water solution, as long as the water solution can attain the purpose of adjusting the pH. However, to reduce the amount of water and further reduce the cost, preferably saturated water solution of the alkaline substance is used. To monitor the pH of the waste water to be treated, the pH of the waste water to be treated may be measured after the pH adjustment.

According to a preferred embodiment of the present invention, as shown in FIG. 6, the third evaporation process is performed in the first evaporation device 2. Specifically, before the waste water to be treated is loaded into the first heat exchange device 31 or the fifth heat exchange device 35 for the first heat exchange, pH adjustment is made for the first time by introducing water solution that contains the alkaline substance into the pipeline through which the waste water to be treated is loaded into the heat exchange device and mixing the materials therein; then, the waste water to be treated is loaded into the first heat exchange device 31 or the fifth heat exchange device 35 for the first heat exchange, and then pH adjustment is made for the second time by introducing the water solution that contains the alkaline substance into the pipeline through which the waste water to be treated is loaded into the second heat exchange device 32 and mixing the materials therein. Through twice pH adjustments, the pH of the waste water to be treated is adjusted to be greater than 9, preferably greater than 10.8, before the waste water to be treated is treated by the third evaporation. Preferably, through the first pH adjustment, the pH of the waste water to be treated is adjusted to be greater than 7 (preferably is 7-9); through the second pH adjustment, the pH of the waste water to be treated is adjusted to be greater than 9 (preferably is greater than 10.8). According to the present invention, preferably, the pH of the waste water to be treated is adjusted to be greater than 7 before the first heat exchange.

To detect the pH after the first pH adjustment and the second pH adjustment, preferably a first pH measuring device 61 is provided in the pipeline through which the waste water to be treated is loaded into the first heat exchange device 31 and the fifth heat exchange device 35 to measure the pH after the first pH adjustment, and a second pH measuring device 62 is provided in the pipeline through which the waste water to be treated is loaded into the second heat exchange device 32 to measure the pH after the second pH adjustment.

In the present invention, there is no particular restriction on the order of the first heat exchange, the adjustment of pH of the waste water to be treated, and the blending process of the waste water to be treated (in the case that the waste water to be treated contains the waste water containing ammonium salts and the liquid phase obtained in the fourth solid-liquid separation, a blending process of the waste water to be treated is required), and the order may be selected appropriately as required, as long as those procedures are accomplished before the third evaporation of the waste water to be treated.

According to the present invention, there is no particular restriction on the low temperature treatment method, as long as the temperature is controlled appropriately in the low temperature treatment so that the sodium sulfate crystal in the third concentrated solution that contains sodium chloride crystal obtained in the third evaporation is dissolved. According to the present invention, the temperature of the low temperature treatment is lower than the temperature of the third evaporation. Specifically, the conditions of the low temperature treatment may include: temperature: 13° C.-100° C., preferably 15° C.-45° C., more preferably 15°

C.-35° C., further preferably 17.9° C.-35° C.; for example, the temperature may be 18° C., 19° C., 20° C., 21° C., 22° C., 23° C., 24° C., 25° C., 26° C., 27° C., 28° C., 29° C., 30° C., 31° C., 32° C., 33° C., 34° C., 35° C., 36° C., 37° C., 38° C., 39° C., 40° C., 41° C., 42° C., 43° C., 44° C., 45° C., 46° C., 47° C., 48° C., 49° C., 50° C., 55° C. or 60° C. To ensure the effect of the low temperature treatment, the retention time of the low temperature treatment may be 10 min.-600 min., preferably is 20 min.-300 min., more preferably is 50 min.-70 min.

In the present invention, by controlling the conditions of the third evaporation and the low temperature treatment, the third evaporation may be executed at a higher vaporization temperature and an evaporation pressure closer to normal pressure, so as to avoid the problem of low efficiency of evaporation at a lower temperature; thus, the vaporization efficiency can be improved, the energy consumption in the evaporation process can be reduced, and the waste water treatment speed can be improved. On that basis, the temperature control for the low temperature treatment is easier and simpler, and the low temperature treatment may be executed at a temperature lower than the evaporation temperature (e.g., 45° C. or lower), to further facilitate dissolution of sodium sulfate and precipitation of sodium chloride.

In the present invention, the low temperature treatment may be performed in any conventional cooling device in the art. For example, a low temperature treatment tank 22 may be used. Preferably, the low temperature treatment tank 22 may be equipped with a cooling component in it; specifically, the cooling component may be a component that introduces cooling water. With the cooling component, the third concentrated solution in the low temperature treatment tank can be cooled quickly. Preferably, the low temperature treatment tank 22 may be equipped with a stirring component in it. Under the stirring action of the stirring component, the solid phase and liquid phase distribution and the temperature distribution in the third concentrated solution are uniform, and a purpose that the sodium sulfate crystal is dissolved fully and the sodium chloride crystal precipitates as far as possible is attained.

In the present invention, the third concentrated solution that contains sodium chloride crystal or the treated solution that contains sodium chloride crystal is treated by third solid-liquid separation to obtain sodium chloride crystal and third mother liquid (i.e., the liquid phase obtained in the third solid-liquid separation). There is no particular restriction on the method of the third solid-liquid separation. For example, the method may be selected from one or more of centrifugation, filtering, and sedimentation.

According to the present invention, the solid-liquid separation for the third condensate may be performed in a first solid-liquid separation device 91 (e.g., centrifugal machine, band filter, or plate and frame filter, etc.). After the solid-liquid separation, the third mother liquid obtained in the first solid-liquid separation device 91 is stored temporarily in a first mother liquid tank 53, and may be pumped by a sixth circulation pump 76 into the second evaporation device 1 for the fourth evaporation. Besides, it is inevitable that the obtained sodium chloride crystal has some impurities absorbed thereon, such as chloride ions, free ammonia, and hydroxyl ions, etc. Preferably, the sodium chloride crystal is washed in first washing with water, the waste water containing ammonium salts, or sodium chloride solution and dried, to remove the absorbed impurities, reduce off-odor of the solid salt, decrease causticity, and improve the purity of the crystal. To prevent the sodium chloride crystal from dissolved in the washing process, preferably, the sodium chloride crystal is washed with sodium chloride solution. More preferably, the concentration of the sodium chloride solution preferably is the concentration of sodium chloride in water solution where sodium chloride and sodium sulfate are saturated at the same time at the temperature corresponding to the sodium chloride crystal to be washed.

There is no particular restriction on the specific method for the third solid-liquid separation and the first washing. For example, the first solid-liquid separation and the first washing may be executed with conventional elutriation apparatus and solid-liquid separation apparatus in combination, or may be executed in a staged solid-liquid separation apparatus, such as a band filter. Preferably, the first washing comprises elutriation and/or elution. There is no particular restriction on the elutriation and elution. In other words, they can be executed with a conventional method in the art. There is no particular restriction on the number of cycles of the elutriation and elution. For example, one cycle or more may be selected. To obtain sodium chloride crystal at higher purity, preferably the elutriation and elution are executed for 2-4 cycles. In the elutriation process, the elutriation liquid usually is not reused by circulation if the waste water containing ammonium salts is used as the elutriating liquid; or the elutriation liquid may be reused by counter-current circulation if the washing liquid recycled in the first washing is used as the elutriating liquid. Before the elutriation is executed, preferably slurry that contains sodium chloride crystal (as long as the liquid content is 35 mass % or lower) is obtained through preliminary solid-liquid separation by sedimentation. In the elutriation process, in relation to 1 pbw slurry that contains sodium chloride crystal, the liquid used for the elutriation is 1-20 pbw. The elution preferably is executed with sodium chloride solution. To further improve the effect of the elutriation and obtain sodium chloride crystal at higher purity, the washing is executed preferably with the liquid obtained in the elution, more preferably with water or sodium chloride solution. The liquid produced in the washing preferably is returned to a position before the second pH adjustment before the third evaporation. For example, the liquid may be returned by means of an eighth circulation pump 78 a position before the second pH adjustment and mixed with the waste water to be treated, then the obtained mixture is treated by the second pH adjustment, flows into the second heat exchange device 32 for heat exchange, and then is returned to the third evaporation.

According to a preferred embodiment of the present invention, the third concentrated solution that contains sodium chloride crystal or treated solution that contains sodium chloride crystal, which is obtained through the low temperature treatment, is treated through preliminary solid-liquid separation by sedimentation, the obtained solution is elutriated for the first time with the waste water containing ammonium salts in an elutriation tank, then is elutriated for the second time with the liquid obtained in the follow-up sodium chloride crystal washing in another elutriation tank, and finally the slurry obtained through twice elutriations is loaded into a solid-liquid separation device for solid-liquid separation; then, the crystal obtained in the solid-liquid separation is eluted with sodium chloride solution, and the liquid obtained in the elution is returned to the second elutriation. Through the above washing process, the purity of the obtained sodium chloride crystal is improved, no excessive washing liquid is introduced into the system, and the efficiency of the waste water treatment is improved.

In the present invention, there is no particular restriction on the evaporation conditions of the fourth evaporation; in other words, the evaporation conditions may be selected appropriately as required, as long as the purpose of concentrating the third mother liquid can be attained. The conditions of the fourth evaporation may include: temperature: 35° C. or above; pressure: −95 kPa or above. To improve vaporization efficiency, preferably, the conditions of the fourth evaporation include: temperature: 45° C. or above; pressure: −95 kPa or above; preferably, the conditions of the fourth evaporation include: temperature: 45° C.-365° C.; pressure: −95 kPa-18110 kPa; preferably, the conditions of the fourth evaporation include: temperature: 60° C.-365° C.; pressure: −87 kPa-18110 kPa; preferably, the conditions of the fourth evaporation include: temperature: 75° C.-175° C.; pressure: −73 kPa-653 kPa; preferably, the conditions of the fourth evaporation include: temperature: 80° C.-130° C.; pressure: −66 kPa-117 kPa; preferably, the conditions of the fourth evaporation include: temperature: 95° C.-110° C.; pressure: −37 kPa-12 kPa; preferably, the conditions of the fourth evaporation include: temperature: 95° C.-105° C.; pressure: −37 kPa--7 kPa.

In the present invention, the operating pressure of the fourth evaporation preferably is the saturated vapor pressure of the evaporated feed liquid.

In addition, the amount of evaporation in the fourth evaporation may be selected appropriately according to the processing capacity of the apparatus and the amount of the waste water to be treated. For example, the amount of evaporation may be 0.1 m³/h or more (e.g., 0.1 m³/h-500 m³/h).

By performing the fourth evaporation under the above conditions, sodium chloride doesn't crystallize while sodium sulfate crystallizes, and thereby the purity of the obtained sodium sulfate crystal is ensured.

According to the present invention, the sodium chloride in the waste water to be treated doesn't crystallize and precipitate in the fourth evaporation (i.e., the sodium chloride is not over-saturated); preferably, through the fourth evaporation, the concentration of sodium chloride in the fourth concentrated solution is X or lower (preferably 0.999X or lower, more preferably 0.95X-0.999X, further preferably 0.99X-0.9967X), where, X is the concentration of sodium chloride in the fourth concentrated solution when both sodium chloride and sodium sulfate are saturated under the conditions of the fourth evaporation. By controlling the degree of the fourth evaporation within the above-mentioned range, sodium sulfate crystallizes and precipitates as far as possible while sodium chloride doesn't precipitate. By causing the sodium sulfate to crystallize in the fourth evaporation as far as possible, the waste water treatment efficiency can be improved, and energy waste can be reduced.

In the present invention, the degree of the fourth evaporation is ascertained by monitoring the concentration of the liquid obtained in the fourth evaporation. Specifically, by controlling the concentration of the liquid obtained in the fourth evaporation within the above-mentioned range, the sodium chloride in the waste water to be treated doesn't crystallize and precipitate in the fourth evaporation. Here, the concentration of the liquid obtained in the fourth evaporation is monitored by measuring the density of the liquid; specifically, the density may be measured with a densitometer.

According to the present invention, the method may further comprise crystallizing the fourth concentrated solution that contains sodium sulfate crystal in a crystallization device to obtain crystal slurry that contains sodium sulfate crystal. In that case, the evaporation conditions of the fourth evaporation shall ensure that the sodium sulfate crystallizes and precipitates in the crystallization device while the sodium chloride doesn't precipitate (through the fourth evaporation, the concentration of sodium chloride in the fourth concentrated solution is X or lower). There is no particular restriction on the crystallization device. For example, the crystallization device may be a crystal-liquid tank, crystal-liquid collection tank, thickener with a stirrer, or thickener without stirrer, etc. According to a preferred embodiment of the present invention, the crystallization is performed in a crystal-liquid collection tank 56. There is no particular restriction on the conditions of the crystallization. For example, the conditions of the crystallization may include: temperature: 45° C. or above, preferably 95° C.-107° C., more preferably 85° C.-105° C.; crystallization time: 5 min.-24 h, preferably 5 min.-30 min. According to the present invention, alternatively, the crystallization process of the fourth concentrated solution that contains sodium sulfate crystal may be performed in a first evaporation device with a crystallizer (e.g., a forced circulation evaporating crystallizer). In that case, the crystallization temperature is the temperature of the fourth evaporation. In the present invention, the crystallization temperature preferably is the same as the temperature of the fourth evaporation.

According to a preferred embodiment of the present invention, the fourth ammonia-containing vapor performs a second heat exchange with the third mother liquid, and thereby fourth ammonia is obtained. There is no particular restriction on the specific method of the second heat exchange; in other words, the second heat exchange may be executed in a conventional heat exchange method in the art. The second heat exchange may be executed for one or more times, preferably 2-4 times, more preferably 2-3 times, particularly preferably 2 times. Through the second heat exchange, the outputted ammonia is cooled, and the heat is circulated inside the treatment apparatus as far as possible; thus, the energy is utilized reasonably, and waste is reduced.

According to the present invention, preferably, as shown in FIG. 6, the second heat exchange is executed in the third heat exchange device 33 and the fourth heat exchange device 34. Specifically, the fourth ammonia-containing vapor obtained in the evaporation in the second evaporation device 1 flows through the fourth heat exchange device 34 and the third heat exchange device 33 sequentially, the third mother liquid flows through the third heat exchange device 33, and then is mixed with the third mother liquid and the third circulating liquid (a part of concentrated solution in the second evaporation device 1), and the obtained mixed solution flows through the fourth heat exchange device 34 for the second heat exchange, so that the temperature of the third mother liquid is increased to facilitate evaporation; at the same time, the fourth ammonia-containing vapor is condensed to obtain fourth ammonia, which may be stored in the second ammonia storage tank 52.

According to the present invention, after the second heat exchange, the temperature of the third mother liquid is 42° C. or above, preferably is 52° C.-372° C., further preferably is 82° C.-182° C., still further preferably is 102° C.-112° C.

According to a preferred embodiment of the present invention, the fourth evaporation process is executed in the second evaporation device 1, the third mother liquid is charged into the second evaporation device 1 with a sixth circulation pump 76 for the fourth evaporation, to obtain fourth ammonia-containing vapor and fourth concentrated solution that contains sodium sulfate crystal.

In the present invention, to attain the purpose that the sodium sulfate doesn't crystallize and precipitate in the fourth evaporation and the sodium chloride doesn't crystallize and precipitate in the fourth evaporation, preferably the conditions of the third evaporation and the fourth evaporation meet: the temperature of the third evaporation is lower than the temperature of the fourth evaporation by 5° C. or above, more preferably lower by 20° C. or above, even more preferably lower by 35° C.-70° C., further preferably lower by 50° C.-59° C. By controlling the temperature of the third evaporation and the temperature of the fourth evaporation, the sodium sulfate and the sodium chloride crystallize and precipitate respectively, and thereby the purity of the obtained sodium sulfate and sodium chloride crystal is improved.

In the present invention, to attain the purpose that the sodium chloride doesn't crystallize and precipitate in the fourth evaporation and the sodium sulfate crystal that has precipitated in the third evaporation can be dissolved in the low temperature treatment process, preferably the conditions of the fourth evaporation and the low temperature treatment meet: the temperature of the fourth evaporation is higher than the temperature of the low temperature treatment at least by 5° C., preferably higher by 20° C., more preferably higher by 35° C.-90° C., further preferably higher by x35° C.-70° C., particularly preferably higher by 50° C.-60° C. By controlling the temperature of the fourth evaporation and the temperature of the low temperature treatment, the sodium sulfate can be dissolved in the low temperature treatment if sodium sulfate crystal and sodium chloride crystal have precipitated in the third evaporation, and the sodium sulfate can crystallize and precipitate separately in the fourth evaporation, and thereby the purity of the obtained sodium sulfate and sodium chloride crystal is improved.

In the present invention, the fourth concentrated solution that contains sodium sulfate crystal obtained in the fourth evaporation is treated by fourth solid-liquid separation to obtain sodium sulfate crystal and fourth mother liquid (i.e., the liquid phase obtained in the fourth solid-liquid separation). There is no particular restriction on the method of the fourth solid-liquid separation. For example, the method may be selected from one or more of centrifugation, filtering, and sedimentation.

According to the present invention, the fourth solid-liquid separation may be performed in a second solid-liquid separation device 92 (e.g., centrifugal machine, band filter, or plate and frame filter, etc.). After the fourth solid-liquid separation, the fourth mother liquid obtained in the second solid-liquid separation device 92 is returned to the first evaporation device 2 for the third evaporation again. Specifically, the fourth mother liquid may be returned by means of the ninth circulation pump 79 to the second pH adjustment process. Besides, it is inevitable that the obtained sodium sulfate crystal has some impurities absorbed thereon, such as sulfate ions, free ammonia, and hydroxyl ions, etc. Preferably, the sodium sulfate crystal is washed in a second washing with water, the waste water containing ammonium salts, or sodium sulfate solution and dried, to remove the absorbed impurities, reduce off-odor of the solid salt, decrease causticity, and improve the purity of the crystal. To prevent the sodium sulfate crystal from dissolved in the washing process, preferably, the sodium sulfate crystal is washed with sodium sulfate solution. More preferably, the concentration of the sodium sulfate solution preferably is the concentration of sodium sulfate in water solution where sodium sulfate and sodium chloride are saturated at the same time at the temperature corresponding to the sodium sulfate crystal to be washed.

There is no particular restriction on the specific method for the fourth solid-liquid separation and the second washing. For example, the fourth solid-liquid separation and the second washing may be executed with conventional elutriation apparatus and solid-liquid separation apparatus in combination, or may be executed in a staged solid-liquid separation apparatus, such as a band filter. Preferably, the second washing comprises elutriation and/or elution. There is no particular restriction on the elutriation and elution. In other words, they can be executed with a conventional method in the art. There is no particular restriction on the number of cycles of the elutriation and elution. For example, one cycle or more may be selected. To obtain sodium sulfate crystal at higher purity, preferably the elutriation and elution are executed for 2-4 cycles. In the elutriation process, the elutriation liquid usually is not reused by circulation if the waste water containing ammonium salts is used as the elutriating liquid; or the elutriation liquid may be reused by counter-current circulation if the washing liquid recycled in the second washing is used as the elutriating liquid. Before the elutriation is executed, preferably slurry that contains sodium sulfate crystal (as long as the liquid content is 35 mass % or lower) is obtained through preliminary solid-liquid separation by sedimentation. In the elutriation process, in relation to 1 pbw slurry that contains sodium sulfate crystal, the liquid used for the elutriation is 1-20 pbw. The elution preferably is executed with sodium sulfate solution. To further improve the effect of the elutriation and obtain sodium sulfate crystal at higher purity, the washing is executed preferably with the liquid obtained in the elution. For the liquid produced in the washing, preferably the elutriant of the waste water containing ammonium salts is returned to a position before the second pH adjustment before the third evaporation, and other washing liquids are returned to the fourth evaporation process. For example, the liquid is returned by means of the tenth circulation pump 80 to the second evaporation device 1 for the fourth evaporation again.

According to a preferred embodiment of the present invention, the fourth concentrated solution that contains sodium sulfate crystal obtained in the fourth evaporation is treated through preliminary solid-liquid separation by sedimentation, the obtained solution is elutriated for the first time with the waste water containing ammonium salts in an elutriation tank, then is elutriated for the second time with the liquid obtained in the follow-up sodium sulfate crystal washing in another elutriation tank, and finally the slurry obtained through twice elutriations is loaded into the second solid-liquid separation device for the fourth solid-liquid separation; then, the crystal obtained in the solid-liquid separation is eluted with sodium sulfate solution, and the liquid obtained in the elution is returned as elutriant to the second elutriation. Through the above washing process that incorporates elutriation and elution, the purity of the obtained sodium sulfate crystal is improved, no excessive washing liquid is introduced into the system, and the efficiency of the waste water treatment is improved.

In the present invention, when MVR evaporation devices are used to perform the third evaporation and/or the fourth evaporation, to improve the content of solids in the MVR evaporation device and decrease the ammonia content in the liquid, preferably a part of the liquid (i.e., the liquid in the MVR evaporation device, also referred to as circulating liquid) after evaporation in the MVR evaporation device is heated and then circulated to the MVR evaporation device for evaporation. There is no particular restriction on the proportion of the part of liquid circulated to the MVR evaporation device after the evaporation in the MVR evaporation device. For example, the third recirculation ratio for the third evaporation may be 10-200, preferably is 40-150; the fourth recirculation ratio for the fourth evaporation may be 0.1-100, preferably is 5-50. Here, the recirculation ratio refers to the ratio of the recirculated amount to the difference of the total amount of liquid in the MVR evaporation device and the recirculated amount. Preferably, the third circulating liquid in the third evaporation is returned to a position before the pH adjustment is finished before the third evaporation. As shown in FIG. 6, the third circulating liquid may be returned by means of the second circulation pump 72 to the waste water transport pipeline between the first heat exchange device 31 and the second heat exchange device 32 and mixed with the waste water to be treated therein, and then the obtained mixture is treated by the second pH adjustment, performs heat exchange in the second heat exchange device 32, and finally is fed into the first evaporation device 2. Preferably, the fourth circulating liquid in the fourth evaporation is returned to a position before the second heat exchange is finished. As shown in FIG. 6, the fourth circulating liquid may be returned by means of the seventh circulation pump 77 to the fourth heat exchange device 34 for heat exchange, and finally is fed into the second evaporation device 1.

In the present invention, if MVR evaporation devices are used to perform the third evaporation and/or the fourth evaporation, the method further comprises compressing the third ammonia-containing vapor and/or the fourth ammonia-containing vapor. The compression may be executed with a compressor, such as a first compressor 101 and a second compressor 102. By compressing the ammonia-containing vapor, energy is fed into the MVR evaporation system to ensure that the waste water temperature rise-evaporation-temperature drop process is executed continuously. Initiation steam has to be inputted for initiating the MVR evaporation process, but the energy is solely supplied by means of the compressors in the continuous operation state, without any other energy input. The compressors may be conventional compressors in the art, such as centrifugal compressors, turbine compressors, or roots compressors, etc. Through compression with the compressors, the temperature of the ammonia-containing vapor is increased by 5° C.-20° C.

According to a preferred embodiment of the present invention, after the third ammonia-containing vapor is treated by the first heat exchange and condensation, the remaining tail gas is treated by ammonia removal and then is vented; after the fourth ammonia-containing vapor is treated by the second heat exchange and condensation, the remaining tail gas is treated by ammonia removal and then is vented. As shown in FIG. 6, the remaining tail gas after the third ammonia-containing vapor is treated by the first heat exchange and condensation is the tail gas discharged from the second heat exchange device 32, and the remaining tail gas after the fourth ammonia-containing vapor is treated by the second heat exchange and condensation is the tail gas discharged from the fourth heat exchange device 34. By removing ammonia from the above-mentioned tail gas, the content of pollutants in the tail gas can be further decreased, so that the tail gas can be vented directly.

As a method for the above-mentioned ammonia removal, the ammonia may be absorbed in the tail gas absorption tower 83. There is no particular restriction on the tail gas absorption tower 83; in other words, the tail gas absorption tower 83 may be any conventional absorption tower in the art, such as plate-type absorption tower, packed absorption tower, falling film absorption tower, or void tower, etc. The tail gas absorption tower 83 has circulating water in it, the circulating water is circulated in the tail gas absorption tower 83 under the action of the fourth circulation pump 74, or water can be replenished to the tail gas absorption tower 83 by means of the third circulation pump 73 from the circulating water tank 82; fresh water can be replenished to the circulating water tank 82, and thereby the temperature and ammonia content of the service water of the vacuum pump 81 can be decreased at the same time. The tail gas and the circulating water in the tail gas absorption tower 83 may flow in a counter-current mode or co-current flow mode, preferably flows in a counter-current mode. The circulating water may be replenished with fresh water. To ensure that the tail gas can be absorbed extensively, dilute sulfuric acid may be further added into the tail gas absorption tower 83, so as to absorb ammonia and the like in the tail gas. The circulating water may be reused in the production or directly sold as ammonia or ammonium sulfate solution after it absorbs the tail gas. The tail gas may be charged into the tail gas absorption tower 83 by means of the vacuum pump 81.

In the present invention, there is no particular restriction on the waste water containing ammonium salts, as long as the waste water containing ammonium salts is waste water that contains $NH_4^+$, $SO_4^{2-}$, $Cl^-$ and $Na^+$ In addition, the method provided in the present invention is especially suitable for treatment of waste water that has high salt content. Specifically, the waste water containing ammonium salts in the present invention may be waste water from a molecular sieve, alumina or oil refining catalyst production process, or waste water obtained by treating waste water produced in a molecular sieve, alumina or oil refining catalyst production process through impurity removal and concentration as described below, preferably is waste water obtained by treating waste water produced in a molecular sieve, alumina or oil refining catalyst production process through impurity removal and concentration as described below.

The content of $NH_4^+$ in the waste water containing ammonium salts may be 8 mg/L or higher, preferably is 300 mg/L or higher.

The content of $Na^+$ in the waste water containing ammonium salts may be 510 mg/L or higher, preferably is 1 g/L or higher, more preferably is 2 g/L or higher, further preferably is 4 g/L or higher, further preferably is 8 g/L or higher, further preferably is 16 g/L or higher, further preferably is 32 g/L or higher, further preferably is 40 g/L or higher, further preferably is 50 g/L or higher, still further preferably is 60 g/L or higher.

The content of $SO_4^{2-}$ in the waste water containing ammonium salts may be 1 g/L or higher, preferably is 2 g/L or higher, more preferably is 4 g/L or higher, further preferably is 8 g/L or higher, further preferably is 16 g/L or higher, further preferably is 32 g/L or higher, further preferably is 40 g/L or higher, further preferably is 50 g/L or higher, further preferably is 60 g/L or higher, still further preferably is 70 g/L or higher.

The content of $Cl^-$ in the waste water containing ammonium salts may be 970 mg/L or higher, preferably is 2 g/L or higher, further preferably is 4 g/L or higher, further preferably is 8 g/L or higher, further preferably is 16 g/L or higher, further preferably is 32 g/L or higher, further preferably is 40 g/L or higher, further preferably is 50 g/L or higher, still further preferably is 60 g/L or higher.

There is no particular restriction on the upper limits of $NH_4^+$, $SO_4^{2-}$, $Cl^-$ and $Na^+$ contained in the waste water containing ammonium salts. In consideration of the availability of the waste water, the upper limits of $SO_4^{2-}$, $Cl^-$ and $Na^+$ in the waste water are 200 g/L or lower respectively, preferably are 150 g/L or lower, preferably are 100 g/L or lower; the upper limit of $NH_4^+$ in the waste water is 50 g/L or lower, preferably is 40 g/L or lower, preferably is 30 g/L or lower.

For the purpose of improving the efficiency of the first evaporation and reducing the energy consumption of the treatment process, in relation to the content of $SO_4^{2-}$ in the waste water containing ammonium salts, the content of $Cl^-$ in the waste water containing ammonium salts should be low as far as possible. For example, in relation to 1 mol $SO_4^{2-}$ contained in the waste water containing ammonium salts, the $Cl^-$ contained in the waste water containing ammonium salts is 30 mol or less, preferably is 20 mol or less, more preferably is 15 mol or less, further preferably is 10 mol or less. In consideration of practicality, in relation to 1 mol $SO_4^{2-}$ contained in the waste water containing ammonium salts, the $Cl^-$ contained in the waste water containing ammonium salts preferably is 0.1 mol or more, more preferably is 0.5 mol or more, further preferably is 1 mol or more, such as 0.5-10 mol, preferably 1-9 mol. By confining the molar ratio of $SO_4^{2-}$ to $Cl^-$ in the waste water containing ammonium salts within the above-mentioned range, the majority of water can be evaporated in the first evaporation, so as to reduce the amount of circulating liquid in the treatment system, save energy, and improve economic efficiency of the treatment process.

For the purpose of improving the efficiency of the third evaporation and reducing the energy consumption of the treatment process, in relation to the content of $SO_4^{2-}$ in the waste water containing ammonium salts, the content of $Cl^-$ in the waste water containing ammonium salts should be high as far as possible. For example, in relation to 1 mol $SO_4^{2-}$ contained in the waste water containing ammonium salts, the $Cl^-$ contained in the waste water containing ammonium salts is 1 mol or more, preferably is 2 mol or more, more preferably is 5 mol or more, further preferably is 9.5 mol or more, still further preferably is 10 mol or more. In consideration of practicality, in relation to 1 mol $SO_4^{2-}$ contained in the waste water containing ammonium salts, the $Cl^-$ contained in the waste water containing ammonium salts preferably is 200 mol or less, more preferably is 150 mol or less, further preferably is 100 mol or less, further preferably is 50 mol or less, further preferably is 30 mol or less. By confining the molar ratio of $SO_4^{2-}$ to $Cl^-$ in the waste water containing ammonium salts within the above-mentioned range, the majority of water can be evaporated in the third evaporation, so as to reduce the amount of circulating liquid in the treatment system, save energy, and improve economic efficiency of the treatment process.

In the present invention, the inorganic salt ions contained in the waste water containing ammonium salts further include inorganic salt ions such as $Mg^{2+}$, $Ca^{2+}$, $K^+$, $Fe^{2+}$, and rare earth element ions, etc., besides $NH_4^+$, $SO_4^{2-}$, $Cl^-$, and $Na^+$ The contents of the inorganic salt ions (e.g., $Mg^{2+}$, $Ca^{2+}$, $K^+$, $Fe^{3+}$, and rare earth element ions, etc.) preferably are 100 mg/L or lower respectively, more preferably are 50 mg/L or lower respectively, further preferably are 10 mg/L or lower respectively, particularly preferably there is no other inorganic salt ion. By confining the contents of other inorganic salt ions in the above ranges, the purity of the sodium sulfate crystal and sodium chloride crystal obtained finally can be further improved. To reduce the contents of other inorganic salt ions in the waste water containing ammonium salts, preferably impurity removal is performed as described below.

The TDS in the waste water containing ammonium salts may be 1.6 g/L or higher, preferably is 4 g/L or higher, more preferably is 8 g/L or higher, further preferably is 16 g/L or higher, further preferably is 32 g/L or higher, further preferably is 40 g/L or higher, further preferably is 50 g/L or higher, further preferably is 60 g/L or higher, further preferably is 100 g/L or higher, further preferably is 150 g/L or higher, still further preferably is 200 g/L or higher.

In the present invention, the pH of the waste water containing ammonium salts preferably is 4-8, such as 6-7.

In addition, in view that the COD in the waste water containing ammonium salts may cause the membrane clogged in the concentration process and has adverse effect to the purity and color, etc. of the salts during evaporation and crystallization, the COD in the waste water containing ammonium salts should be low as far as possible (preferably is 20 mg/L or lower, more preferably is 10 mg/L or lower). Preferably the COD is removed by oxidization during pre-treatment. Specifically, the COD may be removed through a biological process or advanced oxidation process, etc. If the COD content is very high, preferably an oxidizer is used for oxidization, and the oxidizer may be Fenton reagent, for example.

In the present invention, to decrease the concentration of impurity ions in the waste water containing ammonium salts, ensure continuous and stable operation of the treatment process, and reduce equipment operation and maintenance cost, preferably the impurities in the waste water containing ammonium salts are removed before the treatment is executed with the treatment method provided in the present invention. Preferably, the impurity removal method is selected from one or more of solid-liquid separation, chemical precipitation, adsorption, ion exchange, and oxidization.

The solid-liquid separation may be executed by filtering, centrifugation, or sedimentation, etc.; the chemical precipitation may be executed by pH adjustment, carbonate precipitation, or magnesium salt precipitation, etc.; the adsorption may be executed by physical adsorption and/or chemical adsorption, and the specific adsorbent may be selected from active carbon, silica gel, alumina, molecular sieve, and natural clay, etc.; the ion exchange may be executed with any one of strong acidic cationic resins and weak acidic cationic resins; the oxidization may be executed with any conventional oxidizer in the art, such as ozone, hydrogen peroxide solution, or potassium permanganate, etc., and preferably is executed with ozone or hydrogen peroxide solution, etc., to avoid introduction of any new impurity.

The specific impurity removal method may be selected according to the types of impurities contained in the waste water containing ammonium salts. Suspended substances may be removed by solid-liquid separation; inorganic substances and organic substances may be removed by chemical precipitation, ion-exchange, or adsorption, such as weak acidic cation exchange or active carbon adsorption, etc.; organic substances may be removed by adsorption and/or oxidization, preferably are removed by ozone biological activated carbon adsorption and oxidization. According to a preferred embodiment of the present invention, impurities in the waste water containing ammonium salts are removed by filtering, weak acidic cation exchange, and ozone biological activated carbon adsorption and oxidization sequentially. Through the above impurity removal process, the majority of suspended substances, hardness, silica and organic substances can be removed, the scaling risk can be decreased, and the wastewater treatment process can operate continuously and stably.

In the present invention, if the waste water containing ammonium salts has relatively low salt content, the waste water containing ammonium salts may be treated by concentration so that the salt content reaches the range required for the waste water containing ammonium salts in the present invention, before the treatment is executed with the treatment method provided in the present invention. Preferably, the concentration method is selected from ED membrane concentration and/or reverse osmosis; more preferably, the concentration is executed through ED membrane concentration and reverse osmosis, and there is no particular restriction on the order of the ED membrane concentration and reverse osmosis. The apparatuses and conditions of the ED membrane concentration and reverse osmosis treatment may be conventional ones in the art, and may be selected according to the specific condition of the waste water to be treated. Specifically, the ED membrane concentration may be executed in a unidirectional electrodialysis system or reverse electrodialysis system; the reverse osmosis may be executed with spiral-wound membrane, flat sheet membrane, disc tubular membrane, and vibrating membrane, or a combination of them. Through the concentration, the waste water treatment efficiency can be improved, and energy waste incurred by high evaporation load can be avoided.

In a preferred embodiment of the present invention, the waste water containing ammonium salts is waste water obtained through treating the waste water produced in a molecular sieve production process by impurity removal through chemical precipitation, filtering, weak acidic cation exchange and ozone biological activated carbon adsorption and oxidization, concentration with ED membrane, and concentration through reverse osmosis.

The conditions of the above-mentioned chemical precipitation preferably are: sodium carbonate is used as a treating agent, sodium carbonate is added in a quantity of 1.2-1.4 mol in relation to 1 mol calcium ion in the waste water, the pH of the waste water is adjusted to 7, the reaction temperature is 20-35° C., and the reaction time is 0.5-4 h.

The conditions of the above-mentioned filtering preferably are: the filtering unit is a multi-media filter that employs double layers of filtering media composed of blind coal and quartz sand, the blind coal is in 0.7-1.7 mm particle size, the quartz sand is in 0.5-1.3 mm particle size, and the filtering speed is 10-30 m/h. The filtering media are regenerated through an "air backwashing-air-water backwashing-water backwashing" regeneration process, and the regeneration period is 10-15 h.

The conditions of the above-mentioned weak acidic cation exchange preferably are: pH range: 6.5-7.5; the temperature: ≤40° C., height of the resin layer: 1.5-3.0 m, HCl concentration in the regenerated liquid: 4.5-5 mass %; dose of regenerant (measured in 100%): 50-60 kg/m$^3$ wet resin; regeneration liquid HCl flow speed: 4.5-5.5 m/h, regeneration contact time: 35-45 min.; washing flow speed: 18-22 m/h, washing time: 2-30 min.; operation flow speed: 15-30 m/h; the acidic cation resin may be SNT D113 acidic cation resin from Langfang Sanat Chemical Co., Ltd., for example.

The conditions of the above-mentioned ozone biological activated carbon adsorption and oxidization preferably are: ozone retention time: 50-70 min.; empty bed filtering speed: 0.5-0.7 m/h. The conditions of the above-mentioned ED membrane concentration preferably are: current: 145-155 A, voltage: 45-65V. The ED membrane may be ED membrane from Astom (a Japanese company), for example.

The conditions of the above-mentioned reverse osmosis preferably are: operating pressure: 5.4-5.6 MPa, inlet temperature: 25-35° C., pH: 6.5-7.5. The reverse osmosis membrane may be TM810C seawater desalination membrane from Toray Bluestar Membrane Co., Ltd., for example.

According to the present invention, the waste water treatment may be commenced directly with the waste water containing ammonium salts. If the ion content in the waste water containing ammonium salts meets the conditions specified in the present invention, the first/third evaporation may be executed and then the second/fourth evaporation may be executed under the conditions specified in the present invention; if the ion content in the waste water containing ammonium salts doesn't meet the conditions specified in the present invention, the first evaporation may be controlled so that the concentration of sodium chloride in the first concentrated solution is close to the concentration for precipitation, and then the first concentrated solution is treated by the second evaporation and the optional low temperature treatment, the obtained solution is treated by solid-liquid separation to obtain sodium chloride crystal and the second mother liquid, and then the second mother liquid is mixed with the waste water containing ammonium salts to adjust the ion content in the waste water to be treated to the range specified in the present invention, next, the first evaporation is executed to obtain sodium sulfate crystal; or, the third evaporation may be controlled so that the concentration of sodium sulfate in the third concentrated solution is close to the concentration for precipitation, and then the third concentrated solution is treated by the optional low temperature treatment and the fourth evaporation, the obtained solution is treated by solid-liquid separation to obtain sodium sulfate crystal and the fourth mother liquid, and then the fourth mother liquid is mixed with the waste water containing ammonium salts to adjust the ion content in the waste water to be treated to the range specified in the present invention, next, the third evaporation is executed to obtain sodium chloride crystal. Of course, alternatively the ion content in the waste water to be treated may be adjusted with sodium sulfate and sodium chloride in the initial stage, as long as the waste water to be treated can meet the requirements for the contents of $SO_4^{2-}$ and $Cl^-$ in the waste water to be treated in the present invention.

Hereunder the present invention will be detailed in embodiments.

In the following embodiments, the waste water containing ammonium salts is waste water obtained through treating the waste water produced in a molecular sieve production process sequentially by impurity removal through chemical precipitation, filtering, weak acidic cation exchange and ozone biological activated carbon adsorption and oxidization, concentration with ED membrane, and concentration through reverse osmosis sequentially.

Embodiment 1

As shown in FIG. 2, waste water containing ammonium salts (containing 80 g/L NaCl, 81 g/L Na$_2$SO$_4$, 48 g/L NH$_4$Cl, and 49.4 g/L (NH$_4$)$_2$SO$_4$, pH=6.2) is fed at 5 m$^3$/h feed rate and mixed with the second mother liquid to obtain waste water to be treated (the molar ratio of $SO_4^{2-}$ to $Cl^-$ is 1:3.7487), the waste water to be treated is loaded into the main pipeline of the first heat exchange device 31, the third heat exchange device 33, and the fifth heat exchange device 35 (all of them are titanium alloy plate-type heat exchangers), the pH of the mixture is monitored with the first pH measuring device 61 (a pH meter) (the measured value is 9.2), a part of the waste water to be treated (3 m$^3$/h) is fed by means of the first circulation pump 71 into the first heat exchange device 31 to perform the first heat exchange with the condensate of first ammonia-containing vapor so that the temperature of the waste water to be treated is increased to 99° C., another part of the waste water to be treated (2 m³/h) is fed into the third heat exchange device 33 to perform the first heat exchange with the condensate of the second ammonia-containing vapor so that the temperature of the waste water to be treated is increased to 99° C., the remaining part of the waste water to be treated is fed into the fifth heat exchange device 35 to perform the first heat exchange with the second concentrated solution obtained in the second evaporation so that the temperature of the waste water to be treated is increased to 102° C.; then the parts of the waste water to be treated are merged and then the merged waste water is fed into the second heat exchange device 32; sodium hydroxide solution at 45.16 mass % concentration is introduced into the pipeline through which the waste water to be treated is fed into the second heat exchange device 32 to perform the second pH adjustment, the pH after the adjustment is monitored with the second pH measuring device 62 (a pH meter) (the measured value is 10.8), then the waste water to be treated is fed into the second heat exchange device 32 (a titanium alloy plate-type heat exchanger) to perform the first heat exchange with the recycled first ammonia-containing vapor so that the temperature of the waste water to be treated is increased to 107° C.; next, the waste water to be treated is fed into the first evaporation device 2 (a falling film+forced circulation two-stage MVR evaporating crystallizer) for evaporation, to obtain first ammonia-containing vapor and first concentrated solution that contains sodium sulfate crystal. Wherein in the first evaporation device 2, the evaporation temperature is 100° C., the pressure is −22.82 kPa, and the amount of evaporation 3.82 m³/h. The first ammonia-containing vapor obtained in the evaporation is compressed in the first compressor 101 (the temperature is increased by 12° C.), then the first ammonia-containing vapor flows through the second heat exchange device 32 and the first heat exchange device 31 to exchange heat with the waste water to be treated sequentially, and is condensed to obtain first ammonia, and the first ammonia is stored in the first ammonia storage tank 51. Besides, to improve the content of solids in the first evaporation device 2, a part of the liquid after the evaporation in the first evaporation device 2 is taken as first circulating liquid and circulated by means of the second circulation pump 72 to the second heat exchange device 32 for heat exchange, and then the first circulating liquid enters into the first evaporation device 2 again for the first evaporation (the recirculation ratio is 75.9). The degree of the first evaporation is monitored with the densitometer provided on the first evaporation device 2, to control the concentration of sodium chloride in the concentrated solution obtained through the first evaporation to be 0.9935X (306.2 g/L).

The first concentrated solution is fed into the first solid-liquid separation device 91 (a centrifugal machine) for the first solid-liquid separation, 4.48 m³ first mother liquid that contains 306.2 g/L NaCl, 54.0 g/L Na₂SO₄, 13.8 g/L NaOH and 0.60 g/L NH₃ is obtained per hour, the first mother liquid is temporarily stored in the first mother liquid tank 53, the solid sodium sulfate obtained in the solid-liquid separation (664.41 kg filter cake of sodium sulfate crystal with 15 mass % water content is obtained per hour, wherein the content of sodium chloride is 5.0 mass % or lower) is eluted with 54 g/L sodium sulfate solution that is in the same dry mass as the filter cake of sodium sulfate crystal and then is dried, thus 664.41 kg sodium sulfate (at 99.4 mass % purity) is obtained per hour; the washing liquid is circulated by means of the eighth circulation pump 78 to a position before the second pH adjustment and mixed with the waste water to be treated, and the obtained mixture is fed into the first evaporation device 2 again for the first evaporation.

The second evaporation process is executed in the second evaporation device 1 (a falling film+forced circulation two-stage MVR evaporating crystallizer). The first mother liquid in the first mother liquid tank 53 is fed by means of the sixth circulation pump 76 into the second evaporation device 1 for the second evaporation, to obtain second ammonia-containing vapor and second concentrated solution that contains sodium sulfate crystal and sodium chloride crystal. Wherein in the second evaporation device 1, the evaporation temperature is 105° C., the pressure is −7.02 kPa, and the amount of evaporation 2.01 m³/h. To improve the content of solids in the second evaporation device 1, a part of the first mother liquid after evaporation in the second evaporation device 1 is taken as second circulating liquid and circulated by means of the seventh circulation pump 77 to the fourth heat exchange device 34 for heat exchange, and then is fed into the second evaporation device 1 for the second evaporation (the recirculation ratio is 42.3). The second ammonia-containing vapor obtained in the evaporation is compressed in the second compressor 102 (the temperature is increased by 12° C.), then the second ammonia-containing vapor flows through the fourth heat exchange device 34 and the third heat exchange device 33 to exchange heat with the first mother liquid and the part of waste water to be treated from the first circulation pump 71 and cooled to obtain second ammonia, and the second ammonia is stored in the second ammonia storage tank 52. The degree of the second evaporation is monitored with the mass flowmeter provided on the second evaporation device 1, to control the amount of evaporation in the second evaporation to be 2.01 m³/h (equivalent to controlling the concentration of sodium sulfate in the treated solution to be 0.979Y, i.e., 91.6 g/L). After the first mother liquid is evaporated in the second evaporation device 1, the obtained second concentrated solution that contains sodium sulfate crystal and sodium chloride crystal is treated at a low temperature in the low temperature treatment tank 55 (the temperature is 17.9° C., and the retention time is 70 min.), to obtain treated solution that contains sodium chloride crystal.

The treated solution that contains sodium chloride crystal is fed into the second solid-liquid separation device 92 (a centrifugal machine) for solid-liquid separation, 2.58 m³ second mother liquid that contains 277.6 g/L NaCl, 91.6 g/L Na₂SO₄, 2.34 g/L NaOH and 0.01 g/L NH₃ is obtained per hour, and the second mother liquid is temporarily stored in the second mother liquid tank 54. All of the second mother liquid is circulated by means of the ninth circulation pump 79 to the waste water introduction pipeline to mix with the waste water containing ammonium salts, so that waste water to be treated is obtained. The sodium chloride solid obtained in the solid-liquid separation (769.43 kg filter cake of sodium chloride crystal with 14 mass % water content is obtained per hour, wherein the content of sodium sulfate is 6.0 mass % or lower) is eluted with 277.6 g/L sodium chloride solution in the same dry mass as the sodium chloride, then a part of the filter cake of sodium chloride crystal is used to prepare 277.6 g/L sodium chloride solution, and the filter cake of sodium chloride crystal is dried in a drier, thus 661.71 kg sodium chloride (at 99.5 mass % purity) is obtained per hour; the washing liquid is returned by means of the tenth circulation pump 80 to the fourth heat exchange device 34 for heat exchange, and then returned to the second evaporation device 1.

In addition, the tail gas discharged from the second heat exchange device 32 and the fourth heat exchange device 34 is introduced by means of the vacuum pump 81 into the tail gas absorption tower 83 for absorption. The tail gas absorption tower 83 has circulating water in it, the circulating water is circulated in the tail gas absorption tower 83 under the action of the fourth circulation pump 74, water is replenished to the tail gas absorption tower 83 by means of the third circulation pump 73 from the circulating water tank 82 at the same time; in addition, fresh water is replenished to the circulating water tank 82, and thereby the temperature and ammonia content of the service water of the vacuum pump 81 are decreased. Dilute sulfuric acid is further charged into the tail gas absorption tower 83 to absorb ammonia or the like in the tail gas. Besides, the MVR evaporation is initiated by charging steam at 143.3° C. temperature in the initial stage.

In this embodiment, 3.83 m$^3$ ammonia at 3.45 mass % concentration is obtained per hour in the first ammonia storage tank 51, 2.01 m$^3$ ammonia at 0.137 mass % concentration is obtained per hour in the second ammonia storage tank 52, and the ammonia may be recycled and reused in a molecular sieve production process.

Embodiment 2

The waste water containing ammonium salts is treated with the method described in the embodiment 1, but: waste water containing ammonium salts that contains 65 g/L NaCl, 130 g/L Na$_2$SO$_4$, 12 g/L NH$_4$Cl and 24.4 g/L (NH$_4$)$_2$SO$_4$ with pH=6.5 is treated, and the molar ratio of SO$_4^{2-}$ to Cl$^-$ contained in the obtained waste water to be treated is 1:2.291. A part of the waste water to be treated (4 m$^3$/h) flows through the first heat exchange device 31 for the first heat exchange, so that the temperature of the waste water to be treated is increased to 94° C., another part of the waste water to be treated (1 m$^3$/h) flows through the third heat exchange device 33 for the first heat exchange, so that the temperature of the waste water to be treated is increased to 99° C., and the remaining part of the waste water to be treated flows through the fifth heat exchange device 35 for the first heat exchange, so that the temperature of the waste water to be treated is increased to 99° C.; then the parts of the waste water to be treated are merged and then the merged waste water flows through the second heat exchange device 32 for heat exchange; finally the temperature of the waste water to be treated is 107° C. In the first evaporation device 2, the evaporation temperature is 95° C., the pressure is −36.36 kPa, and the amount of evaporation is 4.31 m$^3$/h. In the second evaporation device 1, the evaporation temperature is 100° C., the pressure is −22.83 kPa, and the amount of evaporation is 1.17 m$^3$/h. The temperature of the low temperature treatment is 20° C., and the retention time is 55 min. 911.15 kg filter cake of sodium sulfate crystal with 14 mass % water content is obtained per hour in the first solid-liquid separation device 91, and finally 783.59 kg sodium sulfate (at 99.5 mass % purity) is obtained per hour; 2.68 m$^3$ first mother liquid at concentrations of 307.2 g/L NaCl, 54.5 g/L Na$_2$SO$_4$, 1.83 g/L NaOH, and 0.35 g/L NH$_3$ is obtained per hour.

456.76 kg filter cake of sodium chloride crystal with 15 mass % water content is obtained per hour in second solid-liquid separation device 92, and finally 38.24 kg sodium chloride (at 99.6 mass % purity) is obtained per hour; 1.67 m$^3$ second mother liquid at concentrations of 279.5 g/L NaCl, 88.7 g/L Na$_2$SO$_4$, 4.13 g/L NaOH, and 0.011 g/L NH$_3$ is obtained per hour.

In this embodiment, 4.31 m$^3$ ammonia at 1.1 mass % concentration is obtained per hour in the first ammonia storage tank 51, 1.17 m$^3$ ammonia at 0.085 mass % concentration is obtained per hour in the second ammonia storage tank 52, and the ammonia may be recycled and reused in a molecular sieve production process.

Embodiment 3

The waste water containing ammonium salts is treated with the method described in the embodiment 1, but: waste water containing ammonium salts that contains 168 g/L NaCl, 35 g/L Na$_2$SO$_4$, 40 g/L NH$_4$Cl and 8.47 g/L (NH$_4$)$_2$SO$_4$ with pH=6.6 is treated, and the molar ratio of SO$_4^{2-}$ to Cl$^-$ contained in the obtained waste water to be treated is 1:9.3964. The temperature of the waste water to be treated after the heat exchange in the first heat exchange device 31 is 99° C., the temperature of the waste water to be treated after the heat exchange in the third heat exchange device 33 is 99° C., the temperature of the waste water to be treated after the heat exchange in the fifth heat exchange device 35 is 105° C., and the temperature of the waste water to be treated after the heat exchange in the second heat exchange device 32 is 112° C. In the first evaporation device 2, the evaporation temperature is 105° C., the pressure is −7.02 kPa, and the amount of evaporation is 2.36 m$^3$/h. In the second evaporation device 1, the evaporation temperature is 110° C., the pressure is 11.34 kPa, and the amount of evaporation is 3.16 m$^3$/h. The temperature of the low temperature treatment is 25° C., and the retention time is 50 min.

251.35 kg filter cake of sodium sulfate crystal with 14 mass % water content is obtained per hour in the first solid-liquid separation device 91, and finally 216.16 kg sodium sulfate (at 99.6 mass % purity) is obtained per hour; 8.22 m$^3$ first mother liquid at concentrations of 306.4 g/L NaCl, 52.5 g/L Na$_2$SO$_4$, 2.64 g/L NaOH, and 0.18 g/L NH$_3$ is obtained per hour.

1236.21 kg filter cake of sodium chloride crystal with 14 mass % water content is obtained per hour in second solid-liquid separation device 92, and finally 1063.14 kg sodium chloride (at 99.5 mass % purity) is obtained per hour; 5.03 m$^3$ second mother liquid at concentrations of 279.5 g/L NaCl, 82.2 g/L Na$_2$SO$_4$, 4.13 g/L NaOH, and 0.017 g/L NH$_3$ is obtained per hour.

In this embodiment, 2.36 m$^3$ ammonia at 3.0 mass % concentration is obtained per hour in the first ammonia storage tank 51, 3.16 m$^3$ ammonia at 0.044 mass % concentration is obtained per hour in the second ammonia storage tank 52, and the ammonia may be recycled and reused in a molecular sieve production process.

Embodiment 4

As shown in FIG. 3, waste water containing ammonium salts (containing 158 g/L NaCl, 46 g/L Na$_2$SO$_4$, 57 g/L NH$_4$Cl, and 16.9 g/L (NH$_4$)$_2$SO$_4$, with pH=6.4) is fed at 5 m$^3$/h feed rate into the pipeline of the treatment system, sodium hydroxide solution at 45.16 mass % concentration is introduced into the waste water transport pipeline for pH adjustment, and then the waste water is mixed with the second mother liquid to obtain waste water to be treated (the molar ratio of SO$_4^{2-}$ to Cl$^-$ contained in it is 1:7.9515), and the pH after the adjustment is monitored with the first pH measuring device 61 (a pH meter) (the measured value is 9), before the waste water to be treated is fed into the first heat exchange device 31, the third heat exchange device 33, and the fifth heat exchange device 35 (all of them are titanium alloy plate-type heat exchangers); then, a part of the waste water to be treated (2 m³/h) is fed by means of the first circulation pump 71 into the first heat exchange device 31 for first heat exchange with the recycled condensate of the first ammonia-containing vapor, so that the temperature of the waste water to be treated is increased to 99° C., another part of the waste water to be treated (3 m³/h) is fed into the third heat exchange device 33 for the first heat exchange with the recycled condensate of the second ammonia-containing vapor, so that the temperature of the waste water to be treated is increased to 99° C., and the remaining part of the waste water to be treated is fed into the fifth heat exchange device 35 for the first heat exchange with the second concentrated solution, so that the temperature of the waste water to be treated is increased to 103° C.; then the parts of the waste water to be treated are merged and the merged waste water is fed into the first evaporation device 2; sodium hydroxide solution at 45.16 mass % is introduced into the pipeline through which the waste water to be treated is fed into the first evaporation device 2 for pH adjustment, and the pH after the adjustment is monitored with the second pH measuring device 62 (a pH meter) (the measured value is 10.8); next, the waste water to be treated after the pH adjustment flows through the evaporators in the first evaporation device 2 for evaporation sequentially, and thus the first ammonia-containing vapor and the first concentrated solution that contains sodium sulfate crystal are obtained. The first evaporation device 2 is composed of a first evaporator 2a, a second evaporator 2b, a third evaporator 2c, and a fourth evaporator 2d (all of the evaporators are forced circulation evaporators). Wherein the evaporation conditions in the first evaporation device 2 are shown in Table 1:

TABLE 1

| | Evaporator | Temperature/ ° C. | Pressure/ kPa | Amount of evaporation/ (m³/h) |
|---|---|---|---|---|
| First evaporation device 2 | First evaporator 2a | 145 | 239.9 | 0.588 |
| | Second evaporator 2b | 130 | 116.8 | 0.588 |
| | Third evaporator 2c | 117 | 42.0 | 0.588 |
| | Fourth evaporator 2d | 105 | −7.1 | 0.588 |
| Second evaporation device 1 | | 105 | −7.1 | 3.354 |

The first ammonia-containing vapor obtained in the evaporation in each evaporator is fed into the next evaporator to perform heat exchange and obtain first ammonia, then further performs heat exchange with the waste water to be treated in the first heat exchange device 31; the first ammonia-containing vapor obtained in the evaporation in the fourth evaporator 2d performs heat exchange with the cooling water (the waste water containing ammonium salts) in the second heat exchange device 32 and thereby first ammonia is obtained; the first ammonia is merged and stored in the first ammonia storage tank 51. Heating steam (i.e., live steam used conventionally in the art) is charged into the first evaporator 2a, and the condensate obtained through condensation of the heating steam in the first evaporator 2a is used to prepare washing solution. The degree of the first evaporation is monitored with the densitometer provided on the first evaporation device 2, to control the concentration of sodium chloride in the concentrated solution obtained through the first evaporation to be 0.99353X (307 g/L). The first concentrated solution obtained in the evaporation in the first evaporation device 2 is controlled to crystallize in the crystal-liquid collection tank 56 (crystallization temperature: 105° C., crystallization time: 5 min.), to obtain crystal slurry that contains sodium sulfate crystal.

The crystal slurry that contains sodium sulfate crystal is fed into the first solid-liquid separation device 91 (a centrifugal machine) for the first solid-liquid separation, 7.743 m³ first mother liquid that contains 307 g/L NaCl, 52.73 g/L Na$_2$SO$_4$, 1.67 g/L NaOH and 0.287 g/L NH$_3$ is obtained per hour and is temporarily stored in the first mother liquid tank 53; the solid sodium sulfate obtained in the solid-liquid separation (371.47 kg filter cake of sodium sulfate crystal with 15 mass % water content is obtained per hour, wherein the content of sodium chloride is 5.8 mass % or lower) is eluted with 52.5 g/L sodium sulfate solution that is in the same dry mass as the filter cake of sodium sulfate crystal and then dried in a drier, and thus 315.74 kg sodium sulfate (at 99.5 mass % purity) is obtained per hour; the washing liquid is circulated by means of the eighth circulation pump 78 to a position before the second pH adjustment and mixed with the waste water to be treated, then the obtained mixture is fed into the first evaporation device 2 again for the first evaporation.

The first mother liquid in the first mother liquid tank 53 is fed by means of the sixth circulation pump 76 into the second evaporation device 1 (a falling film+forced circulation two-stage MVR evaporating crystallizer) for the second evaporation, to obtain second ammonia-containing vapor and second concentrated solution that contains sodium sulfate crystal and sodium chloride crystal; the evaporation conditions are shown in the above Table 1. The second ammonia-containing vapor obtained in the evaporation in the second evaporation device 1 is compressed in the second compressor 102 (the temperature is increased by 14° C.), then the second ammonia-containing vapor flows through the fourth heat exchange device 34 for heat exchange and then flows through the third heat exchange device 33 to exchange heat with a part of waste water to obtain second ammonia, and the second ammonia is stored in the second ammonia storage tank 52. To improve the concentration of solids in the second evaporation device 1, a part of the liquid after the evaporation in the second evaporation device 1 is circulated as circulating liquid by means of the seventh circulation pump 77 to the second evaporation device 1 for the second evaporation (the recirculation ratio is 41.8). The degree of the second evaporation is monitored with the mass flowmeter provided on the second evaporation device 1, to control the amount of evaporation in the second evaporation to be 3.354 m³/h (equivalent to controlling the concentration of sodium sulfate in the treated solution to be 0.978Y, i.e., 88.7 g/L). After the first mother liquid is evaporated in the second evaporation device 1, the obtained second concentrated solution that contains sodium sulfate crystal and sodium chloride crystal is treated at a low temperature in the low temperature treatment tank 55 (the temperature is 20° C., and the retention time is 55 min.), to obtain treated solution that contains sodium chloride crystal.

The treated solution that contains sodium chloride crystal is fed into the second solid-liquid separation device 92 (a centrifugal machine) for solid-liquid separation, 4.371 m³ second mother liquid that contains 279.6 g/L NaCl, 88.7 g/L Na$_2$SO$_4$, 2.81 g/L NaOH and 0.287 g/L NH$_3$ is obtained per hour, and the second mother liquid is temporarily stored in the second mother liquid tank 54. All of the second mother liquid is circulated by means of the ninth circulation pump 79 to the waste water introduction pipeline and is mixed with the waste water containing ammonium salts to obtain waste water to be treated. The solid sodium chloride obtained in the solid-liquid separation (1286.86 kg filter cake of sodium chloride crystal with 14 mass % water content is obtained per hour, wherein the content of sodium sulfate is 5.2 mass % or lower) is eluted with 279.6 g/L sodium chloride solution in the same dry mass as the sodium chloride, and is dried in a drier, thus 1106.70 kg sodium chloride (at 99.4 mass % purity) is obtained per hour; the washing liquid is returned by means of the tenth circulation pump 80 to the fourth heat exchange device 34 for heat exchange, and then returned to the second evaporation device 1.

In addition, the tail gas discharged from the second heat exchange device 32 and the fourth heat exchange device 34 is introduced by means of the vacuum pump 81 into the tail gas absorption tower 83 for absorption. The tail gas absorption tower 83 has circulating water in it, the circulating water is circulated in the tail gas absorption tower 83 under the action of the fourth circulation pump 74, water is replenished to the tail gas absorption tower 83 by means of the third circulation pump 73 from the circulating water tank 82 at the same time; in addition, fresh water is replenished to the circulating water tank 82, and thereby the temperature and ammonia content of the service water of the vacuum pump 81 are decreased. Dilute sulfuric acid is further charged into the tail gas absorption tower 83 to absorb ammonia or the like in the tail gas. Besides, the MVR evaporation is initiated by charging steam at 143.3° C. temperature in the initial stage.

In this embodiment, 2.353 m$^3$ ammonia at 4.46 mass % concentration is obtained per hour in the first ammonia storage tank 51, 3.354 m$^3$ ammonia at 0.064 mass % concentration is obtained per hour in the second ammonia storage tank 52, and the ammonia may be recycled and reused in a molecular sieve production process.

Embodiment 5

The waste water containing ammonium salts is treated with the method described in the embodiment 4, but: waste water containing ammonium salts that contains 76 g/L NaCl, 128 g/L Na$_2$SO$_4$, 16 g/L NH$_4$Cl and 27.4 g/L (NH$_4$)$_2$SO$_4$ with pH=6.7 is treated, and the molar ratio of SO$_4^{2-}$ to Cl$^-$ contained in the obtained waste water to be treated is 1:2.9034. The temperature of the waste water after the heat exchange in the first heat exchange device 31 is 95° C., the temperature of the waste water to be treated after the heat exchange in the third heat exchange device 33 is 93° C., and the temperature of the waste water to be treated after the heat exchange in the fifth heat exchange device 35 is 93° C. The evaporation conditions of the first evaporation device 2 and the second evaporation device 1 are shown in Table 2. The temperature of the low temperature treatment is 25° C., and the retention time is 60 min.

TABLE 2

|  | Evaporator | Temperature/ ° C. | Pressure/ kPa | Amount of evaporation/ (m$^3$/h) |
|---|---|---|---|---|
| First evaporation device 2 | First evaporator 2a | 140 | 193.8 | 1.037 |
| | Second evaporator 2b | 125 | 84.9 | 1.037 |
| | Third evaporator 2c | 110 | 11.4 | 1.037 |
| | Fourth evaporator 2d | 95 | −36.4 | 1.036 |
| Second evaporation device 1 | | 107 | 0 | 1.386 |

918.33 kg filter cake of sodium sulfate crystal with 14 mass % water content is obtained per hour in the first solid-liquid separation device 91, and finally 789.76 kg sodium sulfate (at 99.4 mass % purity) is obtained per hour; 3.73 m$^3$ first mother liquid at concentrations of 305.6 g/L NaCl, 55.15 g/L Na$_2$SO$_4$, 1.15 g/L NaOH, and 0.308 g/L NH$_3$ is obtained per hour.

547.13 kg filter cake of sodium chloride crystal with 15 mass % water content is obtained per hour in second solid-liquid separation device 92, and finally 465.06 kg sodium chloride (at 99.5 mass % purity) is obtained per hour; 2.493 m$^3$ second mother liquid at concentrations of 280.9 g/L NaCl, 83 g/L Na$_2$SO$_4$, 1.73 g/L NaOH, and 0.023 g/L NH$_3$ is obtained per hour.

In this embodiment, 4.147 m$^3$ ammonia at 1.41 mass % concentration is obtained per hour in the first ammonia storage tank 51, 1.386 m$^3$ ammonia at 0.083 mass % concentration is obtained per hour in the second ammonia storage tank 52, and the ammonia may be recycled and reused in a molecular sieve production process.

Embodiment 6

The waste water containing ammonium salts is treated with the method described in the embodiment 4, but: waste water containing ammonium salts that contains 118 g/L NaCl, 116 g/L Na$_2$SO$_4$, 19 g/L NH$_4$Cl and 19 g/L (NH$_4$)$_2$SO$_4$ with pH=6.8 is treated, and the molar ratio of SO$_4^{2-}$ to Cl$^-$ contained in the obtained waste water to be treated is 1:4.4621. The temperature of the waste water after the heat exchange in the first heat exchange device 31 is 98° C., the temperature of the waste water to be treated after the heat exchange in the third heat exchange device 33 is 103° C., and the temperature of the waste water to be treated after the heat exchange in the fifth heat exchange device 35 is 103° C. The evaporation conditions of the first evaporation device 2 and the second evaporation device 1 are shown in Table 3. The temperature of the low temperature treatment is 30° C., and the retention time is 65 min.

TABLE 3

|  | Evaporator | Temperature/ ° C. | Pressure/ kPa | Amount of evaporation/ (m$^3$/h) |
|---|---|---|---|---|
| First evaporation device 2 | First evaporator 2a | 145 | 239.9 | 0.520 |
| | Second evaporator 2b | 130 | 116.8 | 0.518 |
| | Third evaporator 2c | 115 | 32.6 | 0.518 |
| | Fourth evaporator 2d | 100 | −22.9 | 0.518 |
| Second evaporation device 1 | | 105 | −7.1 | 3.448 |

793.13 kg filter cake of sodium sulfate crystal with 14 mass % water content is obtained per hour in the first solid-liquid separation device 91, and finally 682.09 kg sodium sulfate (at 99.5 mass % purity) is obtained per hour; 5.886 m$^3$ first mother liquid at concentrations of 305.8 g/L NaCl, 53.84 g/L Na$_2$SO$_4$, 2.2 g/L NaOH, and 0.18 g/L NH$_3$ is obtained per hour.

806.90 kg filter cake of sodium chloride crystal with 14 mass % water content is obtained per hour in second solid-liquid separation device 92, and finally 693.93 kg sodium chloride (at 99.5 mass % purity) is obtained per hour; 3.925 m$^3$ second mother liquid at concentrations of 282.9 g/L NaCl, 79.6 g/L Na$_2$SO$_4$, 2.76 g/L NaOH, and 0.016 g/L NH$_3$ is obtained per hour.

In this embodiment, 3.448 m$^3$ ammonia at 1.53 mass % concentration is obtained per hour in the first ammonia storage tank 51, 2.074 m$^3$ ammonia at 0.05 mass % concentration is obtained per hour in the second ammonia storage tank 52, and the ammonia may be recycled and reused in a molecular sieve production process.

Embodiment 7

As shown in FIG. 4, waste water containing ammonium salts (containing 80 g/L NaCl, 82 g/L $Na_2SO_4$, 50 g/L $NH_4Cl$, and 52.1 g/L $(NH_4)_2SO_4$, with pH=6.8) is fed at 5 $m^3/h$ feed rate into the vacuum degassing tank 4 for vacuum degassing, 45.16 mass % sodium hydroxide solution is introduced into the pipeline connected to the first heat exchange device 31 (a titanium alloy plate-type heat exchanger) for the first pH adjustment, and the pH after the adjustment is monitored with the first pH measuring device 61 (a pH meter) (the measured value is 7.5); a part of the waste water containing ammonium salts after the first pH adjustment is fed by means of the first circulation pump 71 into the first heat exchange device 31 for the first heat exchange with the recycled condensate of the first ammonia-containing vapor, so that the temperature of the waste water is increased to 98° C., another part of the waste water after the first pH adjustment is fed by means of the first circulation pump 71 into the third heat exchange device 33 for the first heat exchange with the condensate of the second ammonia-containing vapor, so that the temperature of the waste water is increased to 48° C.; the two parts of waste water containing ammonium salts are merged and mixed with the returned second mother liquid (fed at 8.75 $m^3/h$ feed rate) to obtain waste water to be treated (the molar ratio of $SO_4^{2-}$ to $Cl^-$ contained in it is 1:6.261), then sodium hydroxide solution at 45.16 mass % concentration is introduced into the pipeline through which the waste water to be treated is fed into the second heat exchange device 32 for the second pH adjustment, and the pH value after the second pH adjustment is measured with the second pH measuring device 62 (pH meter) (the measured value is 10.8), then the waste water to be treated is fed into the second heat exchange device 32 (a titanium alloy plate-type heat exchanger) for first heat exchange with the recycled first ammonia-containing vapor, so that the temperature of the waste water to be treated is increased to 107° C.; after the first heat exchange, the waste water to be treated is fed into the first evaporation device 2 (a falling film+forced circulation two-stage MVR evaporating crystallizer) for evaporation, to obtain first ammonia-containing vapor and first concentrated solution that contains sodium sulfate crystal. Wherein the evaporation conditions in the first evaporation device 2 include: temperature: 100° C., pressure: −22.82 kPa, amount of evaporation: 3.92 $m^3/h$. The first ammonia-containing vapor obtained in the evaporation is compressed in the first compressor 101 (the temperature is increased by 12° C.), then the first ammonia-containing vapor flows through the second heat exchange device 32 and the first heat exchange device 31 to exchange heat with the waste water to be treated sequentially, and is cooled to obtain first ammonia, and the first ammonia is stored in the first ammonia storage tank 51. Besides, to improve the content of solids in the first evaporation device 2, a part of the liquid after the evaporation in the first evaporation device 2 is taken as first circulating liquid and circulated by means of the second circulation pump 72 to the second heat exchange device 32 for heat exchange, and then the first circulating liquid enters into the first evaporation device 2 again for the first evaporation (the first recirculation ratio is 77.8). The degree of the first evaporation is monitored with the densitometer provided on the first evaporation device 2, to control the concentration of sodium chloride in the first concentrated solution to be 0.9935X (306.2 g/L).

The first concentrated solution obtained in the evaporation in the first evaporation device 2 is fed into the first solid-liquid separation device 91 (a centrifugal machine) for the first solid-liquid separation, 10.58 $m^3$ first mother liquid that contains 306.2 g/L NaCl, 54.0 g/L $Na_2SO_4$, 1.4 g/L NaOH and 0.27 g/L $NH_3$ is obtained per hour, the first mother liquid is temporarily stored in the first mother liquid tank 53, the solid sodium sulfate obtained in the solid-liquid separation (809.7 kg filter cake of sodium sulfate crystal with 15 mass % water content is obtained per hour, wherein the content of sodium chloride is 6.9 mass % or lower) is eluted with 54 g/L sodium sulfate solution that is in the same dry mass as the filter cake of sodium sulfate crystal and then is dried, thus 688.25 kg sodium sulfate (at 99.7 mass % purity) is obtained per hour; the washing liquid is circulated by means of the fifth circulation pump 75 to the pipeline before the second heat exchange device 32 and mixed with the waste water therein, and the obtained mixture is fed into the first evaporation device 2 again for the first evaporation.

The second evaporation process is executed in the second evaporation device 1 (a falling film+forced circulation two-stage MVR evaporating crystallizer). The first mother liquid in the first mother liquid tank 53 is fed by means of the sixth circulation pump 76 into the second evaporation device 1 for the second evaporation, to obtain second concentrated solution that contains sodium chloride crystal. Wherein the evaporation conditions in the second evaporation device 1 include: temperature: 50° C., pressure: −92.67 kPa, amount of evaporation: 1.95 $m^3/h$. To improve the content of solids in the second evaporation device 1, a part of the first mother liquid after evaporation in the second evaporation device 1 is taken as second circulating liquid and circulated by means of the seventh circulation pump 77 to the fourth heat exchange device 34 for heat exchange with the second ammonia-containing vapor, and then is fed into the second evaporation device 1 for the second evaporation (the second recirculation ratio is 16). The second ammonia-containing vapor obtained in the evaporation is compressed in the second compressor 102 (the temperature is increased by 12° C.), then the second ammonia-containing vapor flows through the fourth heat exchange device 34 and the third heat exchange device 33 for heat exchange sequentially, and is cooled to obtain second ammonia, and the second ammonia is stored in the second ammonia storage tank 52. The washing liquid after the second solid-liquid separation and a part of the first mother liquid after the evaporation in the second evaporation device 1 are pumped by the ninth circulation pump 79 and the seventh circulation pump 77 respectively and mixed in the pipeline, and then the mixed liquid exchanges heat with the second ammonia-containing vapor in the fourth heat exchange device 34; a part of the waste water to be treated from the first circulation pump 71 exchanges heat with the condensate of the second ammonia-containing vapor in the third heat exchange device 33. The degree of the second evaporation is monitored with the densitometer provided on the second evaporation device 1, to control the concentration of sodium sulfate in the second concentrated solution to be 0.9702Y (65.3 g/L). The first mother liquid is evaporated in the second evaporation device 1 and thereby second concentrated solution that contains sodium chloride crystal is obtained.

The second concentrated solution that contains sodium chloride crystal is fed into the second solid-liquid separation device 92 (a centrifugal machine) for solid-liquid separation, 8.75 $m^3$ second mother liquid that contains 293.8 g/L NaCl, 65.3 g/L $Na_2SO_4$, 1.7 g/L NaOH and 0.013 g/L $NH_3$ is obtained per hour, and the second mother liquid is temporarily stored in the second mother liquid tank 54. The second mother liquid is circulated by means of the eighth circulation pump 78 to the waste water introduction pipeline before the second pH adjustment and mixed with the waste water therein to obtain waste water to be treated, the solid sodium chloride obtained in the solid-liquid separation (785.29 kg filter cake of sodium chloride crystal with 14 mass % water content is obtained per hour, wherein the content of sodium sulfate is 7.1 mass % or lower) is eluted with 293.8 g/L sodium chloride solution that is in the same dry mass as the sodium chloride, and then is dried in the drier, thus 675.35 kg sodium chloride (at 99.4 mass % purity) is obtained per hour; the second washing liquid obtained in the washing is circulated by means of the ninth circulation pump 79 to the second evaporation device 1.

In addition, the tail gas discharged from the vacuum degassing tank 4, the second heat exchange device 32 and the fourth heat exchange device 34 is introduced by means of the vacuum pump 81 into the tail gas absorption tower 83 for absorption. The tail gas absorption tower 83 has circulating water in it, the circulating water is circulated in the tail gas absorption tower 83 under the action of the fourth circulation pump 74, water is replenished to the tail gas absorption tower 83 by means of the third circulation pump 73 from the circulating water tank 82 at the same time; in addition, fresh water is replenished to the circulating water tank 82, and thereby the temperature and ammonia content of the service water of the vacuum pump 81 are decreased. Dilute sulfuric acid is further charged into the tail gas absorption tower 83 to absorb ammonia or the like in the tail gas.

In this embodiment, 3.92 m$^3$ ammonia at 3.53 mass % concentration is obtained per hour in the first ammonia storage tank 51, 1.95 m$^3$ ammonia at 0.144 mass % concentration is obtained per hour in the second ammonia storage tank 52, and the ammonia may be recycled and reused in a molecular sieve production process.

Besides, the MVR evaporation is initiated by charging steam at 143.3° C. temperature in the initial stage.

Embodiment 8

The waste water is treated with the method described in the embodiment 7, but: waste water containing ammonium salts that contains 60 g/L NaCl, 130 g/L Na$_2$SO$_4$, 15 g/L NH$_4$Cl and 33.0 g/L (NH$_4$)$_2$SO$_4$ with pH=6.8 is treated, and the molar ratio of SO$_4^{2-}$ to Cl$^-$ contained in the obtained waste water to be treated is 1:4.462. The temperature of the waste water after the heat exchange in the first heat exchange device 31 is 67° C., and the temperature of the waste water to be treated after the heat exchange in the second heat exchange device 32 is 102° C. The evaporation conditions in the first evaporation device 2 include: temperature: 95° C., pressure: −36.36 kPa, amount of evaporation: 4.48 m$^3$/h. The evaporation conditions in the second evaporation device 1 include: temperature: 55° C., pressure: −90.15 kPa, amount of evaporation: 1.05 m$^3$/h.

978.40 kg filter cake of sodium sulfate crystal with 15 mass % water content is obtained per hour in the first solid-liquid separation device 91, and finally 831.63 kg sodium sulfate (at 99.3 mass % purity) is obtained per hour; 7.25 m$^3$ first mother liquid at concentrations of 307.2 g/L NaCl, 54.5 g/L Na$_2$SO$_4$, 1.8 g/L NaOH, and 0.18 g/L NH$_3$ is obtained per hour.

444.79 kg filter cake of sodium chloride crystal with 15 mass % water content is obtained per hour in second solid-liquid separation device 92, and finally 378.07 kg sodium chloride (at 99.5 mass % purity) is obtained per hour; 6.30 m$^3$ second mother liquid at concentrations of 295.5 g/L NaCl, 63.1 g/L Na$_2$SO$_4$, 2.1 g/L NaOH, and 0.01 g/L NH$_3$ is obtained per hour.

In this embodiment, 4.48 m$^3$ ammonia at 1.4 mass % concentration is obtained per hour in the first ammonia storage tank 51, 1.05 m$^3$ ammonia at 0.11 mass % concentration is obtained per hour in the second ammonia storage tank 52, and the ammonia may be recycled and reused in a molecular sieve production process.

Embodiment 9

The waste water is treated with the method described in the embodiment 7, but: waste water containing ammonium salts that contains 160 g/L NaCl, 55 g/L Na$_2$SO$_4$, 32 g/L NH$_4$Cl and 11.2 g/L (NH$_4$)$_2$SO$_4$ with pH=6.2 is treated, and the molar ratio of SO$_4^{2-}$ to Cl$^-$ contained in the obtained waste water to be treated is 1:9.249. The temperature of the waste water after the heat exchange in the first heat exchange device 31 is 73° C., and the temperature of the waste water to be treated after the heat exchange in the second heat exchange device 32 is 112° C. The evaporation conditions in the first evaporation device 2 include: temperature: 105° C., pressure: −7.02 kPa, amount of evaporation: 2.63 m$^3$/h. The evaporation conditions in the second evaporation device 1 include: temperature: 45° C., pressure: −94.69 kPa, amount of evaporation: 2.86 m$^3$/h.

385.26 kg filter cake of sodium sulfate crystal with 14 mass % water content is obtained per hour in the first solid-liquid separation device 91, and finally 331.32 kg sodium sulfate (at 99.4 mass % purity) is obtained per hour; 11.98 m$^3$ first mother liquid at concentrations of 306.4 g/L NaCl, 52.5 g/L Na$_2$SO$_4$, 2.6 g/L NaOH, and 0.11 g/L NH$_3$ is obtained per hour.

1151.57 kg filter cake of sodium chloride crystal with 15 mass % water content is obtained per hour in second solid-liquid separation device 92, and finally 978.83 kg sodium chloride (at 99.4 mass % purity) is obtained per hour; 9.18 m$^3$ second mother liquid at concentrations of 291.2 g/L NaCl, 67.9 g/L Na$_2$SO$_4$, 3.4 g/L NaOH, and 0.0084 g/L NH$_3$ is obtained per hour.

In this embodiment, 2.63 m$^3$ ammonia at 2.3 mass % concentration is obtained per hour in the first ammonia storage tank 51, 2.86 m$^3$ ammonia at 0.043 mass % concentration is obtained per hour in the second ammonia storage tank 52, and the ammonia may be recycled and reused in a molecular sieve production process.

Embodiment 10

Figure 5:
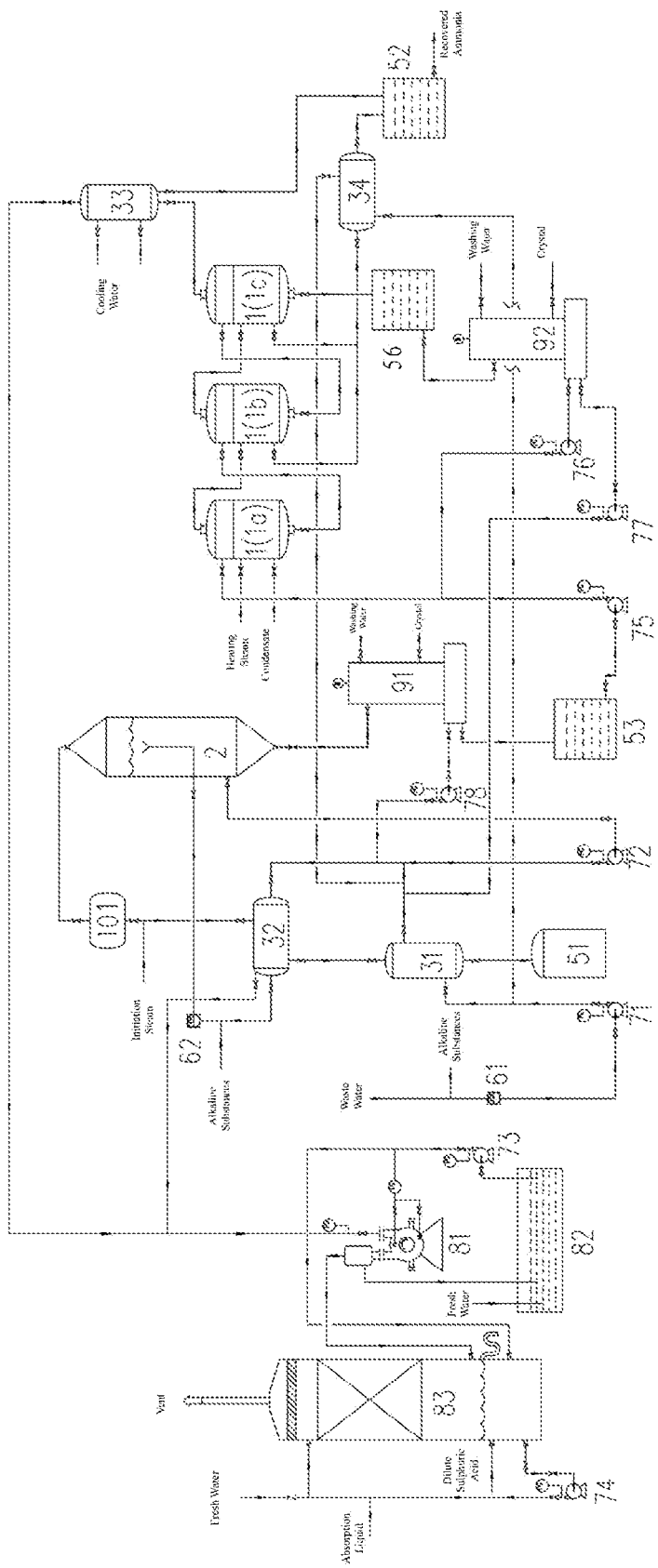
FIG. 5 is a flow diagram of the method for treating waste water containing ammonium salts in another embodiment of the present invention.

As shown in FIG. 5, waste water containing ammonium salts (containing 156 g/L NaCl, 50 g/L Na$_2$SO$_4$, 60 g/L NH$_4$Cl, and 19.55 g/L (NH$_4$)$_2$SO$_4$, with pH=6.3) is fed at 5 m$^3$/h feed rate into the pipeline of the treatment system, sodium hydroxide solution at 45.16 mass % concentration is introduced into the pipeline for the first pH adjustment, the pH after the adjustment is monitored with the first pH measuring device 61 (a pH meter) (the measured value is 7.5), a part of the waste water containing ammonium salts (2.5 m$^3$/h) after the first pH adjustment is fed into the first heat exchange device 31 (a plastic plate-type heat exchanger) for the first heat exchange with the condensate of the first ammonia-containing vapor, so that the temperature of the waste water containing ammonium salts is increased to 99° C., and the remaining part of the waste water containing ammonium salts is fed into the fourth heat exchange device 34 (a duplex stainless steel plate-type heat exchanger) for the first heat exchange with the condensate of the second ammonia-containing vapor, so that the temperature of the waste water containing ammonium salts is increased to 60° C.; then, the two parts of waste water are merged and mixed with the second mother liquid (fed at 15.31 m³/h feed rate) to obtain waste water to be treated (the molar ratio of $SO_4^{2-}$ to $Cl^-$ contained in the waste water to be treated is 1:10.356). Then, the waste water to be treated is fed into the second heat exchange device 32 (a titanium alloy plate-type heat exchanger) for the first heat exchange with the recycled first ammonia-containing vapor, so that the temperature of the waste water to be treated is increased to 113° C.; next, sodium hydroxide solution at 45.16 mass % concentration is introduced into the pipeline through which the waste water to be treated is fed into the first heat exchange device 2 (a falling film+forced circulation two-stage MVR evaporating crystallizer) for the second pH adjustment, the pH after the adjustment is monitored with the second pH measuring device 62 (a pH meter) (the measured value is 10.8); after the second pH adjustment, the waste water to be treated is fed into the first heat exchange device 2 for evaporation, to obtain first ammonia-containing vapor and first concentrated solution that contains sodium sulfate crystal. Wherein in the first evaporation device 2, the evaporation temperature is 105° C., the pressure is −7.02 kPa, and the amount of evaporation 2.53 m³/h. The first ammonia-containing vapor obtained in the evaporation is compressed in the compressor 10 (the temperature is increased by 14° C.), then the first ammonia-containing vapor flows through the second heat exchange device 32 and the first heat exchange device 31 to exchange heat with the waste water to be treated sequentially, and is cooled to obtain ammonia, and the ammonia is stored in the first ammonia storage tank 51. Besides, to improve the content of solids in the first evaporation device 2, a part of the liquid after the evaporation in the first evaporation device 2 is taken as circulating liquid and circulated by means of the second circulation pump 72 to the second heat exchange device 32 for heat exchange, and then the circulating liquid enters into the first evaporation device 2 again for the first evaporation (the recirculation ratio is 56.2). The degree of the first evaporation is monitored with the densitometer provided on the first evaporation device 2, to control the concentration of sodium chloride in the first concentrated solution to be 0.99352X (307.0 g/L).

The first concentrated solution is fed into the first solid-liquid separation device 91 (a centrifugal machine) for the first solid-liquid separation, 18.43 m³ first mother liquid that contains 307.0 g/L NaCl, 52.7 g/L $Na_2SO_4$, 1.67 g/L NaOH and 0.13 g/L $NH_3$ is obtained per hour, the first mother liquid is temporarily stored in the first mother liquid tank 53, the solid sodium sulfate obtained in the solid-liquid separation (407.73 kg filter cake of sodium sulfate crystal with 14 mass % water content is obtained per hour, wherein the content of sodium chloride is 6.8 mass % or lower) is eluted with 52.7 g/L sodium sulfate solution that is in the same dry mass as the filter cake of sodium sulfate crystal and then is dried, thus 350.64 kg sodium sulfate (at 99.4 mass % purity) is obtained per hour; the eluent obtained in the elution is circulated by means of the eighth circulation pump 78 to the second heat exchange device 32, and then is fed into the first evaporation device 2 again for the first evaporation.

The second evaporation process is executed in the second evaporation device 1 (a multi-effect evaporation device), which is composed of a first evaporator 1a, a second evaporator 1b, and a third evaporator 1c (all of them are forced circulation evaporators). The first mother liquid is fed by means of the fifth circulation pump 75 into the second evaporation device 1, the first mother liquid is evaporated in the first evaporator 1a, then is fed into the second evaporator 1b for evaporation, and is fed into the third evaporator 1c for evaporation; finally, second concentrated solution that contains sodium chloride crystal is obtained. Wherein in the first evaporator 1a, the evaporation temperature is 86° C., the pressure is −55.83 kPa, and the amount of evaporation is 1.08 m³/h; in the second evaporator 1b, the evaporation temperature is 71° C., the pressure is −77.40 kPa, and the amount of evaporation is 1.07 m³/h; in the third evaporator 1c, the evaporation temperature is 56° C., the pressure is −89.56 kPa, and the amount of evaporation is 1.06 m³/h. The second ammonia-containing vapor obtained in the evaporation in the first evaporator 1a in the second evaporation device 1 is fed into the second evaporator 1b to perform heat exchange and obtain second ammonia, the second ammonia-containing vapor obtained in the evaporation in the second evaporator 1b is charged into the third evaporator 1c to perform heat exchange and obtain first ammonia, the second ammonia is fed into the fourth heat exchange device 34 for heat exchange with the waste water containing ammonium salts, and then is stored in the second ammonia storage tank 52. Heating steam (i.e., live steam used conventionally in the art) is charged into the first evaporator 1a, and the condensate obtained through condensation of the heating steam in the first evaporator 1a is used to prepare washing solution. The second ammonia-containing vapor obtained in the evaporation in the third evaporator 1c is fed into the third heat exchange device 33 to exchange heat with the cold medium and obtain second ammonia, and the second ammonia is stored in the second ammonia storage tank 52. The degree of the second evaporation is monitored with the densitometer provided on the second evaporation device 1, to control the concentration of sodium sulfate in the second concentrated solution to be 0.9693Y (63.1 g/L). After the first mother liquid is evaporated in the second evaporation device 1, the finally obtained second concentrated solution that contains sodium chloride crystal is controlled to crystallize in the crystal-liquid collection tank 56 (the crystallization temperature is 55° C., and the crystallization time is 30 min.) to obtain crystal slurry that contains sodium chloride crystal.

The crystal slurry that contains sodium chloride crystal is fed into the second solid-liquid separation device 92 (a centrifugal machine) for solid-liquid separation, and 15.31 m³ second mother liquid that contains 295.6 g/L NaCl, 63.1 g/L $Na_2SO_4$, 2.0 g/L NaOH, and 0.13 g/L $NH_3$ is obtained per hour; the second mother liquid is circulated by means of the seventh circulation pump 77 to the waste water introduction pipeline and mixed with the waste water containing ammonium salts to obtain waste water to be treated; the solid sodium chloride obtained in the solid-liquid separation (1293.73 kg filter cake of sodium chloride crystal with 14 mass % water content is obtained per hour, wherein the content of sodium sulfate is 7.0 mass % or lower) is eluted with 295 g/L sodium chloride solution that is in the same dry mass as the sodium chloride, and then is dried in a drier, thus 1112.6 kg sodium chloride (at 99.4 mass % purity) is obtained per hour; the washing liquid obtained in the washing is circulated by means of the sixth circulation pump 76 to the second evaporation device 1.

In addition, the tail gas discharged from the second heat exchange device 32 and the third heat exchange device 33 is introduced by means of the vacuum pump 81 into the tail gas absorption tower 83 for absorption. The tail gas absorption tower 83 has circulating water in it, the circulating water is circulated in the tail gas absorption tower 83 under the action of the fourth circulation pump 74, water is replenished to the tail gas absorption tower 83 by means of the third circulation pump 73 from the circulating water tank 82 at the same time; in addition, fresh water is replenished to the circulating water tank 82, and thereby the temperature and ammonia content of the service water of the vacuum pump 81 are decreased. Dilute sulfuric acid is further charged into the tail gas absorption tower 83 to absorb ammonia or the like in the tail gas.

In this embodiment, 2.53 m³ ammonia at 4.44 mass % concentration is obtained per hour in the first ammonia storage tank 51, 3.21 m³ ammonia at 0.072 mass % concentration is obtained per hour in the second ammonia storage tank 52, and the ammonia may be recycled and reused in a molecular sieve production process.

Besides, the MVR evaporation is initiated by charging steam at 143.3° C. temperature in the initial stage.

Embodiment 11

The waste water containing ammonium salts is treated with the method described in the embodiment 10, but: waste water containing ammonium salts that contains 71 g/L NaCl, 132 g/L $Na_2SO_4$, 16 g/L $NH_4Cl$ and 30.24 g/L $(NH_4)_2SO_4$ with pH=7.0 is treated, and the molar ratio of $SO_4^{2-}$ to $Cl^-$ contained in the obtained waste water to be treated is 1:4.163. The temperature of the waste water to be treated after the heat exchange in the first heat exchange device 31 is 64° C., and the temperature of the waste water to be treated after the heat exchange in the second heat exchange device 32 is 102° C. The evaporation conditions in the first evaporation device 2 include: temperature: 95° C., pressure: −36.36 kPa, amount of evaporation: 2.53 m³/h. The evaporation conditions in the first evaporator 1a in the second evaporation device 1 include: temperature: 80° C., pressure: −65.87 kPa, amount of evaporation: 0.43 m³/h. The evaporation conditions in the second evaporator 1b include: temperature: 64° C., pressure: −84.0 kPa, amount of evaporation: 0.43 m³/h. The evaporation conditions in the third evaporator 1c include: temperature: 46° C., pressure: −94.33 kPa, amount of evaporation: 0.42 m³/h.

970.09 kg filter cake of sodium sulfate crystal with 15 mass % water content is obtained per hour in the first solid-liquid separation device 91, and finally 824.57 kg sodium sulfate (at 99.5 mass % purity) is obtained per hour; 6.59 m³ first mother liquid at concentrations of 305.6 g/L NaCl, 55.15 g/L $Na_2SO_4$, 1.15 g/L NaOH, and 0.19 g/L $NH_3$ is obtained per hour.

518.3 kg filter cake of sodium chloride crystal with 15 mass % water content is obtained per hour in second solid-liquid separation device 92, and finally 440.5 kg sodium chloride (at 99.5 mass % purity) is obtained per hour; 5.42 m³ second mother liquid at concentrations of 292.6 g/L NaCl, 67.4 g/L $Na_2SO_4$, 1.4 g/L NaOH, and 0.012 g/L $NH_3$ is obtained per hour.

In this embodiment, 4.26 m³ ammonia at 1.46 mass % concentration is obtained per hour in the first ammonia storage tank 51, 1.28 m³ ammonia at 0.095 mass % concentration is obtained per hour in the second ammonia storage tank 52, and the ammonia may be recycled and reused in a molecular sieve production process.

Embodiment 12

The waste water containing ammonium salts is treated with the method described in the embodiment 10, but: waste water containing ammonium salts that contains 118 g/L NaCl, 116 g/L $Na_2SO_4$, 19 g/L $NH_4Cl$ and 18.99 g/L $(NH_4)_2SO_4$ with pH=6.8 is treated, and the molar ratio of $SO_4^{2-}$ to $Cl^-$ contained in the obtained waste water to be treated is 1:6.419. The temperature of the waste water to be treated after the heat exchange in the first heat exchange device 31 is 97° C., and the temperature of the waste water to be treated after the heat exchange in the second heat exchange device 32 is 107° C. The evaporation conditions in the first evaporation device 2 include: temperature: 100° C., pressure: −22.83 kPa, amount of evaporation: 3.52 m³/h. The evaporation conditions in the first evaporator 1a in the second evaporation device 1 include: temperature: 86° C., pressure: −55.83 kPa, amount of evaporation: 0.667 m³/h. The evaporation conditions in the second evaporator 1b include: temperature: 71° C., pressure: −77.4 kPa, amount of evaporation: 0.666 m³/h. The evaporation conditions in the third evaporator 1c include: temperature: 56° C., pressure: −89.56 kPa, amount of evaporation: 0.665 m³/h.

792.33 kg filter cake of sodium sulfate crystal with 14 mass % water content is obtained per hour in the first solid-liquid separation device 91, and finally 681.41 kg sodium sulfate (at 99.5 mass % purity) is obtained per hour; 10.95 m³ first mother liquid at concentrations of 305.8 g/L NaCl, 53.84 g/L $Na_2SO_4$, 2.2 g/L NaOH, and 0.099 g/L $NH_3$ is obtained per hour.

817.22 kg filter cake of sodium chloride crystal with 14 mass % water content is obtained per hour in second solid-liquid separation device 92, and finally 694.64 kg sodium chloride (at 99.4 mass % purity) is obtained per hour; 9.06 m³ second mother liquid at concentrations of 293.3 g/L NaCl, 65 g/L $Na_2SO_4$, 2.656 g/L NaOH, and 0.0072 g/L $NH_3$ is obtained per hour.

In this embodiment, 3.515 m³ ammonia at 1.5 mass % concentration is obtained per hour in the first ammonia storage tank 51, 1.998 m³ ammonia at 0.051 mass % concentration is obtained per hour in the second ammonia storage tank 52, and the ammonia may be recycled and reused in a molecular sieve production process.

Embodiment 13

As shown in FIG. 6, waste water containing ammonium salts (containing 159 g/L NaCl, 48 g/L $Na_2SO_4$, 39 g/L $NH_4Cl$, and 12 g/L $(NH_4)_2SO_4$, pH=7) is fed at 5 m³/h feed rate into the treatment system by means of the first circulation pump 71, sodium hydroxide solution at 45.16 mass % concentration is introduced into the main pipeline of the first heat exchange device 31 and the fifth heat exchange device 35 (both are titanium alloy plate-type heat exchangers) for the first pH adjustment, and the pH after the adjustment is monitored with the first pH measuring device 61 (a pH meter) (the measured value is 7.8); after the first pH adjustment, the waste water containing ammonium salts is fed into the first heat exchange device 31 and the fifth heat exchange device 35 respectively for the first heat exchange with the condensate of the third ammonia-containing vapor and the third concentrated solution that contains sodium sulfate crystal and sodium chloride crystal (obtained in the third evaporation), so that the temperature of the waste water containing ammonium salts is increased to 102° C.; then the waste water containing ammonium salts is mixed with the fourth mother liquid to obtain waste water to be treated (the molar ratio of $SO_4^{2-}$ to $Cl^-$ obtained in it is 1:11.346), sodium hydroxide solution at 45.16 mass % concentration is introduced into the pipeline through which the waste water to be treated is fed into the second heat exchange device 32 to perform the second pH adjustment, the pH after the adjustment is monitored with the second pH measuring device 62 (a pH meter) (the measured value is 11), then the waste water to be treated is fed into the second heat exchange device 32 (a titanium alloy plate-type heat exchanger) to perform the first heat exchange with the recycled third ammonia-containing vapor so that the temperature of the waste water to be treated is increased to 112° C.; next, after twice first heat exchanges, the waste water to be treated is fed at 476.5 m$^3$/h feed rate into the first evaporation device 2 (a falling film+forced circulation two-stage MVR evaporating crystallizer) for evaporation, to obtain third ammonia-containing vapor and third concentrated solution that contains sodium sulfate crystal and sodium chloride crystal. Wherein the evaporation conditions of the third evaporation include: temperature: 105° C., pressure: −7.02 kPa, amount of evaporation: 4.82 m$^3$/h. The third ammonia-containing vapor obtained in the evaporation is compressed in the first compressor 101 (the temperature is increased by 18° C.), then the third ammonia-containing vapor flows through the second heat exchange device 32 and the first heat exchange device 31 to exchange heat with the waste water to be treated sequentially, and is cooled to obtain third ammonia, and the third ammonia is stored in the first ammonia storage tank 51. Besides, to improve the content of solids in concentrated solution in the first evaporation device 2, a part of the liquid after the evaporation in the first evaporation device 2 is circulated by means of the second circulation pump 72 to the second heat exchange device 32, and then is fed into the first evaporation device 2 again for the third evaporation (the third recirculation ratio is 95.3). The degree of the third evaporation is monitored with the mass flowmeter provided on the first evaporation device 2, to control the amount of evaporation in the third evaporation to be 4.82 m$^3$/h (equivalent to controlling the concentration of sodium sulfate in the treated solution to be 0.978Y, i.e., 88.9 g/L).

The obtained third concentrated solution that contains sodium sulfate crystal and sodium chloride crystal is treated at a low temperature in the low temperature treatment tank 22 (temperature: 20° C., time: 60 min.) to obtain treated solution that contains sodium chloride crystal.

The treated liquid that contains sodium chloride crystal is fed into the first solid-liquid separation device 91 (a centrifugal machine) for the third solid-liquid separation, 7.17 m$^3$ third mother liquid that contains 279.8 g/L NaCl, 88.9 g/L Na$_2$SO$_4$, 2.64 g/L NaOH and 0.31 g/L NH$_3$ is obtained per hour, the third mother liquid is temporarily stored in the first mother liquid tank 53, the solid sodium chloride obtained in the solid-liquid separation (1190.32 kg filter cake of sodium chloride crystal with 15 mass % water content is obtained per hour, wherein the content of sodium sulfate is 3.9 mass % or lower) is eluted with 279.8 g/L sodium chloride solution that is in the same dry mass as the filter cake of sodium chloride crystal and then is dried in a drier, thus 1011.78 kg sodium chloride (at 99.5 mass % purity) is obtained per hour; the washing liquid is circulated by means of the eighth circulation pump 78 to the second heat exchange device 32, and then is fed into the first evaporation device 2 again for the third evaporation.

The fourth evaporation process is executed in the second evaporation device 1 (a falling film+forced circulation two-stage MVR evaporating crystallizer). The third mother liquid in the first mother liquid tank 53 is fed by means of the sixth circulation pump 76 into the third heat exchange device 33 and the fourth heat exchange device 34 sequentially, and then is fed into the second evaporation device 1 for the fourth evaporation, to obtain fourth concentrated solution that contains sodium sulfate crystal. Wherein the evaporation conditions in the second evaporation device 1 include: temperature: 105° C., pressure: −7.02 kPa, amount of evaporation: 0.78 m$^3$/h. To improve the content of solids in the concentrated solution in the second evaporation device 1, a part of the third mother liquid after evaporation in the second evaporation device 1 is taken as circulating liquid and circulated by means of the seventh circulation pump 77 to the fourth heat exchange device 34, and then is fed into the second evaporation device 1 for the fourth evaporation (the fourth recirculation ratio is 9.6). The fourth ammonia-containing vapor obtained in the evaporation is compressed in the second compressor 102 (the temperature is increased by 18° C.), then the fourth ammonia-containing vapor flows through the fourth heat exchange device 34 and the third heat exchange device 33 for heat exchange sequentially with the third mother liquid, and is cooled to obtain fourth ammonia, and the fourth ammonia is stored in the second ammonia storage tank 52. The degree of the fourth evaporation is monitored with the mass flowmeter provided on the second evaporation device 1, to control the concentration of sodium chloride in the concentrated solution obtained through the fourth evaporation to be 0.9935X (306.5 g/L).

The fourth concentrated solution that contains sodium sulfate crystal is fed into the second solid-liquid separation device 92 (a centrifugal machine) for the fourth solid-liquid separation, thus 6.70 m$^3$ fourth mother liquid that contains 306.5 g/L NaCl, 52.5 g/L Na$_2$SO$_4$, 2.89 g/L NaOH and 0.01 g/L NH$_3$ is obtained per hour, and the fourth mother liquid is temporarily stored in the second mother liquid tank 54. All of the fourth mother liquid is circulated by means of the ninth circulation pump 79 to the waste water pipeline between the first heat exchange device 31 and the second heat exchange device 32 and mixed with the waste water containing ammonium salts therein to obtain waste water to be treated. The solid sodium sulfate obtained in the solid-liquid separation (349.84 kg filter cake of sodium sulfate crystal with 14 mass % water content is obtained per hour, wherein the content of sodium chloride is 3.9 mass % or lower) is eluted with 52.5 g/L sodium sulfate solution in the same dry mass as the sodium sulfate, and is dried in a drier, thus 300.87 kg sodium sulfate (at 99.5 mass % purity) is obtained per hour; the washing liquid is circulated by means of the tenth circulation pump 80 to the second evaporation device 1.

In addition, the tail gas discharged from the second heat exchange device 32 and the fourth heat exchange device 34 is introduced by means of the vacuum pump 81 into the tail gas absorption tower 83 for absorption. The tail gas absorption tower 83 has circulating water in it, the circulating water is circulated in the tail gas absorption tower 83 under the action of the fourth circulation pump 74, water is replenished to the tail gas absorption tower 83 by means of the third circulation pump 73 from the circulating water tank 82 at the same time; in addition, fresh water is replenished to the circulating water tank 82, and thereby the temperature and ammonia content of the service water of the vacuum pump 81 are decreased. Dilute sulfuric acid is further charged into the tail gas absorption tower 83 to absorb ammonia or the like in the tail gas. Besides, the MVR evaporation is initiated by charging steam at 143.3° C. temperature in the initial stage.

In this embodiment, 4.82 m$^3$ ammonia at 1.5 mass % concentration is obtained per hour in the first ammonia storage tank 51, 0.78 m$^3$ ammonia at 0.28 mass % concentration is obtained per hour in the second ammonia storage tank 52, and the ammonia may be recycled and reused in a molecular sieve production process.

Embodiment 14

The waste water containing ammonium salts is treated with the method described in the embodiment 13, but: waste water containing ammonium salts that contains 58 g/L NaCl, 120 g/L $Na_2SO_4$, 19 g/L $NH_4Cl$ and 40 g/L $(NH_4)_2SO_4$ with pH=7.1 is treated, and the molar ratio of $SO_4^{2-}$ to $Cl^-$ contained in the obtained waste water to be treated is 1:8.665. The temperature of the waste water containing ammonium salts after the heat exchange in the first heat exchange device 31 and the fifth heat exchange device 35 is 97° C., and the temperature of the waste water to be treated after the heat exchange in the second heat exchange device 32 is 97.5° C. The evaporation conditions of the third evaporation include: temperature: 100° C., pressure: −22.83 kPa, amount of evaporation: 3.47 m³/h. The temperature of the low temperature treatment is 25° C., and the retention time is 55 min. The evaporation conditions of the fourth evaporation include: temperature: 95° C., pressure: −36.36 kPa, amount of evaporation: 2.28 m³/h.

454.10 kg filter cake of sodium chloride crystal with 14 mass % water content is obtained per hour in the first solid-liquid separation device 91, and finally 390.53 kg sodium chloride (at 99.6 mass % purity) is obtained per hour; 25.59 m³ third mother liquid at concentrations of 280.6 g/L NaCl, 82.9 g/L $Na_2SO_4$, 2.2 g/L NaOH, and 0.12 g/L $NH_3$ is obtained per hour.

962.68 kg filter cake of sodium sulfate crystal with 15 mass % water content is obtained per hour in the second solid-liquid separation device 92, and finally 818.28 kg sodium sulfate (at 99.5 mass % purity); 23.56 m³ fourth mother liquid at concentrations of 303.2 g/L NaCl, 55.3 g/L $Na_2SO_4$, 2.4 g/L NaOH and 0.005 g/L $NH_3$ are obtained per hour.

In this embodiment, 3.47 m³ ammonia at 2.2 mass % concentration is obtained per hour in the first ammonia storage tank 51, 2.28 m³ ammonia at 0.13 mass % concentration is obtained per hour in the second ammonia storage tank 52, and the ammonia may be recycled and reused in a molecular sieve production process.

Embodiment 15

The waste water containing ammonium salts is treated with the method described in the embodiment 13, but: waste water containing ammonium salts that contains 80 g/L NaCl, 78 g/L $Na_2SO_4$, 29 g/L $NH_4Cl$ and 28.7 g/L $(NH_4)_2SO_4$ with pH=6.6 is treated, and the molar ratio of $SO_4^{2-}$ to $Cl^-$ contained in the obtained waste water to be treated is 1:8.745. The temperature of the waste water containing ammonium salts after the heat exchange in the first heat exchange device 31 and the fifth heat exchange device 35 is 105° C., and the temperature of the waste water to be treated after the heat exchange in the second heat exchange device 32 is 117° C. The evaporation conditions of the third evaporation include: temperature: 110° C., pressure: 11.34 kPa, amount of evaporation: 4.26 m³/h. The evaporation conditions of the fourth evaporation include: temperature: 100° C., pressure: −22.82 kPa, amount of evaporation: 1.40 m³/h. The temperature of the low temperature treatment is 20° C., and the retention time is 60 min.

657.86 kg filter cake of sodium chloride crystal with 15 mass % water content is obtained per hour in the first solid-liquid separation device 91, and finally 559.18 kg sodium chloride (at 99.4 mass % purity) is obtained per hour; 13.55 m³ third mother liquid at concentrations of 280.2 g/L NaCl, 89.1 g/L $Na_2SO_4$, 1.7 g/L NaOH, and 0.18 g/L $NH_3$ is obtained per hour.

632.55 kg filter cake of sodium sulfate crystal with 14 mass % water content is obtained per hour in the second solid-liquid separation device 92, and finally 543.99 kg sodium sulfate (at 99.5 mass % purity) is obtained per hour; 12.39 m³ fourth mother liquid at concentrations of 306.1 g/L NaCl, 53.9 g/L $Na_2SO_4$, 1.85 g/L NaOH, and 0.0099 g/L $NH_3$ is obtained per hour.

In this embodiment, 4.26 m³ ammonia at 1.8 mass % concentration is obtained per hour in the first ammonia storage tank 51, 1.40 m³ ammonia at 0.16 mass % concentration is obtained per hour in the second ammonia storage tank 52, and the ammonia may be recycled and reused in a molecular sieve production process.

Embodiment 16

Figure 7:
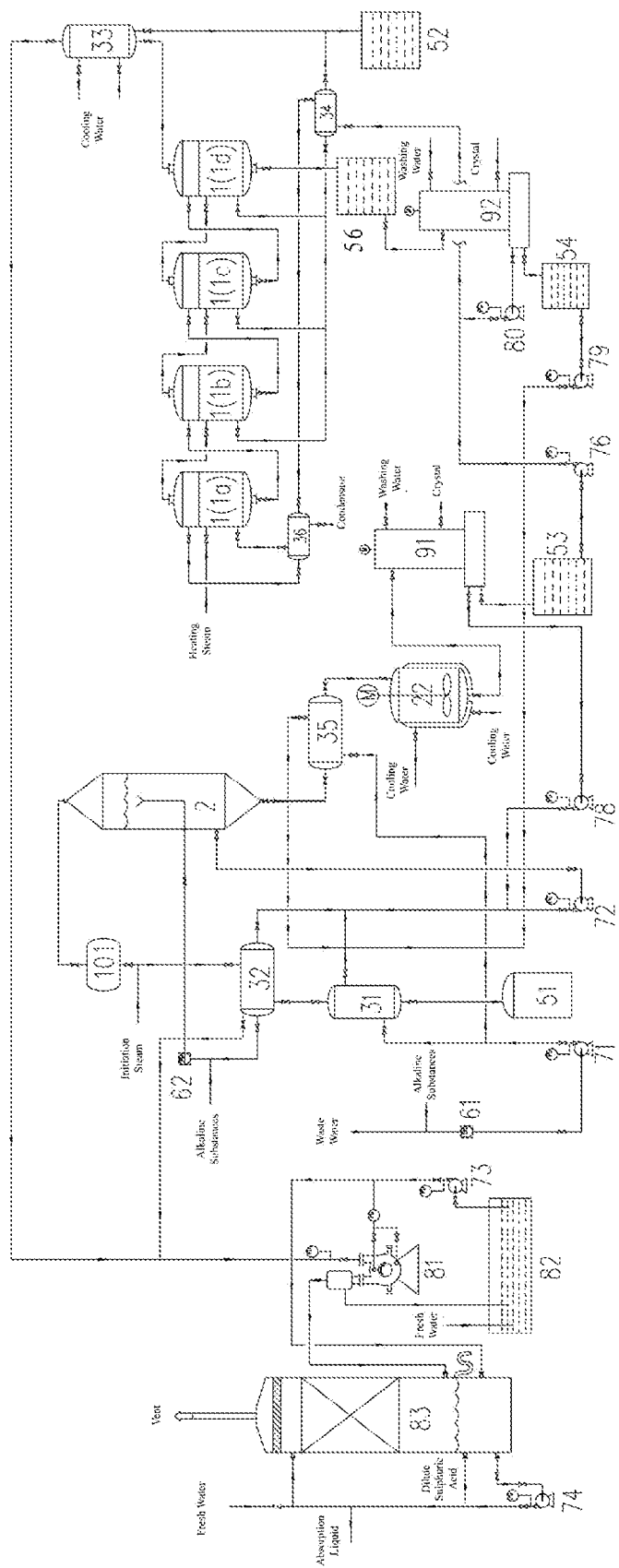
FIG. 7 is a flow diagram of the method for treating waste water containing ammonium salts in another embodiment of the present invention.

As shown in FIG. 7, the waste water containing ammonium salts (containing 149 g/L NaCl, 49 g/L $Na_2SO_4$, 45 g/L $NH_4Cl$, and 15 g/L $(NH_4)_2SO_4$, with pH=7.0) is fed at 5 m³/h feed rate into the pipeline of the treatment system, sodium hydroxide solution at 45.16 mass % concentration is introduced into the pipeline before the first heat exchange device 31 or the fifth heat exchange device 35 (both of them are titanium alloy plate-type heat exchangers) for the first pH adjustment, and the pH after the mixing is monitored with the first pH measuring device 61 (a pH meter) (the measured value is 8); a part of the waste water containing ammonium salts (4.5 m³/h) is fed by means of the first circulation pump 71 into the first heat exchange device 31 to perform first heat exchange with the recycled condensate of the third ammonia-containing vapor, so that the temperature of the waste water containing ammonium salts is increased to 103° C., and the remaining part of the waste water containing ammonium salts is fed into the fifth heat exchange device 35 to perform the first heat exchange with the third concentrated solution, so that the temperature of the waste water containing ammonium salts is increased to 103° C.; next, the parts of the waste water containing ammonium salts are merged and then the merged waste water is mixed with the fourth mother liquid to obtain waste water to be treated (the molar ratio of $SO_4^{2-}$ to Cl− contained in it is 1:11.227); then the waste water to be treated is fed into the second heat exchange device 32 to perform the first heat exchange with the third ammonia-containing vapor, so that the temperature of the waste water to be treated is increased to 112° C.; then, sodium hydroxide solution at 45.16 mass % is introduced into the pipeline through which the waste water to be treated is fed into the first evaporation device 2 for the second pH adjustment, and the pH after the adjustment is monitored with the second pH measuring device 62 (a pH meter) (the measured value is 10.8); after the second pH adjustment, the waste water to be treated is fed into the first evaporation device 2 (a falling film+forced circulation two-stage MVR evaporating crystallizer) for evaporation, and thus third ammonia-containing vapor and third concentrated solution that contains sodium sulfate crystal and sodium chloride crystal are obtained. The third ammonia-containing vapor obtained in the evaporation is compressed in the first compressor 101 (the temperature is increased by 17° C.), then the third ammonia-containing vapor flows through the second heat exchange device 32 and the first heat exchange device 31 sequentially to exchange heat with the waste water to be treated and the waste water containing ammonium salts respectively, and is cooled to obtain third ammonia, and the third ammonia is stored in the first ammonia storage tank 51. Besides, to improve the content of solids in the concentrated solution in the first evaporation device 2, a part of the liquid after the evaporation in the first evaporation device 2 is taken as circulating liquid and circulated by means of the second circulation pump 72 to the second heat exchange device 32 for heat exchange, and then is fed into the first evaporation device 2 again for the third evaporation (the recirculation ratio is 92.6). The degree of the third evaporation is monitored with the mass flowmeter provided on the first evaporation device 2, to control the amount of evaporation in the third evaporation to be 4.69 m³/h (equivalent to controlling the concentration of sodium sulfate in the treated solution to be 0.976Y, i.e., 83 g/L). Wherein the evaporation conditions of the third evaporation are shown in Table 4:

TABLE 4

| Evaporation device | | Temperature/ °C. | Pressure/ kPa | Amount of evaporation/ (m³/h) |
|---|---|---|---|---|
| First evaporation device 2 | | 105 | −7.02 | 4.69 |
| Second evaporation device 1 (multi-effect evaporation device) | First evaporator 1a | 145 | 239.9 | 0.25 |
| | Second evaporator 1b | 130 | 116.77 | 0.25 |
| | Third evaporator 1c | 115 | 32.56 | 0.25 |
| | Fourth evaporator 1d | 100 | −22.83 | 0.24 |

The obtained third concentrated solution that contains sodium sulfate crystal and sodium chloride crystal is treated at a low temperature in the low temperature treatment tank 22 (temperature: 25° C., retention time: 55 min.) to obtain treated solution that contains sodium chloride crystal.

The treated liquid that contains sodium chloride crystal is fed into the first solid-liquid separation device 91 (a centrifugal machine) for the third solid-liquid separation, 9.38 m³ third mother liquid that contains 281 g/L NaCl, 83 g/L Na$_2$SO$_4$, 1.66 g/L NaOH and 0.18 g/L NH$_3$ is obtained per hour, the third mother liquid is temporarily stored in the first mother liquid tank 53, the solid sodium chloride obtained in the solid-liquid separation (1157.43 kg filter cake of sodium chloride crystal with 14 mass % water content is obtained per hour, wherein the content of sodium sulfate is 3.6 mass % or lower) is eluted with 281 g/L sodium chloride solution that is in the same dry mass as the filter cake of sodium chloride crystal and then is dried in a drier, thus 995.39 kg sodium chloride (at 99.4 mass % purity) is obtained per hour; the washing liquid is circulated by means of the eighth circulation pump 78 to the second heat exchange device 32, and then is fed into the first evaporation device 2 again for the third evaporation.

The fourth evaporation process is executed in the second evaporation device 1, which is composed of a first evaporator 1a, a second evaporator 1b, a third evaporator 1c, and a fourth evaporator 1d (all of them are forced circulation evaporators). The third mother liquid in the first mother liquid tank 53 is fed by means of the sixth circulation pump 76 into the fourth heat exchange device 34 and the sixth heat exchange device 36 for heat exchange sequentially, and then is fed into the evaporators in the second evaporation device 1 for the fourth evaporation, to obtain fourth concentrated solution that contains sodium sulfate crystal. The conditions of the evaporations are shown in the above Table 1. The fourth ammonia-containing vapor obtained in the evaporation in each evaporator is fed into the next evaporator to perform heat exchange and obtain condensate, then further performs heat exchange with the third mother liquid in the fourth heat exchange device 34 to obtain fourth ammonia; the fourth ammonia-containing vapor obtained in the evaporation in the fourth evaporator 1d performs heat exchange with the cooling water (the waste water containing ammonium salts) in the third heat exchange device 33 and thereby fourth ammonia is obtained; the fourth ammonia is merged and stored in the second ammonia storage tank 52. Heating steam (i.e., live steam used conventionally in the art) is charged into the first evaporator 1a, and the condensate obtained through condensation of the heating steam in the first evaporator 1a is fed into the sixth heat exchange device 36 to further preheat the third mother liquid, and then is used to prepare washing solution. The degree of the third evaporation is monitored with the densitometer provided on the second evaporation device 1, to control the concentration of sodium chloride in the concentrated solution obtained through the fourth evaporation to be 0.9935X (308.1 g/L). The fourth concentrated solution obtained in the evaporation in the second evaporation device 1 is controlled to crystallize in the crystal-liquid collection tank 56 (crystallization temperature: 100° C., crystallization time: 5 min.), to obtain crystal slurry that contains sodium sulfate crystal.

The crystal slurry that contains sodium chloride crystal is fed into the second solid-liquid separation device 92 (a centrifugal machine) for the fourth solid-liquid separation, 8.70 m³ fourth mother liquid that contains 308.1 g/L NaCl, 53.9 g/L Na$_2$SO$_4$, 1.82 g/L NaOH and 0.01 g/L NH$_3$ is obtained per hour, and the fourth mother liquid is temporarily stored in the second mother liquid tank 54. All of the fourth mother liquid is circulated by means of the ninth circulation pump 79 to the waste water pipeline between the first heat exchange device 31 and the second heat exchange device 32 and is mixed with the waste water containing ammonium salts to obtain waste water to be treated. The solid sodium sulfate obtained in the solid-liquid separation (378.37 kg filter cake of sodium sulfate crystal with 15 mass % water content is obtained per hour, wherein the content of sodium chloride is 4.3 mass % or lower) is eluted with 53.9 g/L sodium sulfate solution in the same dry mass as the sodium sulfate, and is dried in a drier, thus 321.62 kg sodium sulfate (at 99.5 mass % purity) is obtained per hour; the washing liquid is circulated by means of the tenth circulation pump 80 to the second evaporation device 1.

In addition, the tail gas discharged from the second heat exchange device 32 and the third heat exchange device 33 is introduced by means of the vacuum pump 81 into the tail gas absorption tower 83 for absorption. The tail gas absorption tower 83 has circulating water in it, the circulating water is circulated in the tail gas absorption tower 83 under the action of the fourth circulation pump 74, water is replenished to the tail gas absorption tower 83 by means of the third circulation pump 73 from the circulating water tank 82 at the same time; in addition, fresh water is replenished to the circulating water tank 82, and thereby the temperature and ammonia content of the service water of the vacuum pump 81 are decreased. Dilute sulfuric acid is further charged into the tail gas absorption tower 83 to absorb ammonia or the like in the tail gas. Besides, the MVR evaporation is initiated by charging steam at 143.3° C. temperature in the initial stage.

In this embodiment, 4.69 m³ ammonia at 1.8 mass % concentration is obtained per hour in the first ammonia storage tank 51, 0.99 m³ ammonia at 0.17 mass % concentration is obtained per hour in the second ammonia storage tank 52, and the ammonia may be recycled and reused in a molecular sieve production process.

Embodiment 17

The waste water containing ammonium salts is treated with the method described in the embodiment 16, but: waste water containing ammonium salts that contains 69 g/L NaCl, 138 g/L Na$_2$SO$_4$, 12 g/L NH$_4$Cl and 24.4 g/L (NH$_4$)$_2$SO$_4$ with pH=7.1 is treated, and the molar ratio of SO$_4^{2-}$ to Cl$^-$ contained in the obtained waste water to be treated is 1:9.085. The temperature of the waste water containing ammonium salts after the heat exchange in the first heat exchange device 31 and the fifth heat exchange device 35 is 104° C., and the temperature of the waste water to be treated after the heat exchange in the second heat exchange device 32 is 114° C. The evaporation conditions of the third evaporation and the fourth evaporation are shown in Table 5. The temperature of the low temperature treatment is 30° C., and the retention time is 50 min.

TABLE 5

| Evaporation device | | Temperature/ ° C. | Pressure/ kPa | Amount of evaporation/ (m$^3$/h) |
|---|---|---|---|---|
| First evaporation device 2 | | 107 | 0 | 3.31 |
| Second evaporation device 1 (multi-effect evaporation device) | First evaporator 1a | 150 | 291.6 | 0.58 |
| | Second evaporator 1b | 135 | 152.93 | 0.58 |
| | Third evaporator 1c | 120 | 56.97 | 0.58 |
| | Fourth evaporator 1d | 105 | −7.02 | 0.58 |

475.12 kg filter cake of sodium chloride crystal with 14 mass % water content is obtained per hour in the first solid-liquid separation device 91, and finally 408.95 kg sodium chloride (at 99.4 mass % purity) is obtained per hour; 26.11 m$^3$ third mother liquid at concentrations of 283.4 g/L NaCl, 79.9 g/L Na$_2$SO$_4$, 2.66 g/L NaOH, and 0.077 g/L NH$_3$ is obtained per hour.

968.12 kg filter cake of sodium sulfate crystal with 15 mass % water content is obtained per hour in the second solid-liquid separation device 92, and finally 822.91 kg sodium sulfate (at 99.5 mass % purity) is obtained per hour; 24.04 m$^3$ fourth mother liquid at concentrations of 306.3 g/L NaCl, 52.5 g/L Na$_2$SO$_4$, 2.97 g/L NaOH, and 0.003 g/L NH$_3$ is obtained per hour.

In this embodiment, 3.31 m$^3$ ammonia at 1.4 mass % concentration is obtained per hour in the first ammonia storage tank 51, 2.32 m$^3$ ammonia at 0.08 mass % concentration is obtained per hour in the second ammonia storage tank 52, and the ammonia may be recycled and reused in a molecular sieve production process.

Embodiment 18

The waste water containing ammonium salts is treated with the method described in the embodiment 16, but: waste water containing ammonium salts that contains 106 g/L NaCl, 103 g/L Na$_2$SO$_4$, 21 g/L NH$_4$Cl and 20.7 g/L (NH$_4$)$_2$SO$_4$ with pH=7.2 is treated, and the molar ratio of SO$_4^{2-}$ to Cl$^-$ contained in the obtained waste water to be treated is 1:9.189. The temperature of the waste water containing ammonium salts after the heat exchange in the first heat exchange device 31 and the fifth heat exchange device 35 is 103° C., and the temperature of the waste water to be treated after the heat exchange in the second heat exchange device 32 is 112° C. The evaporation conditions of the third evaporation and the fourth evaporation are shown in Table 6. The temperature of the low temperature treatment is 25° C., and the retention time is 55 min.

TABLE 6

| Evaporation device | | Temperature/ ° C. | Pressure/ kPa | Amount of evaporation/ (m$^3$/h) |
|---|---|---|---|---|
| First evaporation device 2 | | 105 | −7.02 | 3.86 |
| Second evaporation device 1 (multi-effect evaporation device) | First evaporator 1a | 140 | 193.83 | 0.44 |
| | Second evaporator 1b | 125 | 84.91 | 0.44 |
| | Third evaporator 1c | 110 | 11.34 | 0.44 |
| | Fourth evaporator 1d | 95 | −36.36 | 0.44 |

757.97 kg filter cake of sodium chloride crystal with 15 mass % water content is obtained per hour in the first solid-liquid separation device 91, and finally 644.27 kg sodium chloride (at 99.4 mass % purity) is obtained per hour; 19.57 m$^3$ third mother liquid at concentrations of 280.4 g/L NaCl, 82.7 g/L Na$_2$SO$_4$, 2.64 g/L NaOH, and 0.15 g/L NH$_3$ is obtained per hour.

737.81 kg filter cake of sodium sulfate crystal with 15 mass % water content is obtained per hour in the second solid-liquid separation device 92, and finally 627.14 kg sodium sulfate (at 99.5 mass % purity) is obtained per hour; 18.09 m$^3$ fourth mother liquid at concentrations of 303.2 g/L NaCl, 55.1 g/L Na$_2$SO$_4$, 2.85 g/L NaOH, and 0.0049 g/L NH$_3$ is obtained per hour.

In this embodiment, 3.86 m$^3$ ammonia at 1.4 mass % concentration is obtained per hour in the first ammonia storage tank 51, 1.76 m$^3$ ammonia at 0.16 mass % concentration is obtained per hour in the second ammonia storage tank 52, and the ammonia may be recycled and reused in a molecular sieve production process.

Embodiment 19

Figure 8:
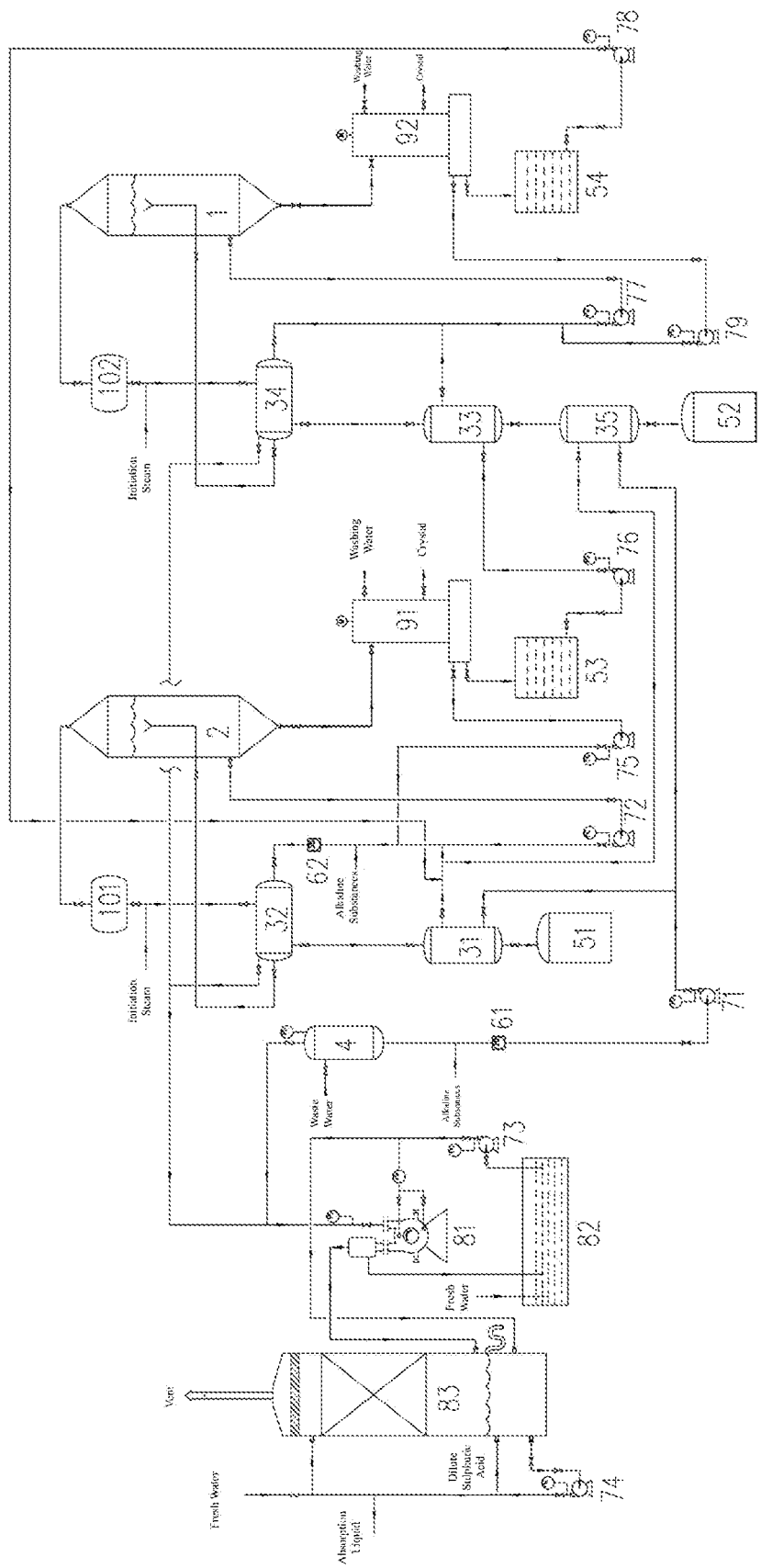
FIG. 8 is a flow diagram of the method for treating waste water containing ammonium salts in another embodiment of the present invention.

As shown in FIG. 8, waste water containing ammonium salts (containing 160 g/L NaCl, 50 g/L Na$_2$SO$_4$, 39 g/L NH$_4$Cl, and 12.4 g/L (NH$_4$)$_2$SO$_4$, with pH=6.5) is fed at 5 m$^3$/h feed rate into the vacuum degassing tank 4 for vacuum degassing, sodium hydroxide solution at 45.16 mass % concentration is introduced into the pipeline for the first pH adjustment, and the pH after the adjustment is monitored with the first pH measuring device 61 (a pH meter) (the measured value is 7.5); after the pH adjustment, a part of the waste water containing ammonium salts (1 m$^3$/h) is fed by means of the first circulation pump 71 into the fifth heat exchange device 35 (a titanium alloy plate-type heat exchanger) to perform the first heat exchange with the recycled condensate of the fourth ammonia-containing vapor, so that the temperature of the waste water containing ammonium salts is increased to 48° C., and the remaining part of the waste water containing ammonium salts is fed into the first heat exchange device 31 to perform the first heat exchange with the recycled condensate of the third ammonia-containing vapor, so that the temperature of the waste water containing ammonium salts is increased to 49° C.; then the two parts of waste water containing ammonium salts are merged, and the merged waste water containing ammonium salts is mixed with the fourth mother liquid to obtain waste water to be treated (the molar ratio of SO$_4^{2-}$ to Cl$^-$ obtained in it is 1:12.656), sodium hydroxide solution at 45.16 mass % concentration is introduced into the pipeline through which the waste water to be treated is fed into the second heat exchange device 32 to perform the second pH adjustment, the pH after the adjustment is monitored with the second pH measuring device 62 (a pH meter) (the measured value is 11), then the waste water to be treated is fed into the second heat exchange device 32 (a titanium alloy plate-type heat exchanger) to perform the first heat exchange with the recycled third ammonia-containing vapor, so that the temperature of the waste water to be treated is increased to 57° C.; next, the waste water to be treated is fed into the first evaporation device 2 (a falling film+forced circulation two-stage MVR evaporating crystallizer) for evaporation, to obtain third ammonia-containing vapor and third concentrated solution that contains sodium chloride crystal. Wherein in the first evaporation device 2, the evaporation temperature is 50° C., the pressure is −92.7 kPa, and the amount of evaporation is 4.56 m$^3$/h. The third ammonia-containing vapor obtained in the evaporation is compressed in the first compressor 101 (the temperature is increased by 10° C.), then the third ammonia-containing vapor flows through the second heat exchange device 32 and the first heat exchange device 31 sequentially to exchange heat with the waste water to be treated and the waste water containing ammonium salts respectively, and is cooled to obtain third ammonia, and the third ammonia is stored in the first ammonia storage tank 51. Besides, to improve the content of solids in the first evaporation device 2, a part of the liquid after the evaporation in the first evaporation device 2 is taken as third circulating liquid and circulated by means of the second circulation pump 72 to the second heat exchange device 32 for heat exchange, and then the first circulating liquid enters into the first evaporation device 2 again for the third evaporation (the third recirculation ratio is 95.4). The degree of the third evaporation is monitored with the densitometer provided on the first evaporation device 2, to control the concentration of sodium sulfate in the third concentrated solution to be 0.9705Y (65.7 g/L).

The third concentrated solution is fed into the first solid-liquid separation device 91 (a centrifugal machine) for the third solid-liquid separation, 20.87 m$^3$ third mother liquid that contains 294.6 g/L NaCl, 65.7 g/L Na$_2$SO$_4$, 0.22 g/L NaOH and 0.11 g/L NH$_3$ is obtained per hour, the third mother liquid is temporarily stored in the first mother liquid tank 53, the solid sodium chloride obtained in the solid-liquid separation (1196.17 kg filter cake of sodium chloride crystal with 15 mass % water content is obtained per hour, wherein the content of sodium sulfate is 3.9 mass % or lower) is eluted with 295 g/L sodium chloride solution that is in the same dry mass as the filter cake of sodium chloride crystal and then is dried, thus 1016.74 kg sodium chloride (at 99.5 mass % purity) is obtained per hour; the washing liquid is circulated by means of the fifth circulation pump 75 to a position before the second pH adjustment and mixed with the waste water to be treated, and the obtained mixture is fed into the first evaporation device 2 again for the third evaporation.

The fourth evaporation process is executed in the second evaporation device 1 (a falling film+forced circulation two-stage MVR evaporating crystallizer). The third mother liquid in the first mother liquid tank 53 is fed by means of the sixth circulation pump 76 into the third heat exchange device 33 to perform heat exchange with the condensate of the fourth ammonia-containing vapor, and then is fed into the fourth heat exchange device 34 to perform heat exchange with the fourth ammonia-containing vapor, and finally is fed into the second evaporation device 1 for the fourth evaporation, to obtain fourth ammonia-containing vapor and fourth concentrated solution that contains sodium sulfate crystal. Wherein in the second evaporation device 1, the evaporation temperature is 105° C., the pressure is −7.0 kPa, and the amount of evaporation 1.05 m$^3$/h. To improve the content of solids in the second evaporation device 1, a part of the third mother liquid after evaporation in the second evaporation device 1 is taken as fourth circulating liquid and circulated by means of the seventh circulation pump 77 to the fourth heat exchange device 34, and then is fed into the second evaporation device 1 for the fourth evaporation (the fourth recirculation ratio is 4). The fourth ammonia-containing vapor obtained in the evaporation is compressed in the second compressor 102 (the temperature is increased by 12° C.) and then flows through the fourth heat exchange device 34 and the third heat exchange device 33 sequentially to perform the second heat exchange with the third mother liquid, and the flows through the fifth heat exchange device 35 to perform the first heat exchange with a part of waste water containing ammonium salts transported by the first circulation pump 71, and is cooled to obtain fourth ammonia, and the fourth ammonia is stored in the second ammonia storage tank 52. The degree of the fourth evaporation is monitored with the densitometer provided on the second evaporation device 1, to control the concentration of sodium chloride in the fourth concentrated solution to be 0.99355X (307.9 g/L). The third mother liquid is evaporated in the second evaporation device 1 and thereby fourth concentrated solution that contains sodium sulfate crystal is obtained.

The fourth concentrated solution that contains sodium sulfate crystal is fed into the second solid-liquid separation device 92 (a centrifugal machine) for solid-liquid separation, 20.21 m$^3$ fourth mother liquid that contains 307.9 g/L NaCl, 53.0 g/L Na$_2$SO$_4$, 0.30 g/L NaOH and 0.0035 g/L NH$_3$ is obtained per hour, and the fourth mother liquid is temporarily stored in the second mother liquid tank 54. All of the fourth mother liquid is circulated by means of the eighth circulation pump 78 to a position before the second pH adjustment and is mixed with the preheated waste water containing ammonium salts to obtain waste water to be treated. The solid sodium sulfate obtained in the solid-liquid separation (364.15 kg filter cake of sodium sulfate crystal with 14 mass % water content is obtained per hour, wherein the content of sodium chloride is 3.8 mass % or lower) is eluted with 53 g/L sodium sulfate solution in the same dry mass as the sodium sulfate, and is dried in a drier, thus 313.17 kg sodium sulfate (at 99.5 mass % purity) is obtained per hour; the second washing liquid obtained in the washing process is circulated by means of the ninth circulation pump 79 to the second evaporation device 1.

In addition, the tail gas discharged from the vacuum degassing tank 4, the second heat exchange device 32 and the fourth heat exchange device 34 is introduced by means of the vacuum pump 81 into the tail gas absorption tower 83 for absorption. The tail gas absorption tower 83 has circulating water in it, the circulating water is circulated in the tail gas absorption tower 83 under the action of the fourth circulation pump 74, water is replenished to the tail gas absorption tower 83 by means of the third circulation pump 73 from the circulating water tank 82 at the same time; in addition, fresh water is replenished to the circulating water tank 82, and thereby the temperature and ammonia content of the service water of the vacuum pump 81 are decreased. Dilute sulfuric acid is further charged into the tail gas absorption tower 83 to absorb ammonia or the like in the tail gas.

In this embodiment, 4.56 m$^3$ ammonia at 1.63 mass % concentration is obtained per hour in the first ammonia storage tank 51, 1.05 m$^3$ ammonia at 0.21 mass % concentration is obtained per hour in the second ammonia storage tank 52, and the ammonia may be recycled and reused in a molecular sieve production process.

Besides, the MVR evaporation is initiated by charging steam at 143.3° C. temperature in the initial stage.

Embodiment 20

The waste water containing ammonium salts is treated with the method described in the embodiment 19, but: waste water containing ammonium salts that contains 60 g/L NaCl, 130 g/L $Na_2SO_4$, 15 g/L $NH_4Cl$ and 33.04 g/L $(NH_4)_2SO_4$ with pH=6.6 is treated, and the molar ratio of $SO_4^{2-}$ to $Cl^-$ contained in the obtained waste water to be treated is 1:11.496. The temperature of the waste water containing ammonium salts after the heat exchange in the fifth heat exchange device 35 is 53° C., the temperature of the waste water containing ammonium salts after the heat exchange in the first heat exchange device 31 is 54° C., and the temperature of the waste water to be treated after the heat exchange in the second heat exchange device 32 is 62° C. The evaporation temperature of the third evaporation is 55° C., the pressure is −90.2 kPa, and the amount of evaporation is 2.76 $m^3/h$. The evaporation temperature of the fourth evaporation is 95° C., the pressure is −36.4 kPa, and the amount of evaporation is 2.93 $m^3/h$.

445.34 kg filter cake of sodium chloride crystal with 15 mass % water content is obtained per hour in the first solid-liquid separation device 91, and finally 378.54 kg sodium chloride (at 99.6 mass % purity) is obtained per hour; 82.63 $m^3$ third mother liquid at concentrations of 296.6 g/L NaCl, 63.6 g/L $Na_2SO_4$, 0.29 g/L NaOH, and 0.032 g/L $NH_3$ is obtained per hour.

977.85 kg filter cake of sodium sulfate crystal with 15 mass % water content is obtained per hour in the second solid-liquid separation device 92, and finally 831.17 kg sodium sulfate (at 99.4 mass % purity) is obtained per hour; 80.07 $m^3$ fourth mother liquid at concentrations of 306.1 g/L NaCl, 55.3 g/L $Na_2SO_4$, 0.3 g/L NaOH, and 0.0013 g/L $NH_3$ is obtained per hour.

In this embodiment, 2.76 $m^3$ ammonia at 2.26 mass % concentration is obtained per hour in the first ammonia storage tank 51, 2.93 $m^3$ ammonia at 0.087 mass % concentration is obtained per hour in the second ammonia storage tank 52, and the ammonia may be recycled and reused in a molecular sieve production process.

Embodiment 21

The waste water containing ammonium salts is treated with the method described in the embodiment 19, but: waste water containing ammonium salts that contains 81 g/L NaCl, 79 g/L $Na_2SO_4$, 32 g/L $NH_4Cl$ and 31.72 g/L $(NH_4)_2SO_4$ with pH=6.4 is treated, and the molar ratio of $SO_4^{2-}$ to $Cl^-$ contained in the obtained waste water to be treated is 1:11.123. The temperature of the waste water containing ammonium salts after the heat exchange in the fifth heat exchange device 35 is 43° C., the temperature of the waste water containing ammonium salts after the heat exchange in the first heat exchange device 31 is 44° C., and the temperature of the waste water to be treated after the heat exchange in the second heat exchange device 32 is 52° C. The evaporation temperature of the third evaporation is 45° C., the pressure is −94.7 kPa, and the amount of evaporation is 3.73 $m^3/h$. The evaporation temperature of the fourth evaporation is 100° C., the pressure is −22.9 kPa, and the amount of evaporation is 1.99 $m^3/h$.

675.13 kg filter cake of sodium chloride crystal with 14 mass % water content is obtained per hour in the first solid-liquid separation device 91, and finally 580.61 kg sodium chloride (at 99.4 mass % purity) is obtained per hour; 36.26 $m^3$ third mother liquid at concentrations of 292.4 g/L NaCl, 67.3 g/L $Na_2SO_4$, 0.1 g/L NaOH, and 0.076 g/L $NH_3$ is obtained per hour.

657.0 kg filter cake of sodium sulfate crystal with 14 mass % water content is obtained per hour in the second solid-liquid separation device 92, and finally 580.6 kg sodium sulfate (at 99.5 mass % purity) is obtained per hour; 34.52 $m^3$ fourth mother liquid at concentrations of 307.1 g/L NaCl, 54.3 g/L $Na_2SO_4$, 0.105 g/L NaOH, and 0.0039 g/L $NH_3$ is obtained per hour.

In this embodiment, 3.73 $m^3$ ammonia at 2.3 mass % concentration is obtained per hour in the first ammonia storage tank 51, 1.99 $m^3$ ammonia at 0.13 mass % concentration is obtained per hour in the second ammonia storage tank 52, and the ammonia may be recycled and reused in a molecular sieve production process.

Embodiment 22

Figure 9:
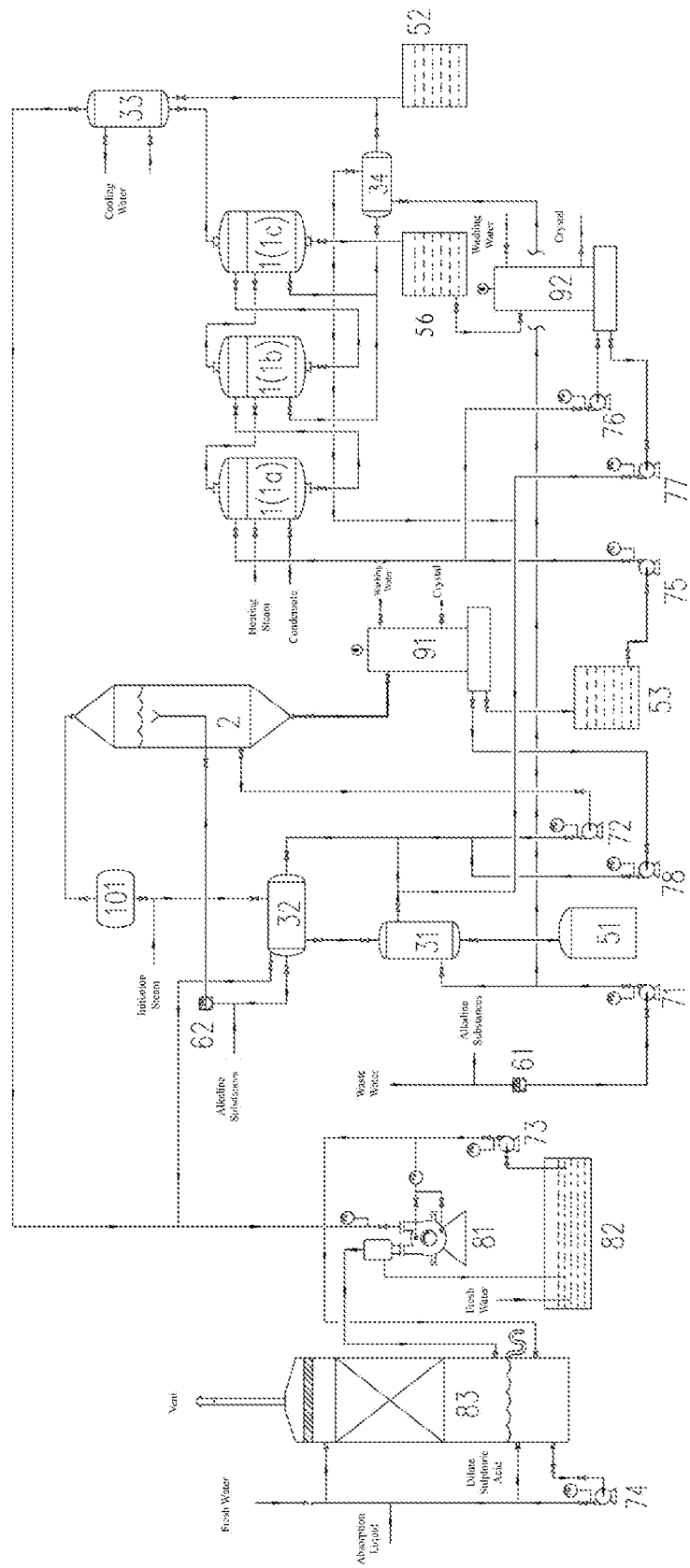
FIG. 9 is a flow diagram of the method for treating waste water containing ammonium salts in another embodiment of the present invention.

As shown in FIG. 9, waste water containing ammonium salts (containing 156 g/L NaCl, 49 g/L $Na_2SO_4$, 62 g/L $NH_4Cl$, and 19.8 g/L $(NH_4)_2SO_4$, with pH=6.7) is fed at 5 $m^3/h$ feed rate by means of the first circulation pump 71 the pipeline of the treatment system, sodium hydroxide solution at 45.16 mass % concentration is introduced into the pipeline for the first pH adjustment, and the pH after the adjustment is monitored with the first pH measuring device 61 (a pH meter) (the measured value is 7.4); a part of the waste water containing ammonium salts (3 $m^3/h$) after the first pH adjustment is fed into the first heat exchange device 31 (a plastic plate-type heat exchanger) to exchange heat with the recycled condensate of the third ammonia-containing vapor, so that the temperature of the waste water containing ammonium salts is increased to 54° C., and the remaining part of the third ammonia-containing vapor is fed into the fourth heat exchange device 34 (a duplex stainless steel plate-type heat exchanger) to exchange heat with the recycled condensate of the fourth ammonia-containing vapor, so that the temperature of the waste water containing ammonium salts is increased to 70° C.; then, the two parts of waste water containing ammonium salts are merged and mixed with the fourth mother liquid to obtain waste water to be treated (the molar ratio of $SO_4^{2-}$ to $Cl^-$ contained in it is 1:12.444), then the waste water to be treated is fed into the second heat exchange device 32 (a titanium alloy plate-type heat exchanger) for the first heat exchange with the recycled third ammonia-containing vapor, so that the temperature of the waste water to be treated is increased to 62° C.; after the twice first heat exchanges, the waste water to be treated is fed into the pipeline connected to the first evaporation device 2, and sodium hydroxide solution at 45.16 mass % concentration is introduced into the pipeline for the second pH adjustment, and the pH after the adjustment is monitored with the second pH measuring device 62 (a pH meter) (the measured value is 10.8); after the second pH adjustment, the waste water to be treated is fed into the first evaporation device 2 (a falling film+forced circulation two-stage MVR evaporating crystallizer) for evaporation, to obtain third ammonia-containing vapor and third concentrated solution that contains sodium chloride crystal. Wherein in the first evaporation device 2, the evaporation temperature is 55° C., the pressure is −90.2 kPa, and the amount of evaporation 4.63 $m^3/h$. The third ammonia-containing vapor obtained in the evaporation is compressed in the first compressor 101 (the temperature is increased by 10° C.), then the third ammonia-containing vapor flows through the second heat exchange device 32 and the first heat exchange device 31 sequentially to exchange heat with the waste water to be treated and the waste water containing ammonium salts respectively, and is cooled to obtain third ammonia, and the third ammonia is stored in the first ammonia storage tank 51. Besides, to improve the content of solids in the first evaporation device 2, a part of the liquid after the evaporation in the first evaporation device 2 is taken as circulating liquid and circulated by means of the second circulation pump 72 to the second heat exchange device 32 for heat exchange, and then the circulating liquid enters into the first evaporation device 2 again for the third evaporation (the recirculation ratio is 96.4). The degree of the third evaporation is monitored with the densitometer provided on the first evaporation device 2, to control the concentration of sodium sulfate in the third concentrated solution to be 0.9707Y (66.25 g/L).

The third concentrated solution obtained in the evaporation in the first evaporation device 2 is fed into the first solid-liquid separation device 91 (a centrifugal machine) for the third solid-liquid separation, 24.13 m³ third mother liquid that contains 293.8 g/L NaCl, 66.25 g/L $Na_2SO_4$, 0.18 g/L NaOH and 0.10 g/L $NH_3$ is obtained per hour, the third mother liquid is temporarily stored in the first mother liquid tank 53, the solid sodium chloride obtained in the solid-liquid separation (1306.96 kg filter cake of sodium chloride crystal with 14 mass % water content is obtained per hour, wherein the content of sodium sulfate is 3.9 mass % or lower) is eluted with 293 g/L sodium chloride solution that is in the same dry mass as the filter cake of sodium chloride crystal and then is dried, thus 1124 kg sodium chloride (at 99.4 mass % purity) is obtained per hour; the washing liquid is circulated by means of the eighth circulation pump 78 to the second heat exchange device 32, and then is fed into the first evaporation device 2 again for the third evaporation.

The fourth evaporation process is executed in the second evaporation device 1 (a multi-effect evaporation device), which is composed of a first evaporator 1a, a second evaporator 1b, and a third evaporator 1c (all of them are forced circulation evaporators). The third mother liquid in the mother liquid tank 54 is fed by means of the fifth circulation pump 75 into the second evaporation device 1, the third mother liquid is evaporated in the first evaporator 1a, then is fed into the second evaporator 1b for evaporation, and is fed into the third evaporator 1c for evaporation; finally, fourth concentrated solution that contains sodium sulfate crystal is obtained. Wherein in the first evaporator 1a, the evaporation temperature is 128° C., the pressure is 103.53 kPa, and the amount of evaporation is 0.41 m³/h; in the second evaporator 1b, the evaporation temperature is 114° C., the pressure is 28.07 kPa, and the amount of evaporation is 0.40 m³/h; in the third evaporator 1c, the evaporation temperature is 100° C., the pressure is −22.83 kPa, and the amount of evaporation is 0.40 m³/h. The fourth ammonia-containing vapor obtained in the evaporation in the first evaporator 1a in the second evaporation device 1 is fed into the second evaporator 1b to perform second heat exchange and obtain fourth ammonia, the fourth ammonia-containing vapor obtained in the evaporation in the second evaporator 1b is charged into the third evaporator 1c to perform second heat exchange and obtain fourth ammonia, the ammonia obtained from the second evaporator 1b and the first evaporator 1c is fed into the fourth heat exchange device 34 for heat exchange with the waste water containing ammonium salts, and then is stored in the second ammonia storage tank 52. Heating steam (i.e., live steam conventionally used in the art) is charged into the first evaporator 1a, the heating steam is condensed into condensate in the first evaporator 1a, and the condensate is used to preheat the waste water to be treated (the raw material) in the first evaporation device 2, and then is used to prepare washing solution. The fourth ammonia-containing vapor obtained in the evaporation in the third evaporator 1c in the second evaporation device 1 is fed into the third heat exchange device 33 to exchange heat with the cooling water (the waste water containing ammonium salts) and obtain fourth ammonia, and the fourth ammonia is stored in the second ammonia storage tank 52. The degree of the fourth evaporation is monitored with the densitometer provided on the second evaporation device 1, to control the concentration of sodium chloride in the fourth concentrated solution to be 0.99355X (307.1 g/L). After the third mother liquid is evaporated in the second evaporation device 1, the finally obtained fourth concentrated solution that contains sodium sulfate crystal is controlled to crystallize in the crystal-liquid collection tank 56 (the crystallization temperature is 100° C., and the crystallization time is 10 min.) to obtain crystal slurry that contains sodium sulfate crystal.

The crystal slurry that contains sodium sulfate crystal is fed into the second solid-liquid separation device 92 (a centrifugal machine) for solid-liquid separation, and 20.13 m³ fourth mother liquid that contains 307.1 g/L NaCl, 54.2 g/L $Na_2SO_4$, 0.19 g/L NaOH, and 0.0053 g/L $NH_3$ is obtained per hour; the fourth mother liquid is circulated by means of the seventh circulation pump 77 to the waste water introduction pipeline and mixed with the waste water containing ammonium salts to obtain waste water to be treated; the solid sulfate chloride obtained in the solid-liquid separation (407.7 kg filter cake of sodium sulfate crystal with 15 mass % water content is obtained per hour, wherein the content of sodium chloride is 4 mass % or lower) is eluted with 54 g/L sodium sulfate solution that is in the same dry mass as the sodium sulfate, and then is dried in a drier, thus 346.54 kg sodium sulfate (at 99.5 mass % purity) is obtained per hour; the second washing liquid obtained in the washing process is circulated by means of the sixth circulation pump 76 to the second evaporation device 1.

In addition, the tail gas discharged from the second heat exchange device 32 and the third heat exchange device 33 is introduced by means of the vacuum pump 81 into the tail gas absorption tower 83 for absorption. The tail gas absorption tower 83 has circulating water in it, the circulating water is circulated in the tail gas absorption tower 83 under the action of the fourth circulation pump 74, water is replenished to the tail gas absorption tower 83 by means of the third circulation pump 73 from the circulating water tank 82 at the same time; in addition, fresh water is replenished to the circulating water tank 82, and thereby the temperature and ammonia content of the service water of the vacuum pump 81 are decreased. Dilute sulfuric acid is further charged into the tail gas absorption tower 83 to absorb ammonia or the like in the tail gas.

In this embodiment, 4.63 m³ ammonia at 2.56 mass % concentration is obtained per hour in the first ammonia storage tank 51, 1.21 m³ ammonia at 0.19 mass % concentration is obtained per hour in the second ammonia storage tank 52, and the ammonia may be recycled and reused in a molecular sieve production process.

Besides, the MVR evaporation is initiated by charging steam at 143.3° C. temperature in the initial stage.

Embodiment 23

The waste water containing ammonium salts is treated with the method described in the embodiment 22, but: waste water containing ammonium salts that contains 160 g/L NaCl, 25 g/L Na$_2$SO$_4$, 39 g/L NH$_4$Cl and 6.2 g/L (NH$_4$)$_2$SO$_4$ with pH=6.5 is treated; the temperature of the waste water containing ammonium salts after the heat exchange in the first heat exchange device 31 is 44° C., the temperature of the waste water containing ammonium salts after the heat exchange in the fourth heat exchange device 34 is 100° C., the temperature of the waste water to be treated after the heat exchange in the second heat exchange device 32 is 52° C., the molar ratio of SO$_4^{2-}$ to Cl$^-$ contained in the obtained waste water to be treated is 1:14.438. The evaporation temperature of the third evaporation is 45° C., the pressure is −94.69 kPa, and the amount of evaporation is 4.94 m$^3$/h. The evaporation temperature of the fourth evaporation in the first evaporator 1$a$ is 130° C., the pressure is 116.77 kPa, and the amount of evaporation is 0.19 m$^3$/h; in the second evaporator 1$b$, the evaporation temperature is 117° C., the pressure is 41.92 kPa, and the amount of evaporation is 0.19 m$^3$/h; in the third evaporator 1$c$, the evaporation temperature is 105° C., the pressure is −7.02 kPa, and the amount of evaporation is 0.18 m$^3$/h.

1198.31 kg filter cake of sodium chloride crystal with 15 mass % water content is obtained per hour in the first solid-liquid separation device 91, and finally 1018.57 kg sodium chloride (at 99.4 mass % purity) is obtained per hour; 9.49 m$^3$ third mother liquid at concentrations of 291.8 g/L NaCl, 67 g/L Na$_2$SO$_4$, 0.16 g/L NaOH, and 0.07 g/L NH$_3$ is obtained per hour.

177.95 kg filter cake of sodium sulfate crystal with 14 mass % water content is obtained per hour in the second solid-liquid separation device 92, and finally 153.04 kg sodium sulfate (at 99.5 mass % purity) is obtained per hour; 9.00 m$^3$ fourth mother liquid at concentrations of 307.9 g/L NaCl, 53.1 g/L Na$_2$SO$_4$, 0.17 g/L NaOH, and 0.0031 g/L NH$_3$ is obtained per hour.

In this embodiment, 4.94 m$^3$ ammonia at 1.38 mass % concentration is obtained per hour in the first ammonia storage tank 51, 0.56 m$^3$ ammonia at 0.118 mass % concentration is obtained per hour in the second ammonia storage tank 52.

Embodiment 24

The waste water containing ammonium salts is treated with the method described in the embodiment 22, but: waste water containing ammonium salts that contains 105 g/L NaCl, 108 g/L Na$_2$SO$_4$, 20 g/L NH$_4$Cl and 20.91 g/L (NH$_4$)$_2$SO$_4$ with pH=6.7 is treated; the temperature of a part of the waste water containing ammonium salts (2.5 m$^3$/h) after the heat exchange in the first heat exchange device 31 is 49° C., the temperature of the remaining part of the waste water containing ammonium salts after the heat exchange in the fourth heat exchange device 34 is 85° C., the temperature of the waste water to be treated after the heat exchange in the second heat exchange device 32 is 57° C., the molar ratio of SO$_4^{2-}$ to Cl$^-$ contained in the obtained waste water to be treated is 1:11.333. The evaporation temperature of the third evaporation is 50° C., the pressure is −92.7 kPa, and the amount of evaporation is 3.35 m$^3$/h. The evaporation temperature of the fourth evaporation in the first evaporator 1$a$ is 125° C., the pressure is 84.91 kPa, and the amount of evaporation is 0.77 m$^3$/h; in the second evaporator 1$b$, the evaporation temperature is 110° C., the pressure is 11.34 kPa, and the amount of evaporation is 0.75 m$^3$/h; in the third evaporator 1$c$, the evaporation temperature is 95° C., the pressure is −36.37 kPa, and the amount of evaporation is 0.75 m$^3$/h.

745.41 kg filter cake of sodium chloride crystal with 15 mass % water content is obtained per hour in the first solid-liquid separation device 91, and finally 633.59 kg sodium chloride (at 99.5 mass % purity) is obtained per hour; 52.06 m$^3$ third mother liquid at concentrations of 294.6 g/L NaCl, 65.7 g/L Na$_2$SO$_4$, 0.22 g/L NaOH, and 0.056 g/L NH$_3$ is obtained per hour.

768.53 kg filter cake of sodium sulfate crystal with 15 mass % water content is obtained per hour in the second solid-liquid separation device 92, and finally 653.25 kg sodium sulfate (at 99.4 mass % purity) is obtained per hour; 50.07 m$^3$ fourth mother liquid at concentrations of 306.2 g/L NaCl, 55.3 g/L Na$_2$SO$_4$, 0.229 g/L NaOH, and 0.0017 g/L NH$_3$ is obtained per hour.

In this embodiment, 3.35 m$^3$ ammonia at 1.63 mass % concentration is obtained per hour in the first ammonia storage tank 51, 2.27 m$^3$ ammonia at 0.12 mass % concentration is obtained per hour in the second ammonia storage tank 52.

While some preferred embodiments of the present invention are described above, the present invention is not limited to the details in those embodiments. Those skilled in the art can make modifications and variations to the technical scheme of the present invention, without departing from the spirit of the present invention. However, all these modifications and variations shall be deemed as falling into the scope of protection of the present invention.

In addition, it should be noted that the specific technical features described in above embodiments can be combined in any appropriate form, provided that there is no conflict. To avoid unnecessary repetition, the possible combinations are not described specifically in the present invention.

Moreover, different embodiments of the present invention can be combined freely as required, as long as the combinations don't deviate from the ideal and spirit of the present invention. However, such combinations shall also be deemed as falling into the scope disclosed in the present invention.

The invention claimed is:

1. A method for treating waste water, comprising:
1) adjusting a pH value of the waste water to a value of greater than 10.8; treating the waste water by a first evaporation to obtain a first ammonia-containing vapor and a first concentrated solution that contains sodium sulfate crystals; and, during the first evaporation, controlling a concentration of sodium chloride in the first concentrated solution below a saturation concentration of sodium chloride;
2) separating the sodium sulfate crystals from the first concentrated solution by a first solid-liquid separation to obtain a first mother liquid; treating the first mother liquid by a second evaporation to obtain a second ammonia-containing vapor and a second concentrated solution that contains sodium chloride crystals; and
3) separating the sodium chloride crystals from the second concentrated solution by second solid-liquid separation to obtain a second mother liquid,
wherein the waste water contains NH$_4^+$, SO$_4^{2-}$, Cl$^-$, and Na$^+$, and wherein a molar ratio between $SO_4^{2-}$ and $Cl^-$ in the waste water is 1:2 to 1:14.

2. The method according to claim 1, further comprising controlling a concentration of sodium sulfate in the second concentrated solution below a saturation concentration of sodium sulfate during the second evaporation.

3. The method according to claim 1, further comprising combining the second mother liquid with a waste water feedstock to obtain the waste water, wherein the pH value of the waste water is adjusted using NaOH prior to the first evaporation.

4. The method according to claim 1, wherein the concentration of sodium chloride in the first concentrated solution is controlled at 95% to 99.9% of the saturation concentration of sodium chloride in the first concentrated solution during the first evaporation, and wherein the concentration of sodium sulfate in the second concentrated solution is controlled at 90% to 99% of a saturation concentration of sodium sulfate in the second concentrated solution.

5. The method according to claim 1, further comprising: subjecting the second concentrated solution to a low temperature treatment that comprises cooling the second concentrated solution so that the sodium sulfate crystals dissolve into the second concentrated solution.

6. The method according to claim 4, wherein the second evaporation is conducted at a temperature of 30° C. to 85° C. under a pressure of −98 kPa to −58 kPa, wherein a temperature of the first evaporation is higher than the temperature of the second evaporation by 5° C. or more.

7. The method according to claim 5, wherein the second evaporation is conducted at a temperature of 35° C. or more under a pressure of −95 kPa or more.

8. The method according to claim 7, wherein the low temperature treatment is conducted at a temperature of 10° C. to 100° C., wherein a temperature of the first evaporation is higher than the temperature of the low temperature treatment by 5° C. or more.

9. The method according to claim 1, wherein the first evaporation is conducted at a temperature of 45° C. to 365° C. under a pressure of −95 k Pa to 18110 kPa.

10. The method according to claim 1, wherein the first evaporation or the second evaporation is performed with a Mechanical Vapor Recompression (MVR) evaporator, a single-effect evaporator, a multi-effect evaporator, or a flash evaporator.

11. The method according to claim 3, wherein in the waste water feedstock contains at least 8 mg/L of $NH_4^+$, at least 1 g/L of $SO_4^{2-}$, at least 970 mg/L of $Cl^-$, and at least 510 mg/L of $Na^+$.

12. A method for treating waste water, comprising:
1) adjusting a pH value of the waste water to a value greater than 10.8; treating the waste water by a first evaporation to obtain a first ammonia-containing vapor and a first concentrated solution that contains sodium chloride crystals;
2) separating sodium chloride crystals from the first concentrated solution by a first solid-liquid separation to obtain a first mother liquid, and treating the first mother liquid by a second evaporation to obtain a second ammonia-containing vapor and a second concentrated solution that contains sodium sulfate crystals, and controlling a concentration of sodium chloride in the second concentrated solution below a saturation concentration of sodium chloride during the second evaporation;
3) separating sodium sulfate crystals from the second concentrated solution by a second solid-liquid separation to obtain a second mother liquid,
wherein the waste water contains $NH_4^+$, $SO_4^{2-}$, $Cl^-$ and $Na^+$, and
wherein a molar ratio of $Cl^-$ and $SO_4^{2-}$ in the waste water is 7.15:1 to 40:1.

13. The method according to claim 12, further comprising combining a waste water feedstock with the second mother liquid to obtain the waste water, and wherein the pH of the waste water is adjusted using NaOH prior to the first evaporation.

14. The method according to claim 12, further comprising controlling a concentration of sodium sulfate in the first concentration solution below a saturation concentration of sodium sulfate in the first concentration solution during the first evaporation.

15. The method according to claim 14, wherein the concentration of sodium sulfate in the first concentrated solution during the first evaporation is 90% to 99% of the saturation concentration of sodium sulfate in the first concentrated solution during the first evaporation, and
wherein the concentration of sodium chloride in the second concentrated solution during the second evaporation is 95% to 99.9% of the saturation concentration of sodium chloride in the second concentrated solution during the first evaporation.

16. The method according to claim 12, further comprising:
subjecting the first concentrated solution to a low temperature treatment that comprises cooling the first concentrated solution so that the precipitated sodium sulfate crystals dissolve into the first concentrated solution.

17. The method according to claim 15, wherein the first evaporation is conducted at a temperature of 35° C. to 85° C. under a pressure of −95 kPa to −58 kPa, wherein the temperature of the first evaporation is lower than a temperature of the second evaporation by 5° C. or more.

18. The method according to claim 16, wherein the first evaporation is conducted at a temperature of 35° C. or more under a pressure of −95 kPa or more.

19. The method according to claim 16, wherein the low temperature treatment is conducted at a temperature of 13° C. to 100° C., and a temperature of the second evaporation is higher than the temperature of the low temperature treatment by 5° C. or more.

20. The method according to claim 12, wherein the second evaporation is conducted at a temperature of 45° C. to 365° C. under a pressure of −95 kPa to 18110 kPa.

21. The method according to claim 12, wherein the first evaporation or the second evaporation is performed with a Mechanical Vapor Recompression (MVR) evaporator, a single-effect evaporator, a multi-effect evaporator, or a flash evaporator.

22. The method according to claim 13, wherein in the waste water feedstock contains at least 8 mg/L of $NH_4^+$, at least 1 g/L of $SO_4^{2-}$, at least 970 mg/L of $Cl^-$, and at least 510 mg/L of $Na^+$.

23. The method according to claim 6, wherein the first evaporation is conducted at a temperature of 95° C. to 110° C. under a pressure of −37 k Pa to 12 kPa, wherein the second evaporation is conducted at a temperature of 45° C. to 55° C. under a pressure of −95 kPa to −90 kPa.

24. The method according to claim 7, wherein the first evaporation is conducted at a temperature of 95° C. to 110° C. under a pressure of −37 k Pa to 12 kPa, wherein the second evaporation is conducted at a temperature of 95° C. to 110° C. under a pressure of −37 kPa to 12 kPa, wherein the low temperature treatment is conducted at a temperature of 17.9° C. to 35° C.

25. The method according to claim 17, wherein the first evaporation is conducted at a temperature of 45° C. to 55° C. under a pressure of −95 kPa to −90 kPa, wherein the second evaporation is conducted at a temperature of 95° C. to 110° C. under a pressure of −37 kPa to 12 kPa.

26. The method according to claim 18, wherein the first evaporation is conducted at a temperature of 95° C. to 110° C. under a pressure of −37 k Pa to 12 kPa, wherein the second evaporation is conducted at a temperature of 95° C. to 110° C. under a pressure of −37 k Pa to 12 kPa, wherein the low temperature treatment is conducted at a temperature of 17.9° C. to 35° C.

* * * * *